United States Patent
Howland

(10) Patent No.: US 10,767,966 B2
(45) Date of Patent: Sep. 8, 2020

(54) CAMOUFLAGE LAMINATE WITH FIELD-ADAPTABLE VISUAL AND IR SIGNATURE MANAGEMENT

(71) Applicant: Warwick Mills Inc., New Ipswich, NH (US)

(72) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 231 days.

(21) Appl. No.: 15/698,134

(22) Filed: Sep. 7, 2017

(65) Prior Publication Data

US 2018/0066922 A1 Mar. 8, 2018

Related U.S. Application Data

(60) Provisional application No. 62/527,723, filed on Jun. 30, 2017, provisional application No. 62/481,417, (Continued)

(51) Int. Cl.
*F41H 3/02* (2006.01)
*B32B 27/36* (2006.01)
(Continued)

(52) U.S. Cl.
CPC ............. *F41H 3/02* (2013.01); *B32B 3/02* (2013.01); *B32B 3/20* (2013.01); *B32B 5/022* (2013.01);
(Continued)

(58) Field of Classification Search
None
See application file for complete search history.

(56) References Cited

U.S. PATENT DOCUMENTS 3,486,177 A * 12/1969 Marshack .............. A61G 7/057
5/726
4,712,594 A * 12/1987 Schneider ............ A62B 18/086
128/206.22
(Continued)

OTHER PUBLICATIONS

"Infantino Pat and Play Water Mattm" (https://infantino.com/products/pat-play-water-mat via Internet Wayback Machine https://web.archive.org/web/20150905143504/https://infantino.conn/products/pat-play-water-mat circa Sep. 5, 2015 (Year: 2015).*
(Continued)

*Primary Examiner* — Laura C Powers
(74) *Attorney, Agent, or Firm* — Maine Cernota & Rardin

(57) ABSTRACT

A camouflage system adaptively matches the visible and IR spectrum of surrounding vegetation. A bio-chromophore dye solution circulated through an upper channel and distributed by a pulp or fabric matches the visible and biological IR spectrum, while water evaporated from the upper channel or from a separate lower channel matches the water IR spectrum. Dye can be retained in the pulp or continuously circulated. Permanently printed colors and/or patterns can also be included. Petalation cooperative with a channel flow pattern can release evaporated water and inhibit LiDAR detection. An upper waxy layer and surface embossing can avoid specular reflections. The camouflage signature can be compared with the environment and automatically adjusted as needed. Embodiments include thermal management, electromagnetic shielding, and/or radar scattering/absorbing subsystems. An airbag ground plane can match a terrain contour and avoid LiDAR detection. Multiple zones can provide adaptive display of visible and IR patterns.

41 Claims, 43 Drawing Sheets
(12 of 43 Drawing Sheet(s) Filed in Color)

Related U.S. Application Data filed on Apr. 4, 2017, provisional application No. 62/384,334, filed on Sep. 7, 2016.

(51) Int. Cl.
| | |
|---|---|
| *B41M 3/06* | (2006.01) |
| *B32B 27/12* | (2006.01) |
| *B32B 5/26* | (2006.01) |
| *B32B 21/08* | (2006.01) |
| *B32B 27/34* | (2006.01) |
| *B32B 3/20* | (2006.01) |
| *B32B 21/04* | (2006.01) |
| *B32B 27/14* | (2006.01) |
| *B32B 5/02* | (2006.01) |
| *B32B 3/02* | (2006.01) |
| *B32B 5/30* | (2006.01) |
| *B32B 7/12* | (2006.01) |
| *B32B 5/16* | (2006.01) |

(52) U.S. Cl.
CPC .................. *B32B 5/16* (2013.01); *B32B 5/26* (2013.01); *B32B 5/30* (2013.01); *B32B 7/12* (2013.01); *B32B 21/04* (2013.01); *B32B 21/08* (2013.01); *B32B 27/12* (2013.01); *B32B 27/14* (2013.01); *B32B 27/34* (2013.01); *B32B 27/36* (2013.01); *B41M 3/06* (2013.01); *B32B 2250/03* (2013.01); *B32B 2250/05* (2013.01); *B32B 2255/02* (2013.01); *B32B 2255/10* (2013.01); *B32B 2255/205* (2013.01); *B32B 2255/24* (2013.01); *B32B 2260/025* (2013.01); *B32B 2260/04* (2013.01); *B32B 2262/0261* (2013.01); *B32B 2262/0284* (2013.01); *B32B 2262/04* (2013.01); *B32B 2262/062* (2013.01); *B32B 2262/067* (2013.01); *B32B 2307/212* (2013.01); *B32B 2307/302* (2013.01); *B32B 2307/4026* (2013.01); *B32B 2307/41* (2013.01); *B32B 2307/412* (2013.01); *B32B 2307/726* (2013.01); *B32B 2307/7265* (2013.01); *B32B 2367/00* (2013.01); *B32B 2571/00* (2013.01)

(56) References Cited

U.S. PATENT DOCUMENTS

| | | | |
|---|---|---|---|
| 4,982,959 A * | 1/1991 | Rudell | A63F 9/00 239/211 |
| 5,445,863 A | 8/1995 | Slagle et al. | |
| 5,511,536 A * | 4/1996 | Bussey, Jr. | E04H 4/103 126/565 |
| 5,755,275 A * | 5/1998 | Rose | A61F 7/02 165/171 |
| 5,799,600 A | 9/1998 | Reuben | |
| 6,093,475 A * | 7/2000 | Geller | A41G 7/02 2/206 |
| 9,276,324 B2 | 3/2016 | Kelsey et al. | |
| 2004/0162536 A1* | 8/2004 | Becker | A61F 13/15203 604/367 |
| 2004/0213982 A1* | 10/2004 | Touzov | F41H 3/00 428/304.4 |
| 2009/0252913 A1 | 10/2009 | Cincotti et al. | |
| 2012/0148797 A1 | 6/2012 | Tsai | |
| 2014/0304883 A1 | 10/2014 | Morag et al. | |
| 2018/0055118 A1* | 3/2018 | Hafeez-Bey | A41D 31/0005 |

OTHER PUBLICATIONS

American Plating Company ("The 5 Most Conductive Metals on Earth Are . . . " http://www.americanplatingcompany.com/most-conductive-metals/, via Internet Wayback Machine May 12, 2016 (Year: 2016).*

Smith ("What is PET?" by Johanna Smith, HuffPost 2008, https://www.huffpost.com/entry/what-is-pet_n_139440 (Year: 2008).*

Jane ("Material Matters:Cotton Canvas" by Adam Jane, Aug. 10, 2016 https://www.sneakerfreaker.com/articles/material-matters-cotton-canvas/) (Year: 2016).*

"Learning Express Fill-n-Fun Water Play Mat" (https://learningexpress.com/fill-n-fun-water-play-mat/ via Internet Wayback Machine https://web.archive.org/web/20150928220409/https://learningexpress.com/fill-n-fun-water-play-mat (Year: 2015).*

Art 3d Colorful Dance Floor Mat Liquid Encased Floor Tile https://www.art3d.com/designs/a11004-colorful-dance-floor-mat-liquid-encased-floor-tile-50cmx50cm/ (Review dated Mar. 11, 2016) (Year: 2016).*

International Preliminary Report on Patentability for Appl No. PCT/US2017/050467 dated Mar. 12, 2019, 10 pages.

International Search Report for Appl No. PCT/US2017/050467 dated Dec. 19, 2017, 5 pages.

Written Opinion for Appl No. PCT/US2017/050467 dated Dec. 19, 2017, 8 pages.

Extended European Search Report for Application No. 17849525.5 dated Feb. 26, 2020, 6 pages.

\* cited by examiner

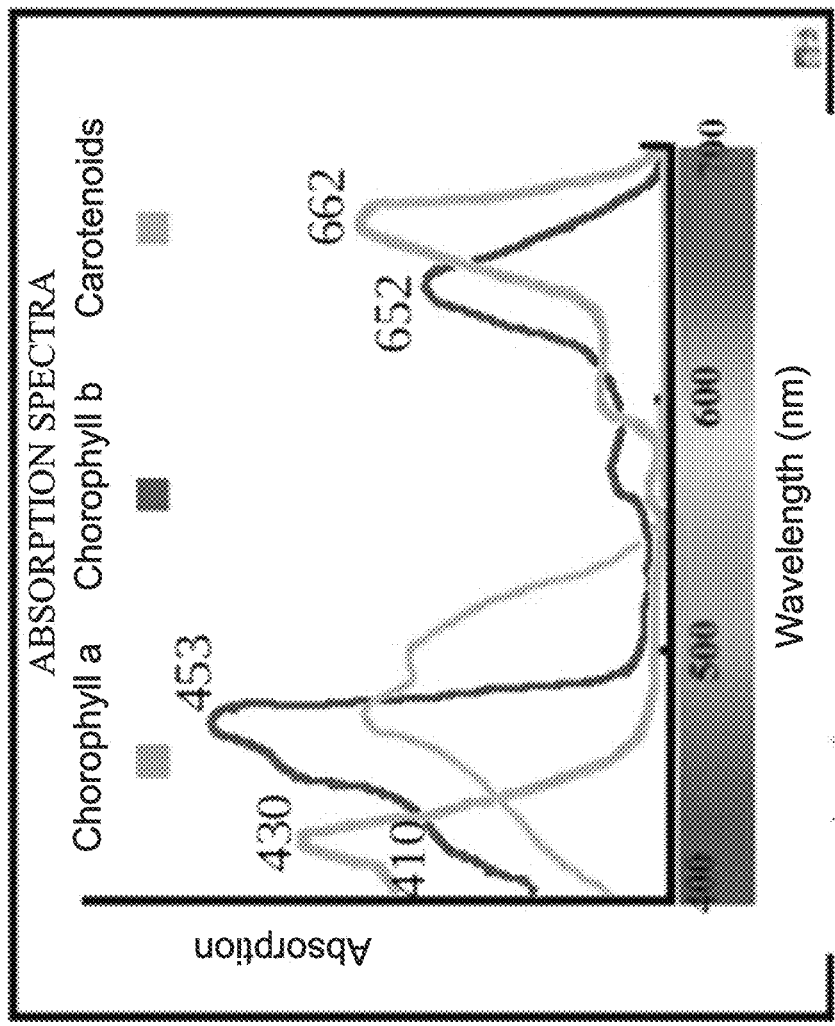 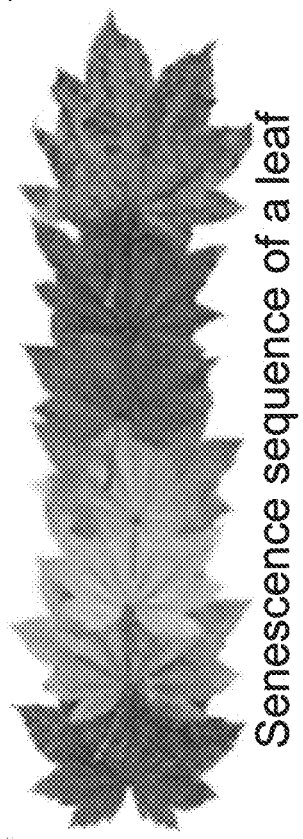
Fig. 12

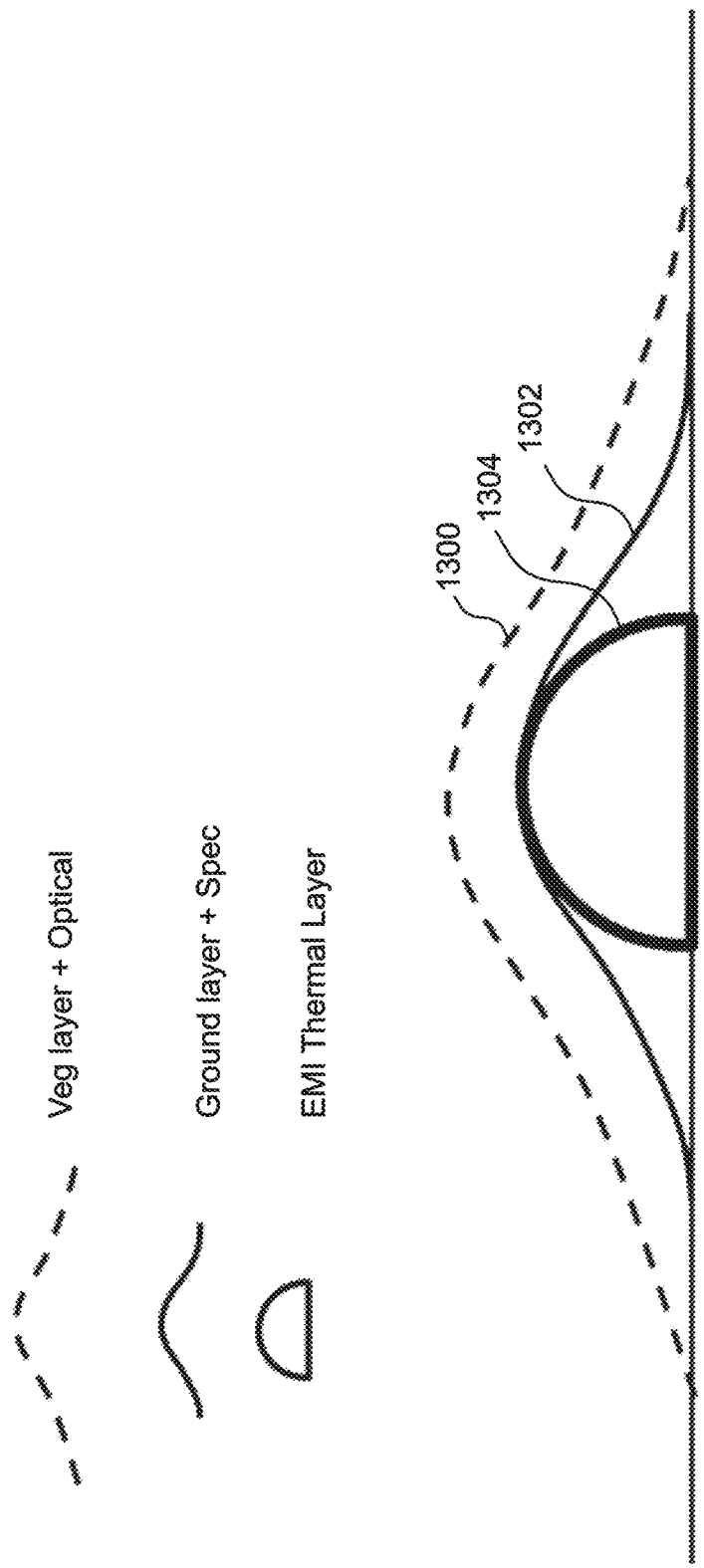

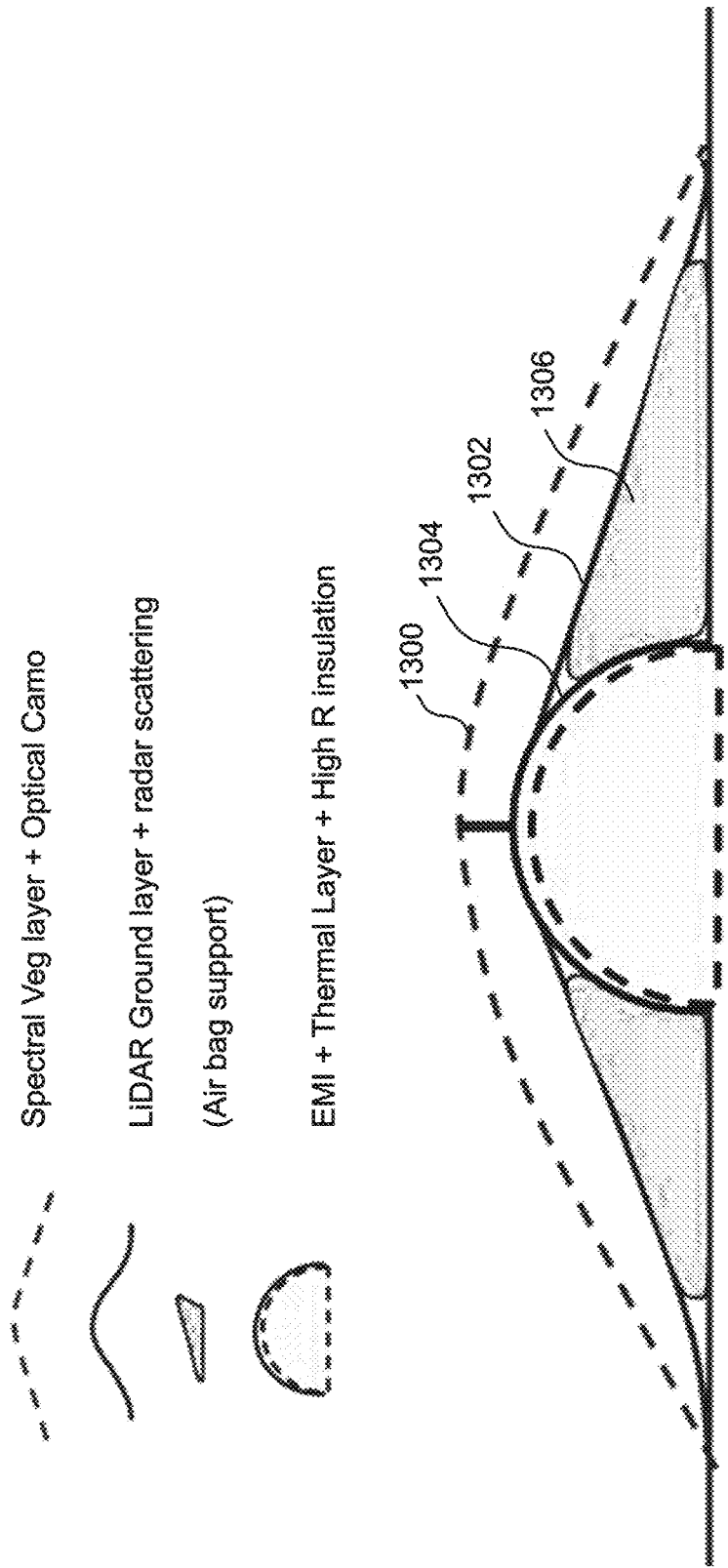

| 1408 | 1601 | 1504 |
|---|---|---|
| PET Bio-film, Visible and IR transparent | Vascular bio-chromophore transport material complex solvent 25% to 50% capacity | Microporous transpiration film layer |

| Layer | ID |
|---|---|
| Cuticular wax, UV reflective, Visible and IR transparent | 1610 |
| PET Bio-film, Visible and IR transparent | 1408 |
| Vascular bio-chromophore transport material complex solvent 25% to 50% opacity | 1601 |
| PET Bio-film, Visible and IR transparent | 1606 |
| Water transport layer, cellulosic textile layer Visible and IR 25% to 75% opacity, optional printed base pattern | 1608 |
| Microporous transpiration film layer | 1504 |
| Textile mechanical layer, 25% to 90% opacity, apx. 200 cfm Frazer permeability, optional printed base pattern | 1602 |

Fig. 16C

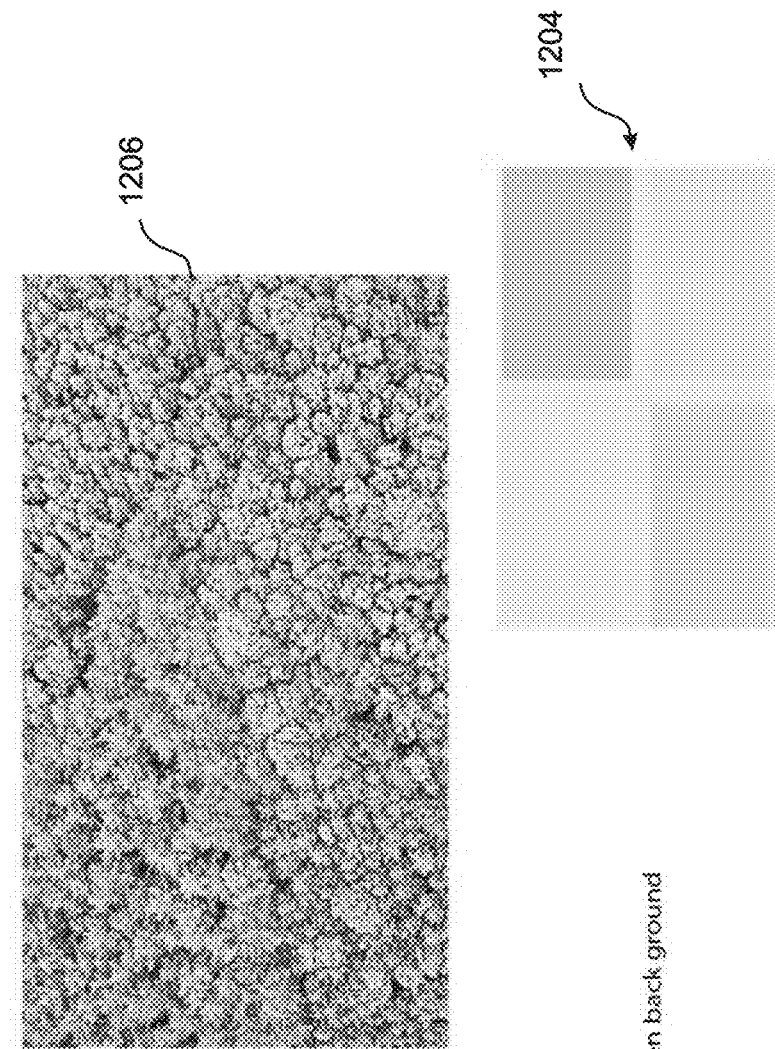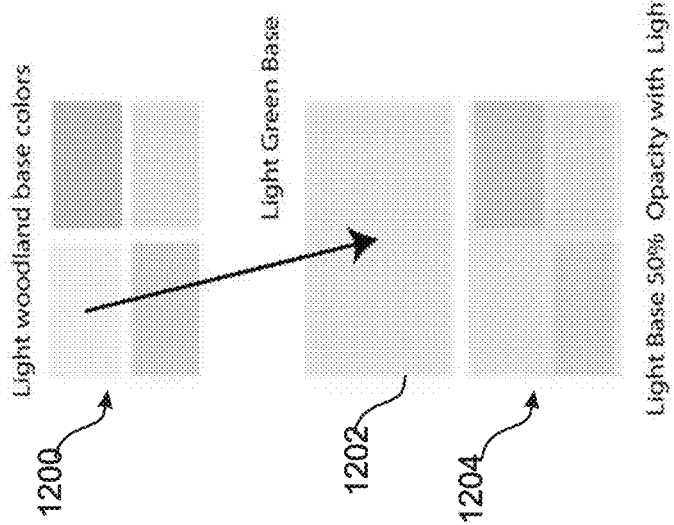
Fig. 21

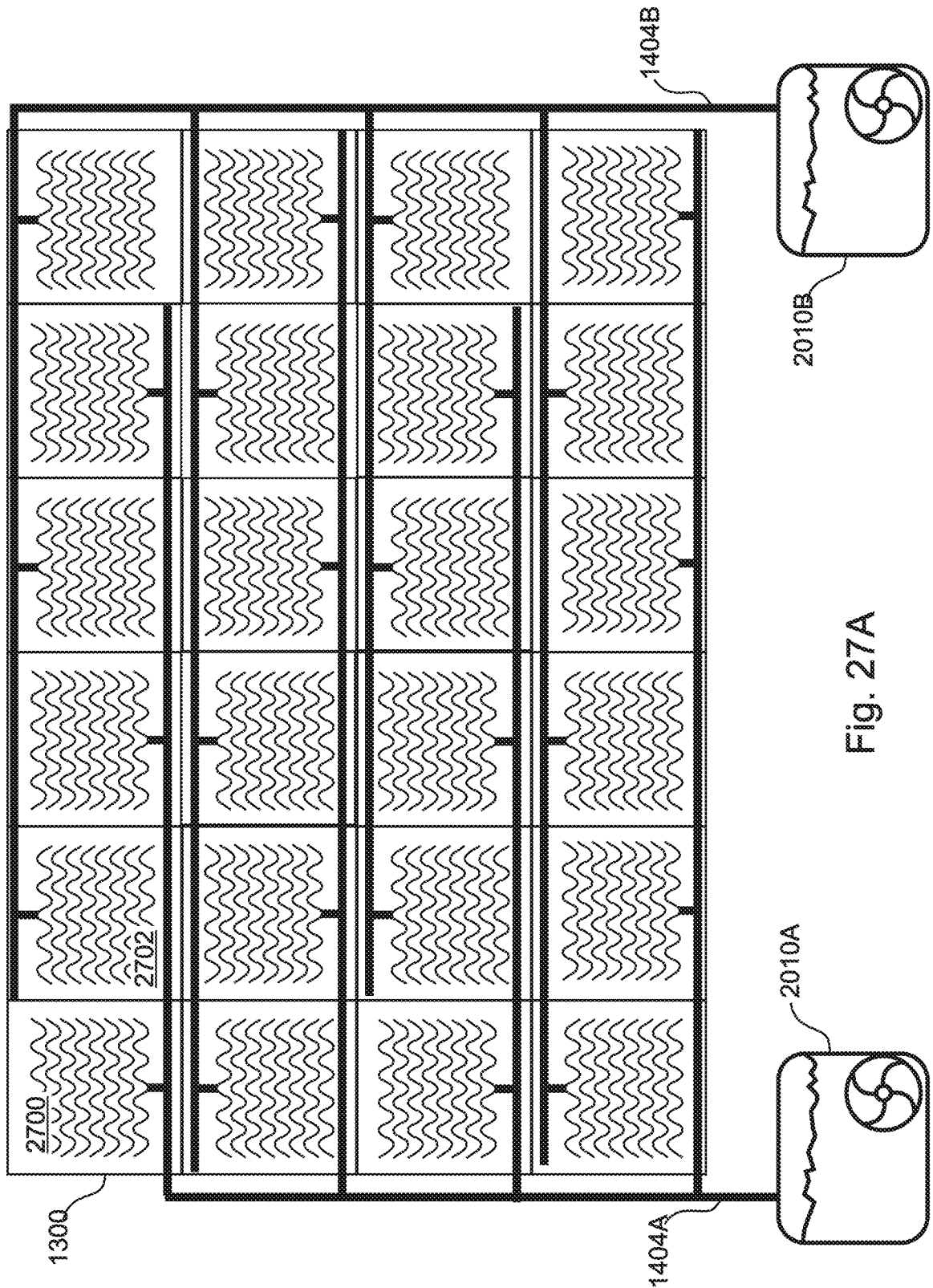

CAMOUFLAGE LAMINATE WITH FIELD-ADAPTABLE VISUAL AND IR SIGNATURE MANAGEMENT

COPYRIGHT NOTICE

A portion of the disclosure of this patent document contains material that is subject to copyright protection. The copyright owner has no objection to the facsimile reproduction by anyone of the patent document or the patent disclosure, as it appears in a published Patent and Trademark Office patent file or record, but otherwise reserves all copyrights whatsoever.

RELATED APPLICATIONS

This application claims the benefit of U.S. Provisional Application No. 62/384,334, filed Sep. 7, 2016, U.S. Provisional Application No. 62/481,417, filed Apr. 4, 2017, and U.S. Provisional Application 62/527,723, filed Jun. 30, 2017, all of which are herein incorporated by reference in their entirety for all purposes.

FIELD OF THE INVENTION

The invention relates to camouflage, and more particularly, to camouflage that protects objects from visual and infrared detection.

BACKGROUND OF THE INVENTION

Camouflage, which can be broadly defined as apparatus and methods for protecting covert mobile and stationary objects from detection, is an important requirement for many civilian and military applications. Current approaches to camouflage, also known as "signature management," that are used to shield vehicles and other mobile and stationary ground-based assets typically include a camouflage cover that extends over the ground-based asset and presents colors and marking patterns that attempt to match colors and patterns in the visible background.

Often, so-called "garnish" features are included in the camouflage cover, where the term "garnish" refers to any feature that attempts to emulate the texture of the surrounding environment, especially the texture of leaves and other vegetation. Garnish can include "virtual" garnish, such as printed fabric or nets that generate the appearance of a texture with a depth of shadow created beneath it. The garnish effect can also include "physical" garnish such as artificial folds and/or flaps of fabric, referred to herein as "petalation," that is added to or imposed on the fabric or nets of the camouflage cover. Such physical garnish can be highly effective in removing flat specular surfaces and/or providing self-shadowing and an appropriate range of reflectance that simulates vegetation.

Advances in various method of detection have made it increasingly difficult to successfully camouflage covert objects. In particular, the development and proliferation of advanced ground-observation and ground-scanning technologies has made it increasingly difficult to avoid detection of covert ground-based objects from above. Threats that are not adequately addressed by current camouflage approaches include advanced radar methods such as Side Aperture Radar (SAR) and the laser range finding analog of radar known as "LiDAR," as well as apparatus that detect EM signatures emitted by communications equipment and other electronic devices. Often, it is also desirable to protect assets from infrared ("IR") detection by shielding the heat emissions of an asset.

Methods for avoiding detection of covert objects by radar include covering the covert object with materials and coatings that scatter and/or absorb radar waves, as well as by configuring the covert object with structures that further scatter radar waves. Attempts have also been made to mask EM signatures within selected wavelength ranges emitted by communications equipment and other electronic devices.

Infrared signature management can include both passive shielding, using various types of insulation materials, as well as active shielding, for example by circulating a cooled liquid such as water through a vascular system provided in the camouflage cover. Attempts have been made using these methods to mask thermal signatures to a level that is below the background IR.

When camouflage is provided for vehicles and/or other portable ground-based assets that are traveling through a variable environment, such as a region of high vegetation, it can be necessary to maintain and transport a large number of camouflage covers that display a variety of different patterns and colors in an attempt to match the highly variable background. This can be a burdensome requirement, which is rendered even more costly and bulky when the camouflage covers also include vascular systems for heat shielding. Unfortunately, even when a variety of different camouflage covers are provided, it is inevitable that vegetative environments will be encountered for which none of the provided covers provides an ideal match to the surrounding colors and patterns.

Furthermore, as commercially available detecting instrumentation has grown smaller and costs have been reduced, it has become practical to employ sophisticated analysis of the visual, UV, and IR spectral signatures of the environment in detecting camouflaged assets. As a result, in a growing number of hostile situations it is no longer sufficient for camouflage to simply mask heat emissions and match the surrounding colors and visual patterns, because hostile forces are able to use this new instrumentation to detect differences and variations in the infrared ("IR") and ultraviolet ("UV") absorptions and emissions in a scene as a function of IR and UV wavelength. This "spectroscopic" approach to defeating camouflage is sensitive to differences in the chemical makeup of the scene, and not simply to visible colors and energy emission levels.

As a result, existing camouflage systems can often be defeated through remote sensing using multispectral, hyperspectral or thermal imaging instruments, and for this reason it is becoming increasingly important for camouflage to emulate the chemical, or "spectral" signature of the surrounding environment.

Typical leaf vegetation is composed of between 90% and 95% water, with the remainder being a combination of biochemical components, namely:
  dry matter (cell walls): 5-10%
  cellulose: 15-30%
  hemicellulose: 10-30%
  proteins: 10-20%
  lignin: 5-15%
  starch: 0.2-2.7%-sugar-etc.

Since water is transparent in the visible range, the visible appearance of vegetation is mainly dominated by the biochemical components in the upper surfaces of leaves or other plant structures. These biochemical components also contribute to the IR spectral signature of the vegetation. As illustrated in FIGS. 1 and 2A, natural vegetation has a distinctive pattern of absorption that spans the visible and infrared wavelength regions. For example, with reference to FIGS. 2A, and 2B, it can be important for a camouflage system to match the sharp reflection in the near IR 700 nm region that is associated with vegetation chromophores.

Also, matching absorptions in the mid-IR range can be critical. For example, the following are FTIR absorption regions that are due to common functional groups found in peat (source: Aiken, 1985):

TABLE 1

| Wavenumber cm-1 | Associated functional group |
| --- | --- |
| 750-880 | Hydrogen-bonded OH stretching of carboxylic groups. |
| 1040-1090 | C—O stretching of alcoholic compounds, polysaccharides. |
| 1137-1280 | C—O stretching of esters, ethers and phenols. |
| 1332-1390 | Salts of carboxylic acids |
| 1390-1400 | OH deformations and C—O stretching of phenolic OH, C—H deformation of CH3 groups. |
| 1420-1470 | Aliphatic C—H deformation. |
| 1515 | C=C stretching in benzene and/or pyridine. |
| 1585-1640 | C=O stretching of double bonds in cyclic and acyclic compounds. |
| 1640-1725 | C=O stretching of carboxylic acids. |
| 1850-2500 | Carboxylate ions. |
| 2850-2950 | Aliphatic C—H, C—H2, C—H3 stretching. The absorption at the range from 3000 to 2800 cm-1 shows presence of alkanes. Twin peaks at about 2920 and 2850 cm-1 are found because of symmetrical and asymmetrical stretching of aliphatic C—H |
| 3030-3077 | Aromatic C—H stretching. |
| 3300-3670 | Hydrogen-bonded OH groups. |

In addition to bio-chromophores, the water that is included in vegetation also plays a significant role in determining the IR spectral signature, including the water that is transpired by the vegetation into the surrounding atmosphere, typically from the rear surfaces of leaves or other plant structures.

It is not yet practical to use interferometric instruments such as FTIR laboratory spectrometers for spatial remote sensing. Instead, simpler instruments are typically used to "fingerprint" the spectral signature by measuring absorption or reflectance at key wavelengths. Nevertheless, interferometric laboratory instruments can be very useful for defining and characterizing the IR spectral signatures of natural materials. For example, the absorption bands from water at 1400 nm and 1950 nm (1.4 μm and 1.95 μm) are clearly visible in FIG. 2B.

FIG. 3 presents an FTIR spectrum of water (source: NIST chemistry workbook, http://webbook.nist.gov/cgi/cbook.cgi?ID=C7732185&Units=SI&Type=IR-SPEC&Index=1#IR-SPEC, from the Coblentz Society's evaluated infrared reference spectra collection), and FIG. 4 presents a more detailed FTIR spectra of water shown with and without atmospheric correction. FIG. 5 compares the water FTIR spectrum of FIG. 3 with a basella rubra leaf FTIR spectrum at room temperature.

There are significant differences between the FTIR spectra of various types of leaves and other vegetation, as illustrated in FIGS. 5-10. FIG. 6 is an FTIR spectrum of peat (source: Comparative Study of Peat Composition by using FT-IR Spectroscopy; Janis Krumins, Maris Klavins, Valdis Seglins; Material Science and Applied Chemistry; 26; (2012)). FIG. 7 presents FTIR spectra of strawberry leaf powder before and after ammonium adsorption. FIG. 8 is an FTIR spectrum of an extract powder of *Olea Europaea* leaves. FIGS. 9 and 10 are FT-IR spectra of native cellulose (FIG. 9) and regenerated cellulose (FIG. 10).

Of course, the hydration of a vegetative canopy can vary with the soil water availability. FIG. 11 presents FTIR spectra that illustrate changes in reflectance for a magnolia leaf as the leaf dries and the water content declines. The approximate absorption ranges for the three major vegetative IR absorption components, chlorophyll A, chlorophyll B, and carotenoids, are shown in FIG. 12.

These differences between the spectral signatures of different vegetative environments increase the challenge and the importance of accurately matching camouflage to the spectral signature of the specific vegetative environment in which it is used.

What is needed, therefore, is a camouflage system and method that can protect an asset from spectrum signature detection by emulating the visual, and IR spectral signatures of surrounding vegetation, and that can adapt to changes in the spectral background signature in a variable background environment, without requiring maintenance and transport of multiple, redundant camouflage covers.

SUMMARY OF THE INVENTION

A camouflage signature management system and method are disclosed that provide field-adaptable control for managing the visual and IR spectral signature displayed by a camouflage cover, so that the displayed spectral signature can be adapted to emulate a variety of different vegetation background environments without requiring multiple, redundant camouflage covers.

The camouflage cover of the disclosed system mimics the spectral signature of surrounding vegetation in both the visible and infrared wavelengths. Embodiments of the disclosed camouflage system further include a radar subsystem as an inner layer that is designed to absorb and scatter air search radar. Various embodiments include thermal management features and/or electromagnetic shielding that are either incorporated in the radar layer or provided in a separate thermal layer. Embodiments also include UV reflectors to help manage solar gain and reduce the heat load. Embodiments include additional features that provide structural support to the camouflage layers and overall shaping that helps to avoid detection by LIDAR.

The disclosed camouflage cover includes at least one "channel" (also sometimes referred to herein as a "vascular system" or "liquid-circulating channel") formed between an upper "first" boundary layer and a lower "second" boundary layer through which a water-containing liquid is circulated. In some embodiments the circulating liquid is water and the second boundary layer is water permeable, so that the water is able to evaporate through the lower second boundary layer so as to adjust the IR signature of the camouflage, while fixed colors and/or patterns are used to emulate the visible appearance of a surrounding environment. In other embodiments the circulating liquid is a dye solution (also referred to herein as a colorant solution). In embodiments the liquid-circulating channel extends over substantially the entire surface of the camouflage cover. In embodiments the liquid-circulating channel includes a central feed and a liquid distribution medium that wicks the water or dye solution from the central feed and distributes it throughout the liquid-circulating channel, and thereby throughout the surface of the camouflage cover. In some embodiments the liquid distribution medium is a pulp, such as a cellulosic pulp, while in other embodiments the liquid distribution medium is a fabric. It should be noted that the terms "pulp" and "fiber" are used herein generically to refer to any liquid distribution medium included in a channel, unless the context requires otherwise. The central feed can be embedded in the pulp, or can run below the pulp or fabric in the channel.

Embodiments that are configured to circulate a dye solution as the circulating liquid differ as to how strongly the dye is retained by the liquid distribution medium. In some embodiments, the dye is strongly retained, such that delivery of dye to the cover is only needed when it is necessary to re-adapt the spectral signature to a changing environment. In some of these embodiments, an oxidizing and/or flushing solution is used to remove and/or de-colorize the dye retained by the liquid distribution medium in preparation for introducing a new dye. Embodiments include a plurality of liquid distribution medium layers of varying types, wherein the lower liquid distribution medium layer or layers function mainly to distribute the dye solution throughout the liquid-circulating channel while the upper layer or layers of liquid distribution medium function mainly to retain the dyes. Embodiments further include super-absorbent polymers (SAP) in the liquid distribution medium, or in the upper layer(s) of liquid distribution medium if a plurality of such layers is included, so as to enhance retention of the dye.

In other embodiments that are configured to circulate a dye solution as the circulating liquid, the dye is not strongly retained by the liquid distribution medium in the liquid-circulating channel, and in some of these embodiments the dye solution is continuously circulated through the liquid circulating channel and the dye in the liquid distribution medium remains in dynamic equilibrium with the dye in the central feed, even when the spectral signature of the camouflage cover is not changing. This approach allows for more rapid adaptation to changing environments, for example when protecting a moving asset. In addition, this approach allows for the use of less stable dyes having spectral signatures that more closely match the spectral signatures of naturally occurring bio-chromophores, because the dyes are continuously replenished in the fiber and therefore need not be as stable as dyes used in embodiments that only exchange the dye when the environment changes.

The IR signature of vegetation arises mainly from two sources, which are the bio-chromophores included in the vegetation itself and the water vapor that is continuously transpired from the vegetation. The present invention matches the IR signature of vegetation by emulating both of these sources. In particular, the dye solution that is circulated in embodiments through the vascular system comprises bio-chromophores and/or other dyes that closely match the natural IR signatures of bio-chromophores in vegetation. In addition, water is caused to continuously evaporate from the camouflage cover, closely emulating the natural transpiration of water from vegetation. In combination, these two features provide a close and adaptable match to the IR signature of surrounding vegetation. The evaporation of water also cools the system, typically by as much as ten degrees Fahrenheit, which emulates the cooling of vegetation by transpiration.

In some embodiments, the evaporated water is drawn from the dye solution. Some of these embodiments include only one channel, which is the liquid-circulating channel formed between the first and second boundary layers. Other embodiments include a separate "water-circulating" channel below the dye solution channel that circulates mainly or only water, and from which the water is continuously evaporated. These embodiments provide flexible, independent control of the dye circulation rate and water evaporation rates. Accordingly, in all embodiments at least one channel is bounded by at least one boundary layer that is permeable to water, so as to allow water to continuously escape from the channel into the surrounding environment. In embodiments, petalation of the camouflage cover allows water that escapes from the rear of the camouflage cover to escape through the front of the camouflage cover, rather than being trapped behind the camouflage cover. This process emulates the natural escape of transpired water from behind leaves. In embodiments, the liquid-circulating channel follows a circuitous path, such as a serpentine path, that is cooperative with petalation provided in the camouflage cover. This approach enhances the ability for escaping water to be released from behind the camouflage cover so as to emulate water evaporation from vegetation.

In embodiments that include at least two channels, reference is made herein to an upper "liquid-circulating" channel that carries a dye solution, and at least one lower "water-circulating" channel that carries water, and may or may not include a dye. In embodiments that include only one channel, the channel is nevertheless sometimes referred to herein as the "upper" liquid-circulating channel, because it is located at or close to the upper surface of the camouflage cover.

In embodiments, the IR and visible signature match of the camouflage cover to surrounding vegetation is further augmented by permanently printing additional dye colors and/or patterns onto one or more layers of the camouflage cover. These can include a layer of material that is below the liquid-circulating channel and/or a semi-transparent "garnish" layer situated above the liquid-circulating channel. The visual appearance of the camouflage cover in some of these latter embodiments is therefore determined by the underlying color of a dye solution that is circulating through the liquid-circulating channel, which is field-adaptable, as viewed through the semi-transparent colors and pattern of the garnish layer, which are fixed. Embodiments that include a liquid distribution medium layer within the liquid-circulating channel can also apply permanently printed colors and patterns onto the liquid distribution medium layer(s).

Earth observation methods are able to make subtle distinctions between the spectral signatures of at least six typical pigments in vegetation. The approximate absorption ranges for the three major components, chlorophyll A, chlorophyll B, and carotenoids are shown in FIG. 12. In embodiments, bio-chromophore dyes that are chemically similar or identical to these components are circulated at least in the liquid circulating channel, so as to match the IR signature as well as the visible signature of the environment.

Bio-chromophore dyes can be used in embodiments where the dyes in a dye-solution that is circulated through the liquid-circulating channel remain in dynamic equilibrium with the central feeds, because the dyes or "colorants" are continually renewed within the liquid-circulating channel. However, it is not possible to use bio-chromophores such as naturally occurring chlorophylls and carotenoids as permanently printed dyes because they are not stable and do not provide a durable dye system. Instead, embodiments of the present invention combine a plurality of organic dyes in novel combinations to build up a permanently printed color or pattern with a spectral result that emulates chlorophyll A, chlorophyll B, and carotenoids in both visible and infrared wavelengths. Embodiments include reactive dyes, direct dyes, disperse dyes and/or other dye types according to the type of vegetation that is to be simulated.

In general, the organic dyes that can be used as permanent dyes to emulate the spectral properties of vegetation in the visible wavelengths are not effective absorbers in the infrared wavelengths. For this reason, embodiments of the invention employ at least two families of dyes for permanent printing, one being directed to visible wavelengths and the other being directed to infrared wavelengths. Some embodiments include a third group of dyes directed to far infrared wavelengths.

In embodiments, circulating and/or permanently printed dyes that are located in layers below the upper, liquid-circulating channel do not contribute to the IR signature match of the layer, such that a wider variety of dyes having desirable chemical and visible properties can be used in those lower layers.

In embodiments, the camouflage cover is a laminate of two transparent film layers that function as first and second boundary layers, between which the liquid-circulating channel is formed as a two-dimensional region through which liquids such as dye solutions can be circulated. In some of these embodiments the first, upper film boundary layer is impervious to water, while the lowest boundary layer is water-permeable. In some of these embodiments, the upper film boundary layer is a layer of polyethylene terephthalate ("PET").

In similar embodiments, the camouflage cover is a laminate of three film boundary layers, wherein the liquid-circulating channel is formed between the upper first and second film boundary layers, and a second "water-circulating" channel is formed between the second film boundary layer and a lower "third" film boundary layer. In some of these embodiments, the first and second film boundary layers are impenetrable to water and can be PET layers, while the lower third film boundary layer is water permeable. Accordingly, a dye solution can be circulated through the upper liquid-circulating channel while water from a second, independent liquid supply is circulated through the lower water-circulating channel and allowed to evaporate therefrom. This approach can provide a greater degree of flexibility, as compared to single channel embodiments, in matching and emulating both the visible and IR signatures of the surrounding vegetation.

In embodiments, the channel or channels is/are filled with a liquid-distribution medium such as a fabric or "pulp" providing a wicking action that distributes liquids throughout the channel(s).

The disclosed camouflage cover is configured in several aspects to emulate the natural spectral signatures of vegetation. In some embodiments a solution of bio-chromophore dyes is circulated through the uppermost, "liquid-circulating" channel of the camouflage cover, so as to closely emulate the visible and IR contributions of the surrounding vegetation. According to embodiments of the disclosed method, bio-chromophore dyes are selected that are chemically similar to the biochemical components of the surrounding vegetation, so that by blending the dyes to match the visible color of the surrounding vegetation, the surrounding IR signature is matched as well, because the dyes are chosen to have full IR spectral matches to their natural analogues.

Simultaneously, in embodiments, water is allowed to continuously evaporate through the water-permeable lowest boundary layer in a manner that emulates the natural transpiration of leaves and other vegetation.

In embodiments, at least one of the channels in the laminate camouflage cover is divided by seams into internal passages that direct liquids through circuitous paths, such as serpentine paths, within the channel(s). In some of these embodiments, the camouflage cover is cut along at least some of the seams, so as to create petalation that physically emulates the structure of leaves or other vegetation. This petalation also helps to avoid trapping of the evaporated water beneath the camouflage cover.

In embodiments, a wax coating is provided on the outer surface of the camouflage cover. The wax coating is selected for high UV reflectance, and in some of these embodiments the upper "first" boundary layer and/or the wax coating is embossed, so as to de-gloss the top surface of the camouflage cover, improve the retention of the wax on the upper surface, and avoid smooth planar surfaces that would tend to create specular reflections and might be detectable e.g. by LiDAR.

In embodiments, as the spectral signature of the surrounding vegetation changes, for example due to changes in temperature and sunlight intensity, and/or due to changes in location (when protecting mobile assets), the visible and IR signature of the camouflage can be adapted by changing the formulation of a dye solution that is circulated through the upper liquid circulating channel, and by adjusting the flow rate and/or pressure of the water that is circulated in the lower, water circulating channel.

In embodiments where circulated dyes are strongly retained by a liquid distribution medium such as fiber or pulp sap included in the liquid circulating channel, the visual signature of the camouflage cover can be changed by circulating a flushing and/or oxidizing liquid through the liquid circulating system so as to remove or decolorize the previously delivered dyes, selecting a replacement dye solution formulation that will match the surrounding visual signature, and introducing the replacement dye solution into the camouflage cover.

In other embodiments, the dye solution uses "fugitive" colorants that do not bind strongly with the liquid distribution medium, making them easier to remove and replace. In some of these embodiments, the dye solution is continuously circulated between a liquid reservoir and the upper liquid distribution channel, so that the liquid in the liquid distribution medium remains in dynamic equilibrium with the dye solution in the reservoir. In certain of these embodiments, the displayed color signature can be adjusted simply by adjusting the properties of the dye solution in the reservoir.

These approaches to managing the visual signature of the camouflage cover can be combined. For example, large, discontinuous changes in the surrounding environment can be addressed by flushing/oxidizing and replacing the dyes retained in the liquid distribution medium, while smaller, incremental changes in the visual environment can be addressed in near-real time by circulating dye solution continuously from a reservoir through the upper liquid circulating channel and making periodic or continuous adjustments to the dye solution in the reservoir.

The Dye Solution

The dye solution or colorizing liquid that is circulated through the liquid circulating channel in embodiments is sometimes referred to herein generically as comprising a dye, coloring agent, or colorant mixed with "water," but it will be understood that while some embodiments utilize pure water mixed with a coloring agent, other embodiments further include carrier surfactants, biocides, preservatives, antifreeze, and/or other additives. Still other embodiments use dye solutions that do not include water.

In embodiments, the colorant that is included in the colorizing liquid includes a chromophore-containing bio-organic compound and/or other bio-organic colorants. Note that the terms "bio-organic" and bio-chromophore are used herein to refer to chemical compounds that are similar or identical to compounds found in vegetation.

Colorants used in various embodiments include chlorophyll, carotene, curcumin, alizarin, purpurin, and (in limited quantities) indigo, derived from both synthetic and natural sources. Colorizing liquids used in some embodiments include, "fugitive" colorants that do not bind well to a liquid distribution medium such as pulp fibers and are thereby easily flushed from the system, and other colorants known in the art are used in embodiments that have good visible and IR signatures and are readily oxidized. In various embodiments, elimination of a color previously applied to the pulp or other liquid distribution medium can include any combination of flushing the colorants out of the liquid distribution medium and chemically de-colorizing the chroma or other colorants of the colorizing liquid in the liquid distribution medium by oxidation or other chemical means.

Some embodiments that include bio-chromophors and/or other coloring agents require wetting agents and/or surfactants to help control the flow of colorizing liquid through the liquid circulating channel and into the liquid distribution medium. In addition, leveling agents are required in some embodiments so as to ensure uniform dye take-up throughout the liquid distribution medium.

Embodiments use colorizing liquids containing bio-organic colorants that are "fugitive," i.e. do not bind strongly to the liquid distribution medium, and are thereby easily flushed from the liquid distribution medium and/or oxidized by common oxidizers, so that an active, field adjustable color match can be made in real time to surrounding local conditions. Many bio-organic molecules that include chromophores also offer the advantage of providing a good visible and IR spectral match to vegetation that is present in the surrounding environment. Various embodiments also add surfactants and/or other additives to the circulated water of the dye solution so as to enhance and accelerate the wicking process and transport of bleach and/or other oxidizers, chromatic modifiers, and new colorants into the liquid distribution medium base layer.

In various embodiments, pre-measured color modification containers are prepared in advance with chromophores and/or other colorant additives that can be added to a liquid feed reservoir when needed so as to quickly adapt the camouflage cover to match designated visual and IR background environments.

Colorizing Liquid Supply Modes

In embodiments, a colorizing liquid is supplied to the liquid circulating channel according to at least three operating modes, which are:
1) Color removal mode, whereby a previously introduced colorant is removed by flushing and/or by an oxidizing or other decolorizing agent;
2) Color supply mode, whereby a new color is introduced into the liquid distribution medium; and
3) IR signature management mode, whereby colorizing liquid that is at equilibrium with the coloring of the liquid distribution medium is supplied to the liquid circulating channel so as to replace liquid that is evaporated from the liquid distribution medium, thereby emulating the transportation and evaporation of water that naturally occurs in foliage. In embodiments, the colorizing liquid is circulated through the liquid circulating channel, and can be pre-cooled so as to further manage the heat signature of the camouflage system.

In embodiments of the disclosed camouflage method, the displayed visual signature is changed by:
1) eliminating some or all of the previously added colorizing liquid from the liquid distribution medium; and
2) introducing a replacement colorizing liquid into the liquid circulating channel comprising a new mixture of chromophores and/or other bio-organic colorants that creates the desired visual signature.

In embodiments, eliminating some or all of the previously added colorizing liquid from the liquid distribution medium is accomplished by:
A) flushing the previously added colorants out of the liquid distribution medium layer by applying a flushing liquid to the liquid circulating channel; and/or by
B) oxidizing the previously added colorizing liquid by
   a) applying an oxidizing treatment to the liquid circulating channel to destroy some or all of the previously added colorants; and
   b) applying a passivation solution to the liquid circulating channel so as to neutralize the oxidizing treatment.

In various embodiments, colorizing liquid is continuously applied to the liquid circulating channel, even after a desired visual signature has been achieved. The colorizing liquid can be circulated between the liquid circulating channel and a colorizing liquid reservoir, and/or evaporated from the liquid circulating channel and replaced by fresh colorizing liquid from a reservoir. In some of these embodiments, for example when protecting a moving vehicle and/or as ambient lighting conditions change, the displayed visual and IR signatures can be continuously adjusted in real or near-real time to match the surrounding environment by making appropriate adjustments to the liquid colorant supply, for example by adding colorants to the colorizing liquid reservoir, diluting the colorizing liquid in the reservoir, switching between different colorizing liquid reservoirs, adjusting the rate at which colorizing liquid is delivered to the liquid circulating channel, etc. In some of these embodiments the colorizing liquid is continually exchanged between the liquid circulating channel and the liquid distribution medium, and changes made to the colorizing liquid supply lead to rapid changes in the displayed color signature.

Automated Signature Management

Embodiments of the present invention include a signature management system that provides active, automated management of the visual and/or IR signature that is presented by the camouflage cover. According to these embodiments, the signature management system comprises an automatic or semi-automatic sensing system that measures the visual and/or IR signature of the surrounding environment and compares it to the signature of the camouflage cover. The signature management system then causes the colorizing liquid supply system to adjust the formulation of the dye solution and the rate of water evaporation until the visual signature of the camouflage cover matches the surrounding environment. In embodiments, the signature management system evaluates differences in hue and/or a and b values between the camouflage cover and the environment, and in various embodiments the signature management system evaluates differences in L or luminosity. Adjustment of the camouflage visual signature can include replacement of a previously delivered colorizing liquid and/or adjustment of colorants added to a continuously delivered or circulated colorizing liquid.

Automated control of the displayed visual and/or IR signature can include decolorization as well as increased or altered colorization. For example, if the surrounding environment grows lighter, decolorization may be the most effective method for maintaining a signature match.

In various embodiments, for example embodiments that include only one channel (referred to as the liquid circulating channel), the match between the temperature and IR signature of the camouflage cover and the surrounding environment is actively maintained by automatically controlling the rate and/or pressure at which the dye solution is supplied to the liquid circulating channel, thereby controlling the rate at which water is evaporated from the liquid circulating channel so as to emulate the natural transpiration that is present in surrounding vegetation. As noted above, for other embodiments that include a plurality of channels, the rate of water evaporation can be controlled by adjusting the rate and/or pressure of the water being circulated in a separate, lower channel.

Pattern Management

In changing light, or in situations where there is self-shadowing of the camouflage cover due to low sun angles, the camouflage cover in some embodiments includes two or more camouflage zones that have separate channel systems, thereby enabling separate adjustment of the visual and/or IR signatures in the zones, for example of the sun-facing and shadowed segments of the camouflage cover. Some embodiments that include a plurality of camouflage zones are further able to separately control the zones, for example when protecting a moving asset, so as to provide a visual pattern that adapts to emulate a visual pattern of the surrounding vegetation as the asset transitions between varying locations.

The Fiber Layer

There are various embodiments of the liquid distribution medium (also referred to herein variously as the pulp, fiber layer, and liquid distribution fabric) that suit different needs for specific camouflage applications. In some embodiments, the liquid distribution medium is a liquid-distributing fabric, or a basic cellulosic pulp formed from wood fiber with or without its lignin. In embodiments, the liquid distribution medium is provided in a plurality of regions or sub-layers, which can include, for example, an upper, visible layer and an underlying substrate layer.

In embodiments, the spaces that are formed between the fibers and the surface energy of the fibers in the liquid distribution medium are selected so as to optimize the capillary transport of water. A fiber spacing of between 10 and 300 microns and a surface energy of between 30 and 70 mJ/m2 have been found to transport water effectively. Cellulosic fiber and other types of fiber having both staple and continuous filaments that meet these criteria can be used. In some embodiments, the liquid distributing fibers are preferentially oriented in the liquid path direction of the channel, while in other embodiments the fibers are randomly oriented. Embodiments in which the fibers are directed to follow liquid paths within the channel generally have higher transport rates and provide improved colorant distribution, while embodiments in which the fibers are randomly oriented within the channel are generally lower in cost to manufacture.

In certain embodiments, a super-absorbent polymer ("SAP") such as sodium polyacrylate is included in the liquid distribution medium, or in at least one layer of the liquid distribution medium. Inclusion of an SAP tends to improve retention of the water and colorants in the liquid distribution medium, and thereby improves the color concentration that is achieved. In particular, the SAP in some embodiments swells and closes capillaries in the cellulosic matrix of the liquid distribution medium, so that the water and colorants are stabilized in the cellulosic matrix with improved color stability.

In other embodiments, SAP is omitted or reduced in some or all regions or layers of the liquid distribution medium so as to decrease the time that is required to change the displayed color. Similarly, in various embodiments the thickness of the distribution medium is limited in some or all regions, because thicker layers of liquid distribution medium change color more slowly, and also because thicker liquid distribution medium layers hold and retain more liquid, and therefore can have a much higher mass as compared to thinner layers of liquid distribution medium.

In embodiments, the liquid distribution medium includes a color retention sub-layer that includes an SAP, as well as a liquid transport or wicking sub-layer that does not contain an SAP, and therefore provides rapid transport and delivery of liquids to the retention sub-layer. The transport sub-layer can be attached to the color retention sub-layer by quilting, needling, and/or lamination. In some of these embodiments, the SAP-containing retention sub-layer is located adjacent to the top garnish layer, so that the presented color is well characterized and stable, while the transport pulp sub-layer, which does not contain an SAP, is beneath the retention sub-layer and provides rapid delivery of colorizing liquids to the retention sub-layer.

Garnish Layer

Petalationit should be noted that in embodiments the camouflage cover includes an upper layer of material that is generically referred to herein as the "garnish" layer, although in some embodiments this upper layer does not actually include any structural or visual features that would provide a real or apparent texture to the camouflage cover. In other embodiments, the garnish layer includes virtual petalation features, such as shading, that visually emulates texture. In still other embodiments, the garnish layer includes (or further includes) physical petalation features that provide an actual, physical texture to the camouflage cover.

In embodiments, physical petalation is created by applying a pattern of petalation cuts and/or perforations on the garnish layer that allow flaps or other segments of fabric to deviate from the plane of the fabric while remaining attached to the fabric. In some of these embodiments, the garnish layer is stretched or otherwise manipulated so as to cause these flaps to extend away from the plane of the fabric.

In various embodiments, the petalation features are coordinated with the upper liquid circulating channel, so as to further enhance the emulation of natural foliage. In some embodiments, the petalation features reduces the likelihood of detection by LiDAR.

It should be noted that unless otherwise qualified, the term "petalation" as used herein refers specifically to physical petalation.

In some embodiments, the upper liquid circulating channel includes paths that run in the machine direction of the camouflage cover, as does the pattern of petalation cuts and/or perforations that create physical petalation of the garnish layer.

Transparency

In embodiments, the color change that is caused by infusing the upper liquid circulating channel with colorants is dependent upon the transparency of a permanent pigment color or pattern that is printed on the face of the overlying layer, referred to herein generally as the "garnish" layer. This transparency is controllable during manufacture by control of the substrate properties of the garnish layer, and of the loading rate of the colorants. Embodiments apply a continuous base color to the garnish layer in a dye bath, followed by printing of between three and five colors over the base color.

The transparency (or inversely the opacity) of the garnish layer may be measured by Contrast Ratio Opacity (CROP) methods such as ASTM D2805. The transparency or opacity resulting from image manipulation using graphics editing software tools is not fully predictive of the transparency or opacity of actual textile and other fibrous substrates.

Additional Camouflage Layers

Embodiments of the disclosed camouflage system include a radar subsystem as a layer that is designed to absorb and scatter air search radar. Embodiments further match the cover factor of natural vegetation with respect to LiDAR laser ranging penetration. Various embodiments include thermal management features that are either incorporated in the radar layer or provided in a separate thermal layer. These thermal management features, which manage the thermal signature of the assembly, include any of several mechanisms for thermal management, including evaporation of water from an absorbent layer, use of a convective layer to improve airflow and convective cooling, use of active cooling or heating, and providing of a thermal barrier and/or thermal insulation.

Embodiments include a ground plane thermal shielding base layer as an inner layer providing a simulated ground plane that can be adjusted and configured to match a terrain contour and conceal equipment from LiDAR detection. This innermost layer in various embodiments is a thermal barrier that is opaque to thermal radiation and has a low thermal emissivity, so as to conceal thermal emissions arising from equipment and power sources. In embodiments, this layer also provides mechanical strength and mounting for the remainder of the assembly.

Embodiments of the present invention further include electromagnetic interference ("EMI") shielding.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12 is a graph of the absorption wavelength profiles of three primary chemicals found in vegetation;

FIG. 13A is a simplified cross-sectional diagram illustrating camouflage layers in an embodiment of the present invention;

FIG. 13B is a simplified cross-sectional diagram of an embodiment similar to FIG. 13A that includes a LiDAR protection layer;

FIG. 16A is a simplified cross-sectional diagram of a camouflage cover in an embodiment of the present invention that includes only one channel thorough which dye solution is circulated;

FIG. 16C is a simplified cross-sectional diagram of a camouflage cover in an embodiment of the present invention that includes separate liquid-circulating and water transporting channels;

FIGS. 21-25 are color illustrations of visual camouflage appearances that can be provided in an embodiment where a garnish layer having a "light woodland" color and pattern is combined with light green, dark green, aspen, blue spruce, and red base colors, respectively;

FIG. 27A is a top view of a camouflage cover in an embodiment in which the pulp is divided into two interleaved groups or zones, and the vascular system and colorizing liquid delivery systems are subdivided into corresponding subsets;

DETAILED DESCRIPTION

The present invention is a camouflage signature management system and method that provide field-adaptable control for managing the visual and IR spectral signature displayed by a camouflage cover, so that the displayed signature can be adapted to emulate a variety of different vegetation background environments without requiring multiple, redundant camouflage covers.

The disclosed system is configured in several aspects to emulate the chemical and physical properties of vegetation, and thereby to emulate the natural spectral signatures of vegetation. As used herein the term "spectral signature" refers to the degree to which the vegetative background, and/or the disclosed camouflage cover, absorbs and reflects light as a function of the wavelength of the light (which is sometimes reported in equivalent units of frequency or wave number), over the visible and IR regions of the electromagnetic spectrum. Embodiments of the disclosed camouflage cover also includes printed patterns, petalation, and/or other features that serve to match the physical texture, the UV reflection, the degree of specular reflection, and the visible and IR pattern distributions of the surrounding vegetation.

With reference to FIGS. 13A and 13B, the present invention includes a camouflage cover 1300 that mimics the spectral signature of vegetation in both the visible and infrared wavelengths. Embodiments of the disclosed assembly further include a radar protection layer 1302 as an inner layer that is designed to absorb and scatter air search radar. Various embodiments include thermal management features and/or electromagnetic shielding that are either incorporated in the radar layer or provided in a separate thermal layer 1304. Embodiments also include UV reflectors to help manage solar gain and reduce the heat load. Embodiments include additional features 1306 that provide structural support to the camouflage layers and overall shaping that helps to avoid detection by LiDAR.

Figure 1:
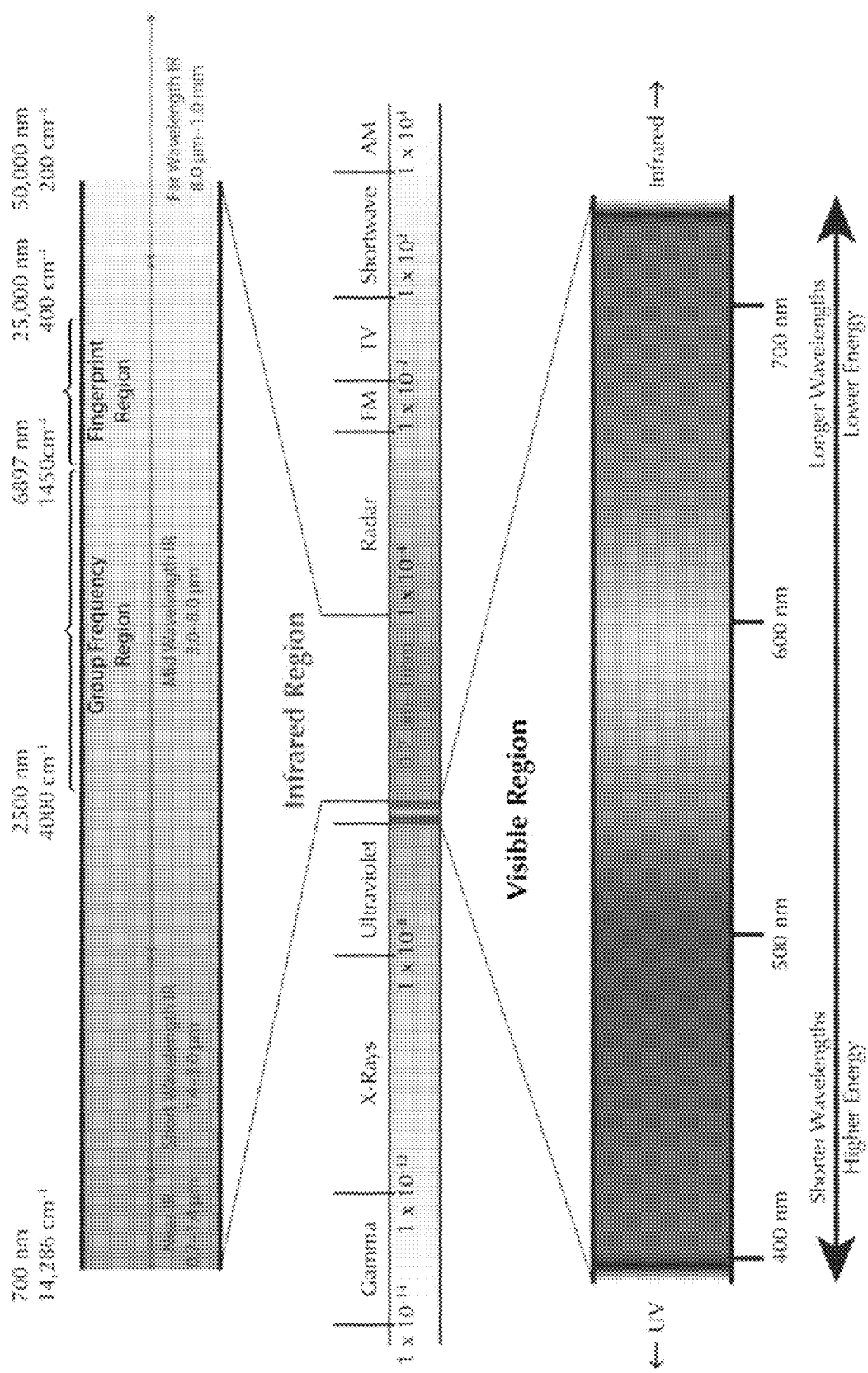
FIG. 1 is an illustration of the electromagnetic spectrum, including the IR, visible, and UV regions.
Figure 2A:
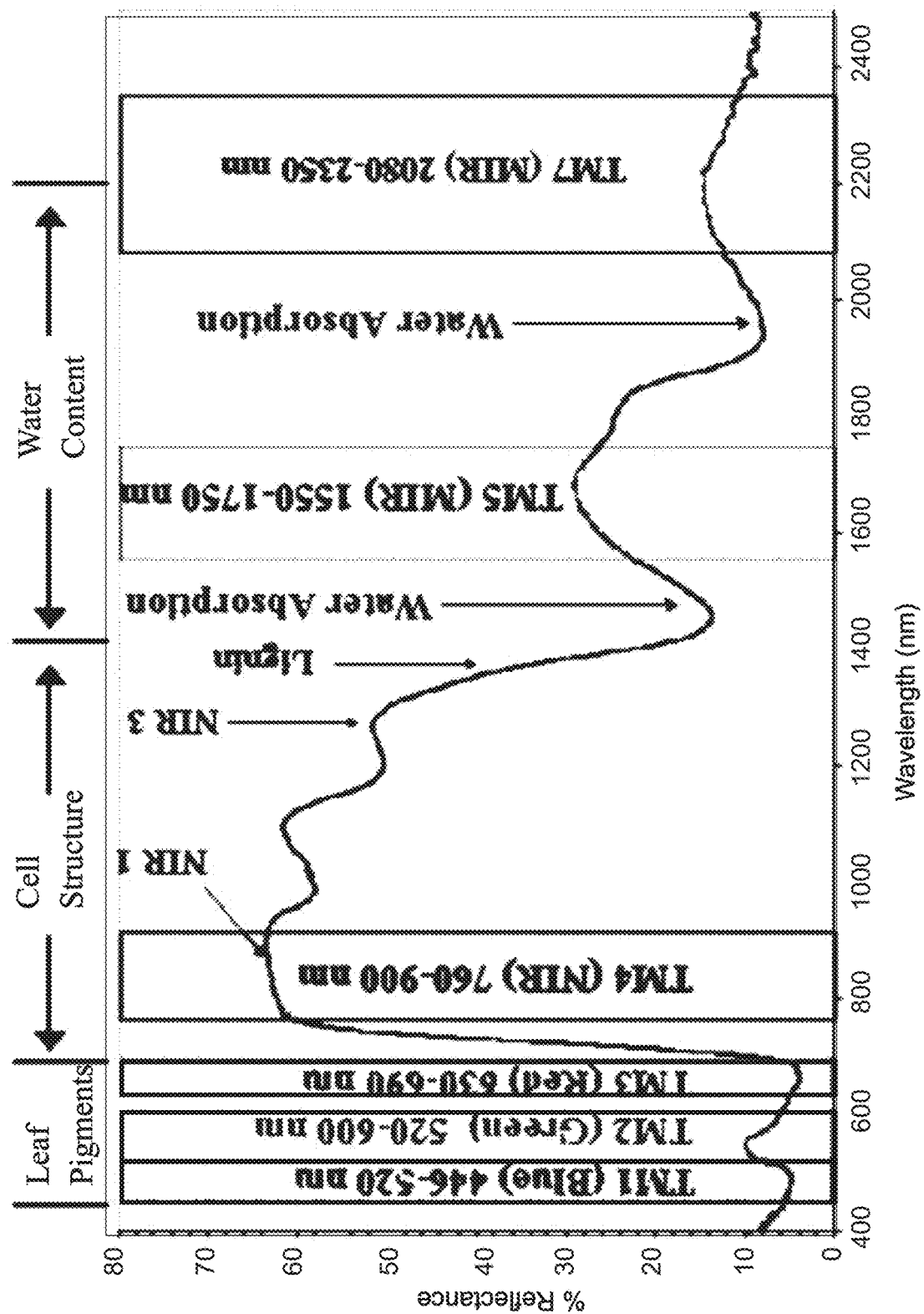
FIG. 2A is a graph of the wavelength absorption spectrum of typical vegetation.
Figure 2B:
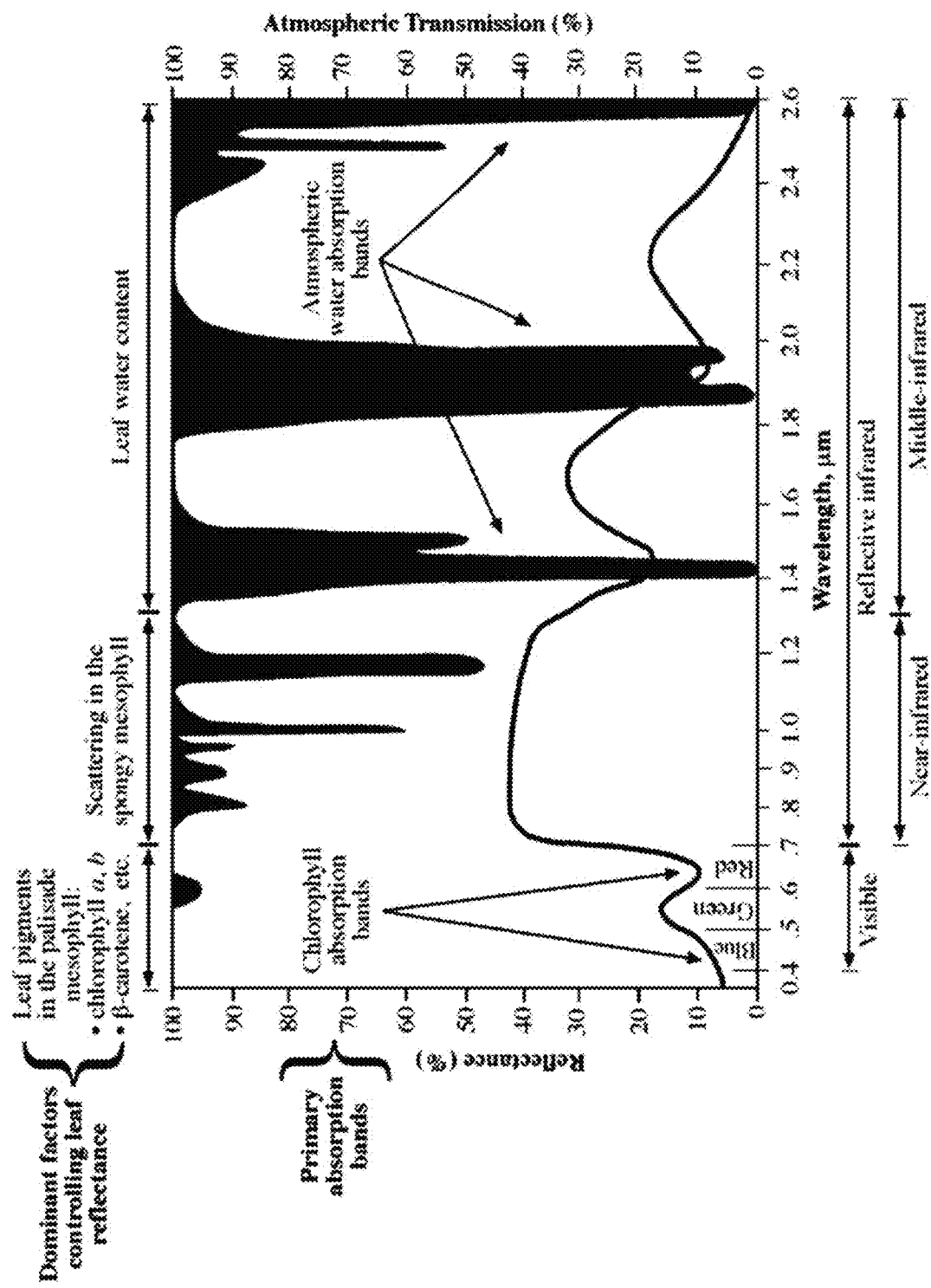
FIG. 2B is an IR spectrum of a leaf.
Figure 3:
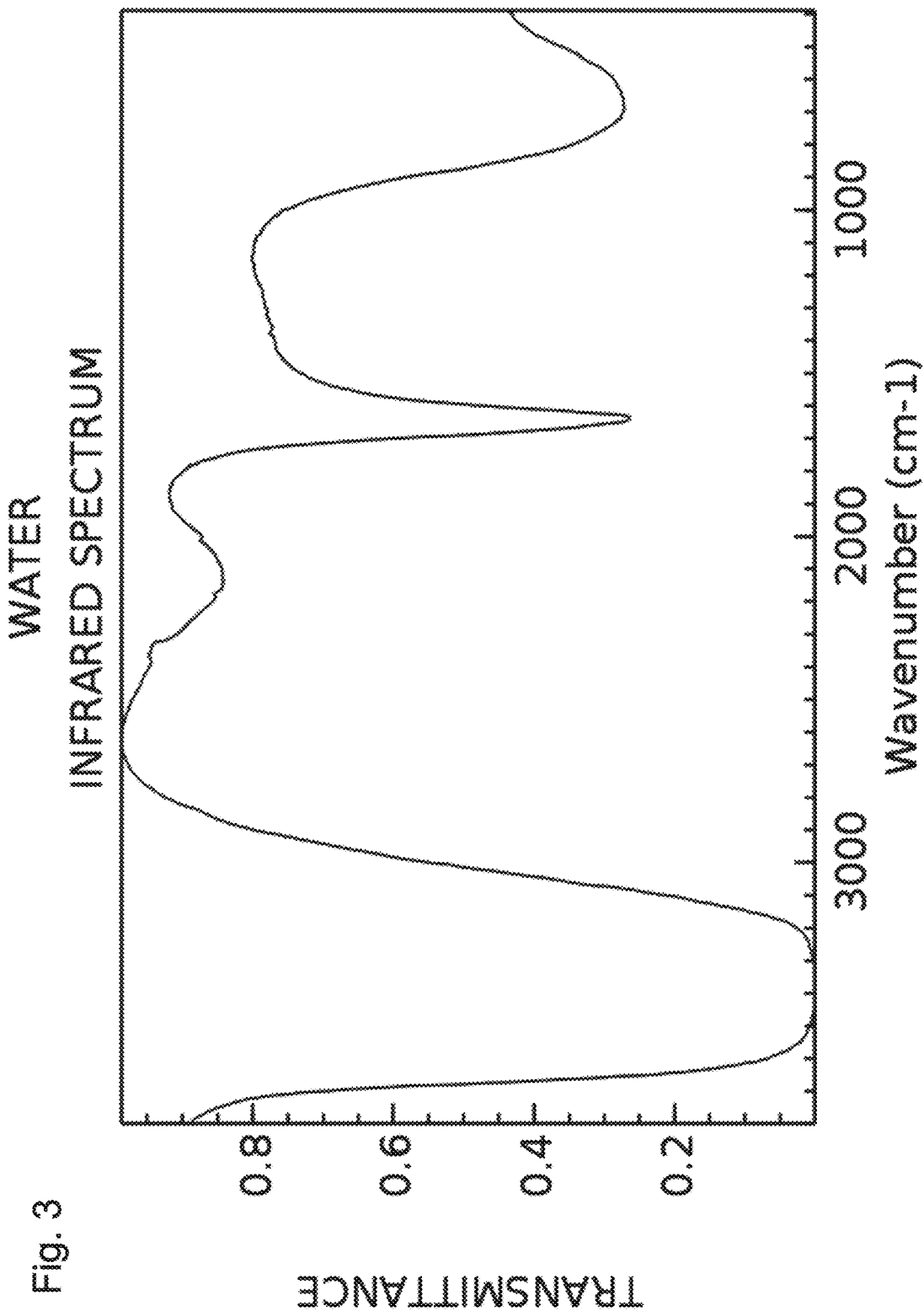
FIG. 3 is an IR spectrum of water.
Figure 4:
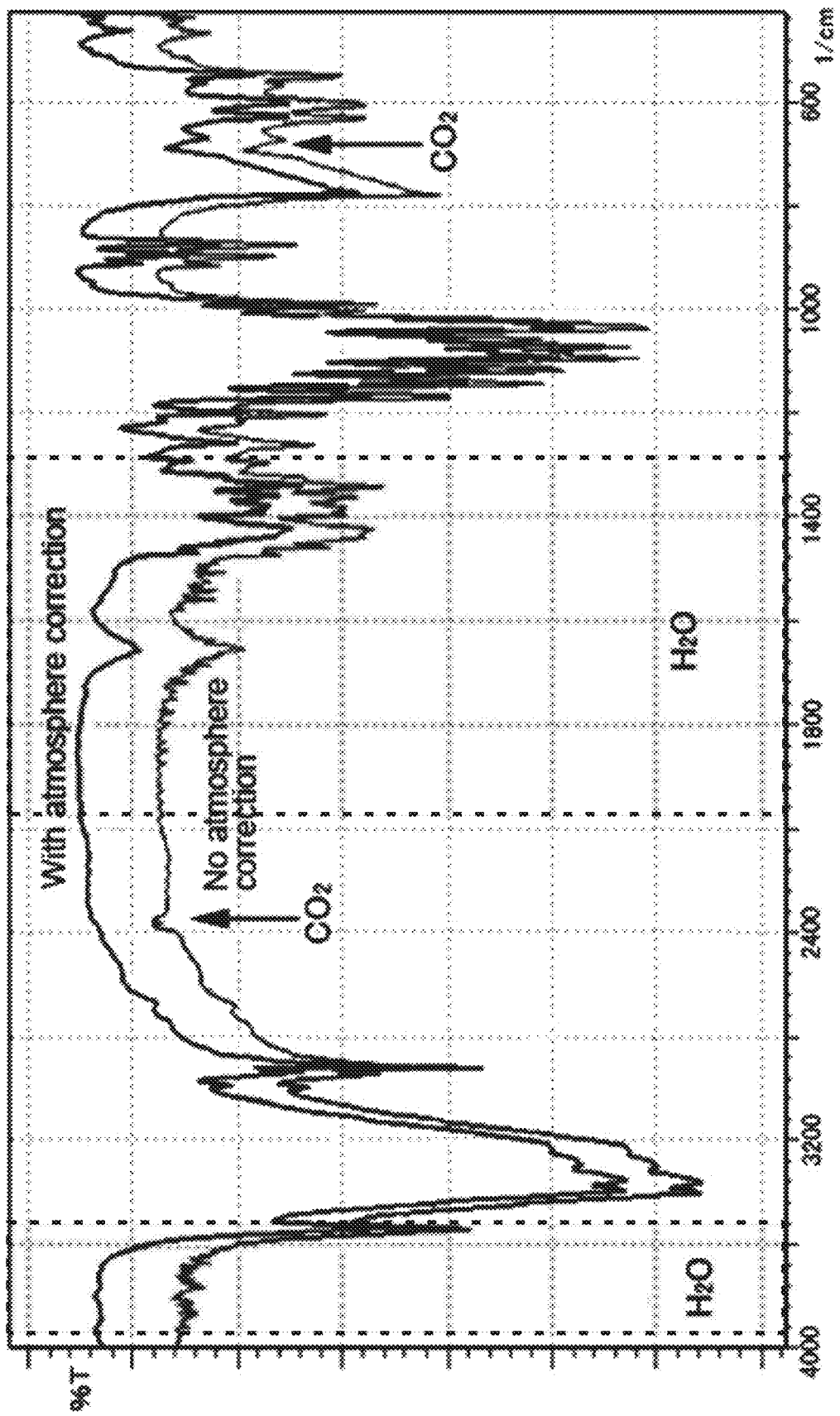
FIG. 4 is a high-resolution spectrum of water vapor shown with and without atmospheric correction.
Figure 5:
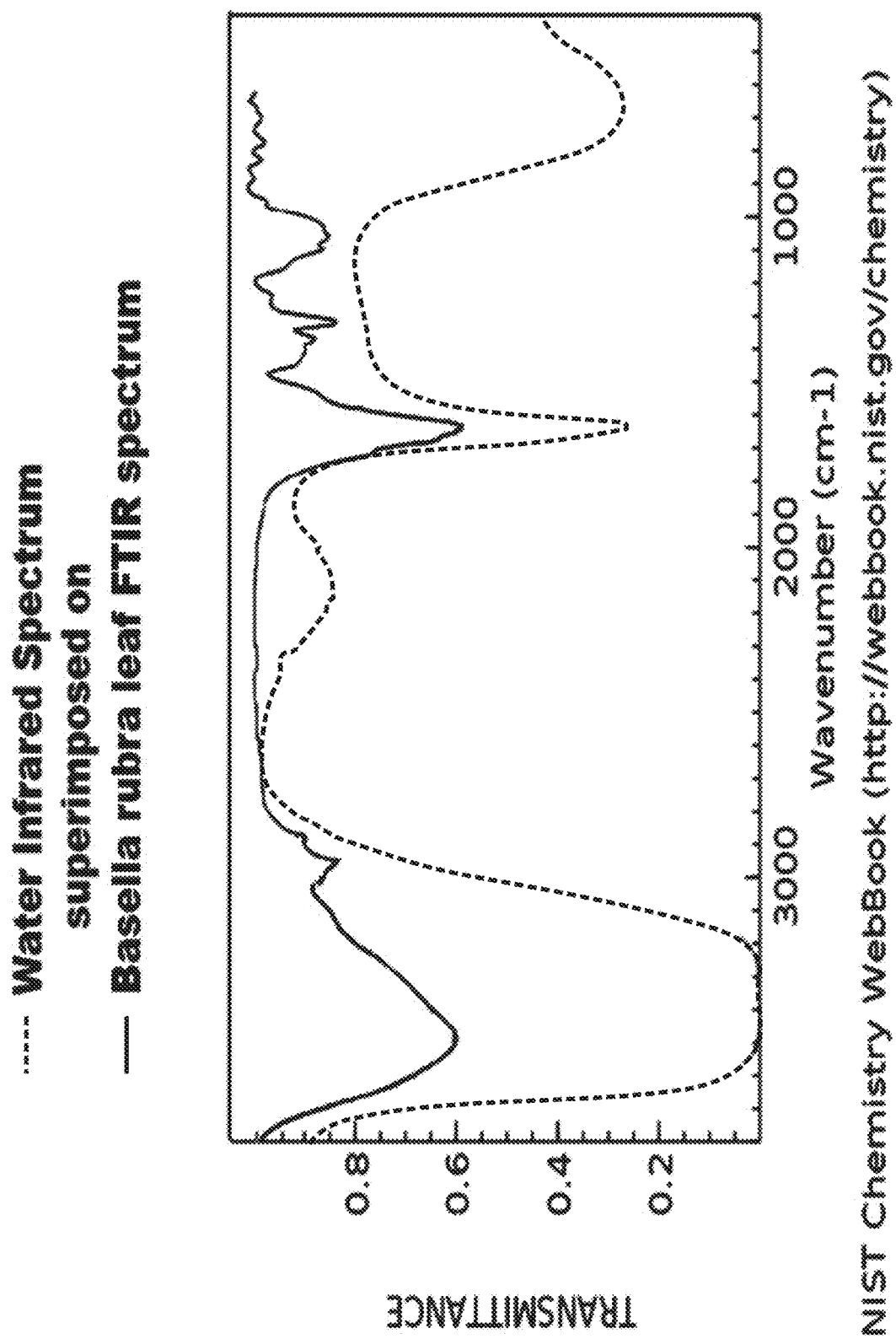
FIG. 5 presents an IR spectrum of water superimposed onto an IR spectrum of a basella rubra leaf.
Figure 6:
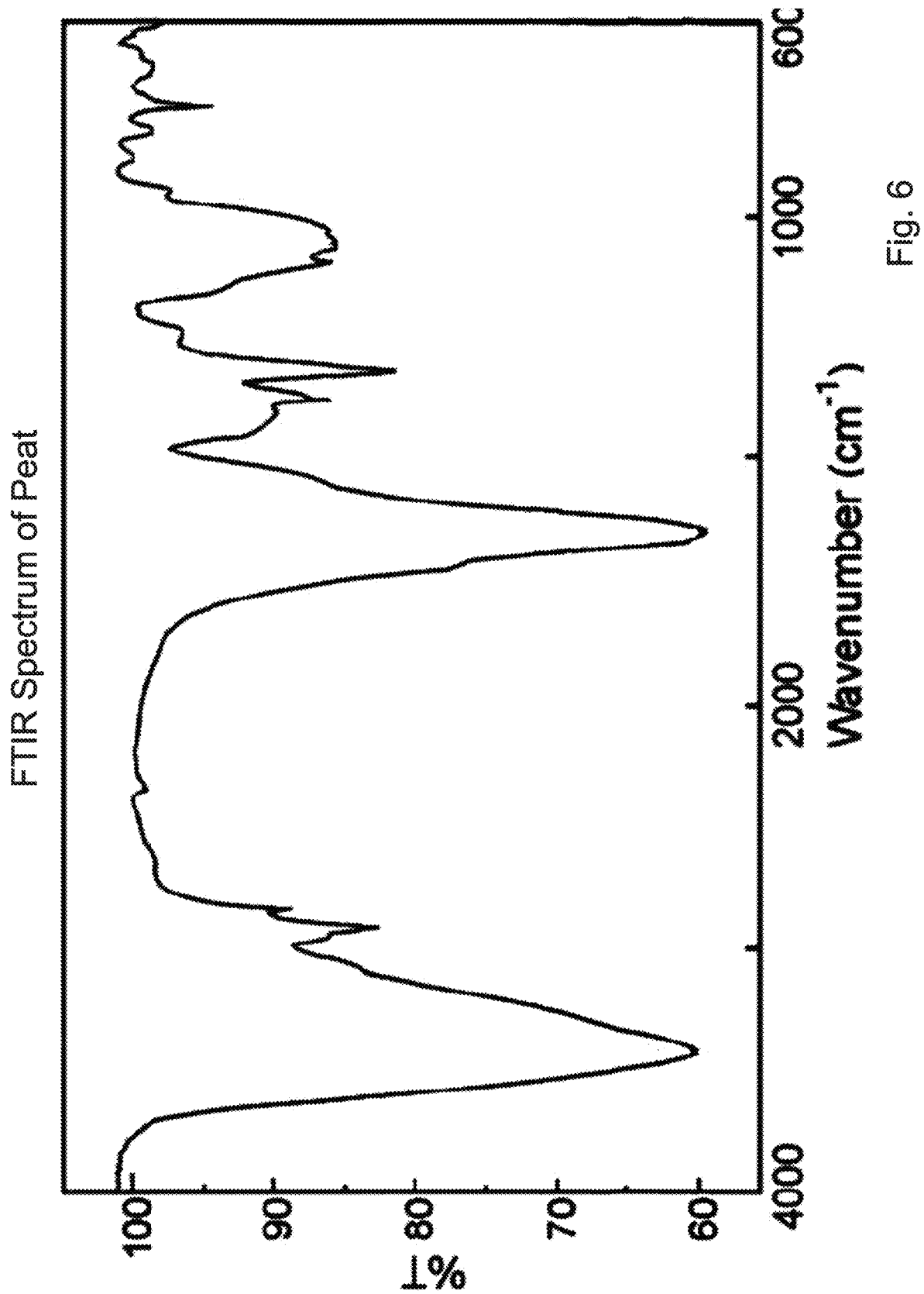
FIG. 6 is an FTIR spectrum of peat.
Figure 7:
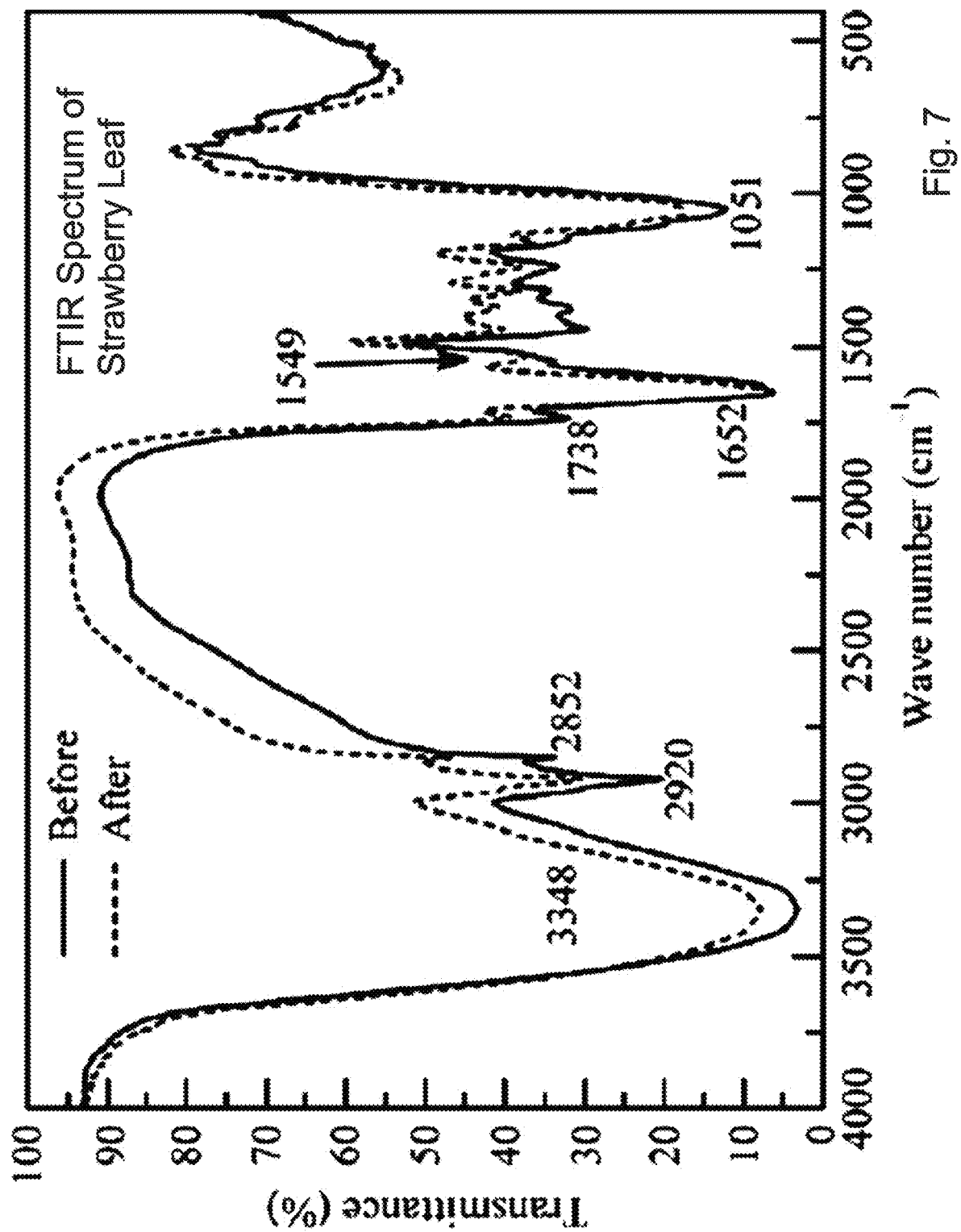
FIG. 7 present FTIR spectra of strawberry leaf powder before and after ammonium adsorption.
Figure 8:
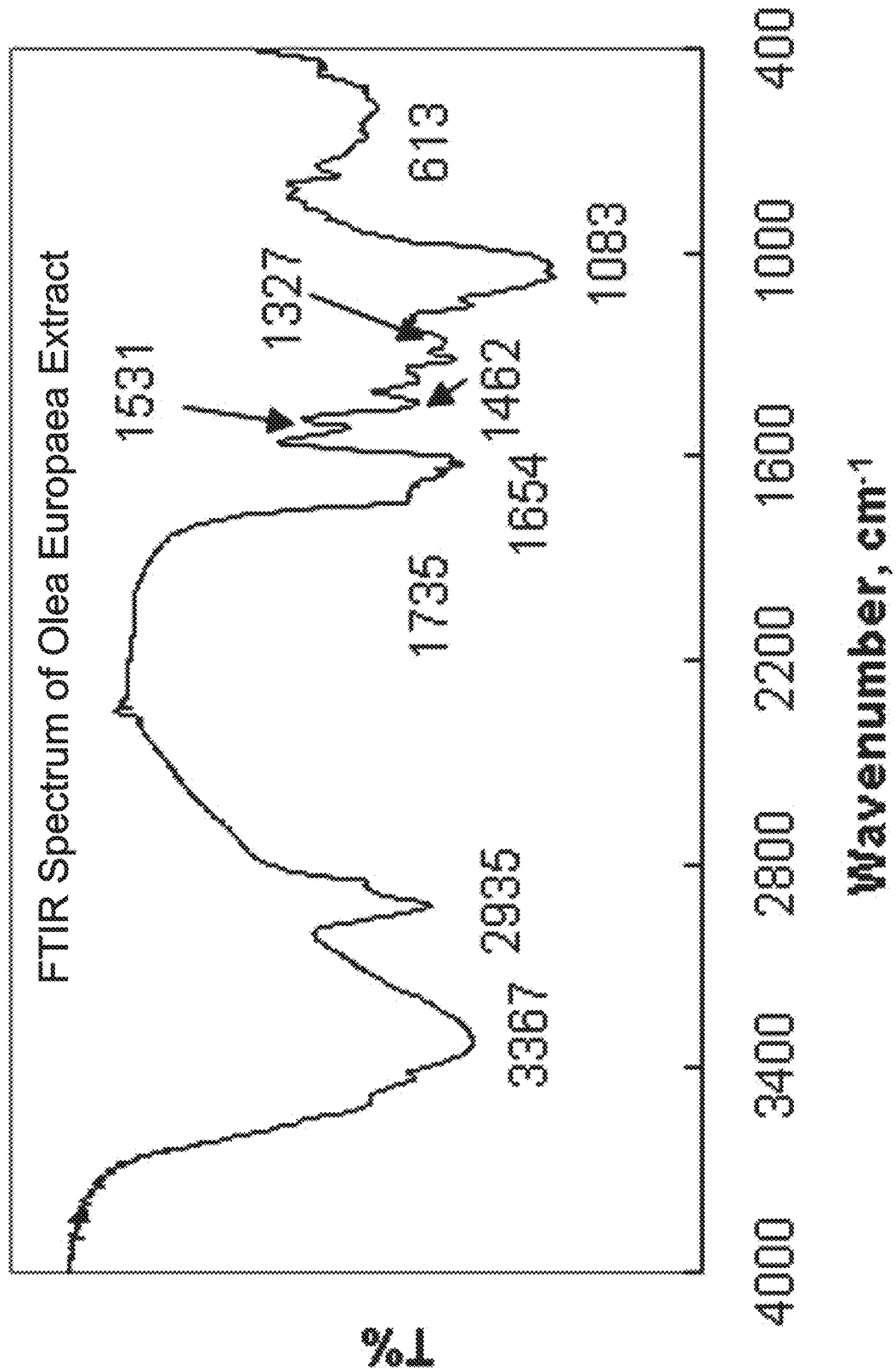
FIG. 8 is an IR spectrum of an extract powder of *Olea Europaea* leaves.
Figure 9:
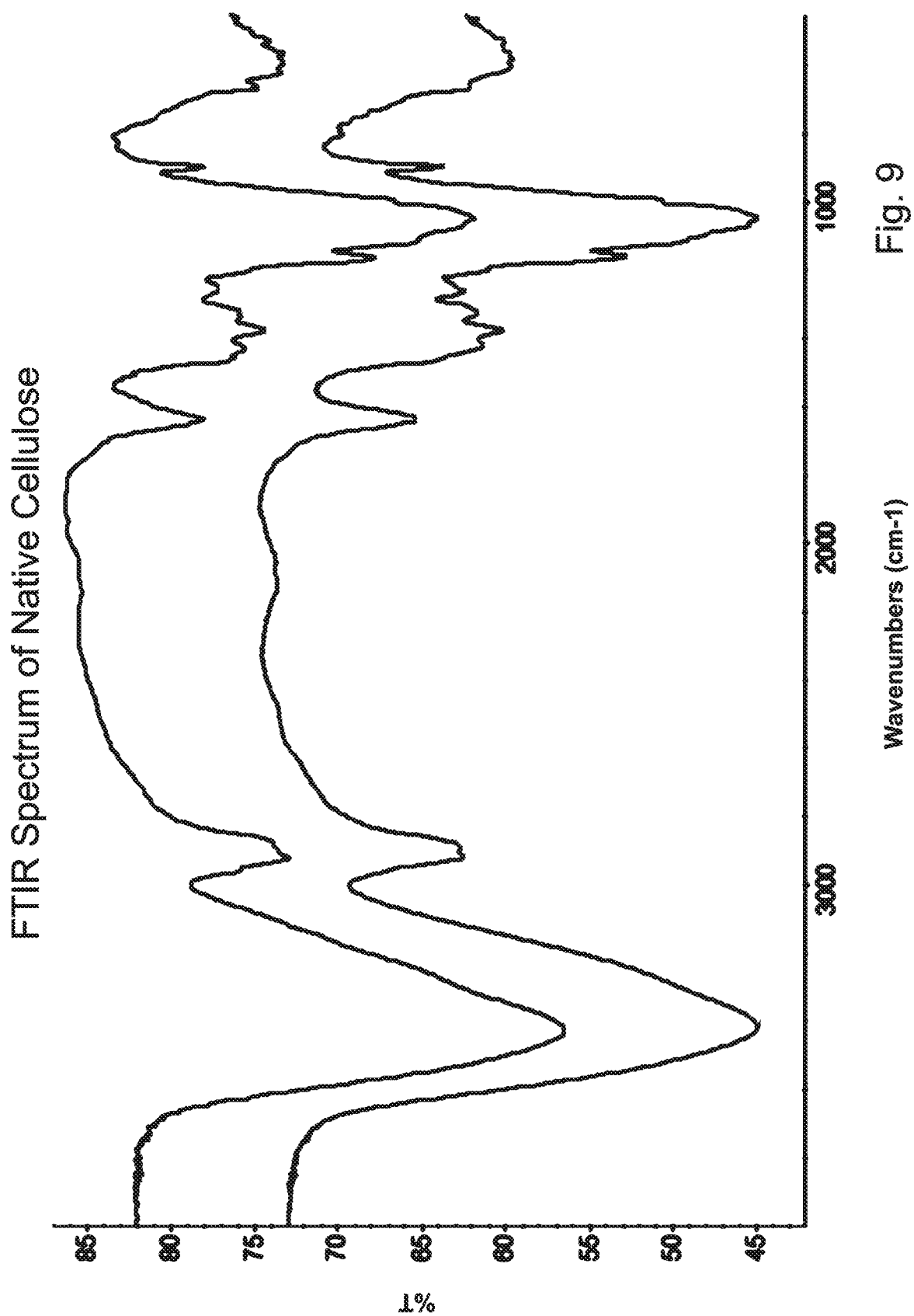
FIG. 9 is an IR spectrum of native cellulose.
Figure 10:
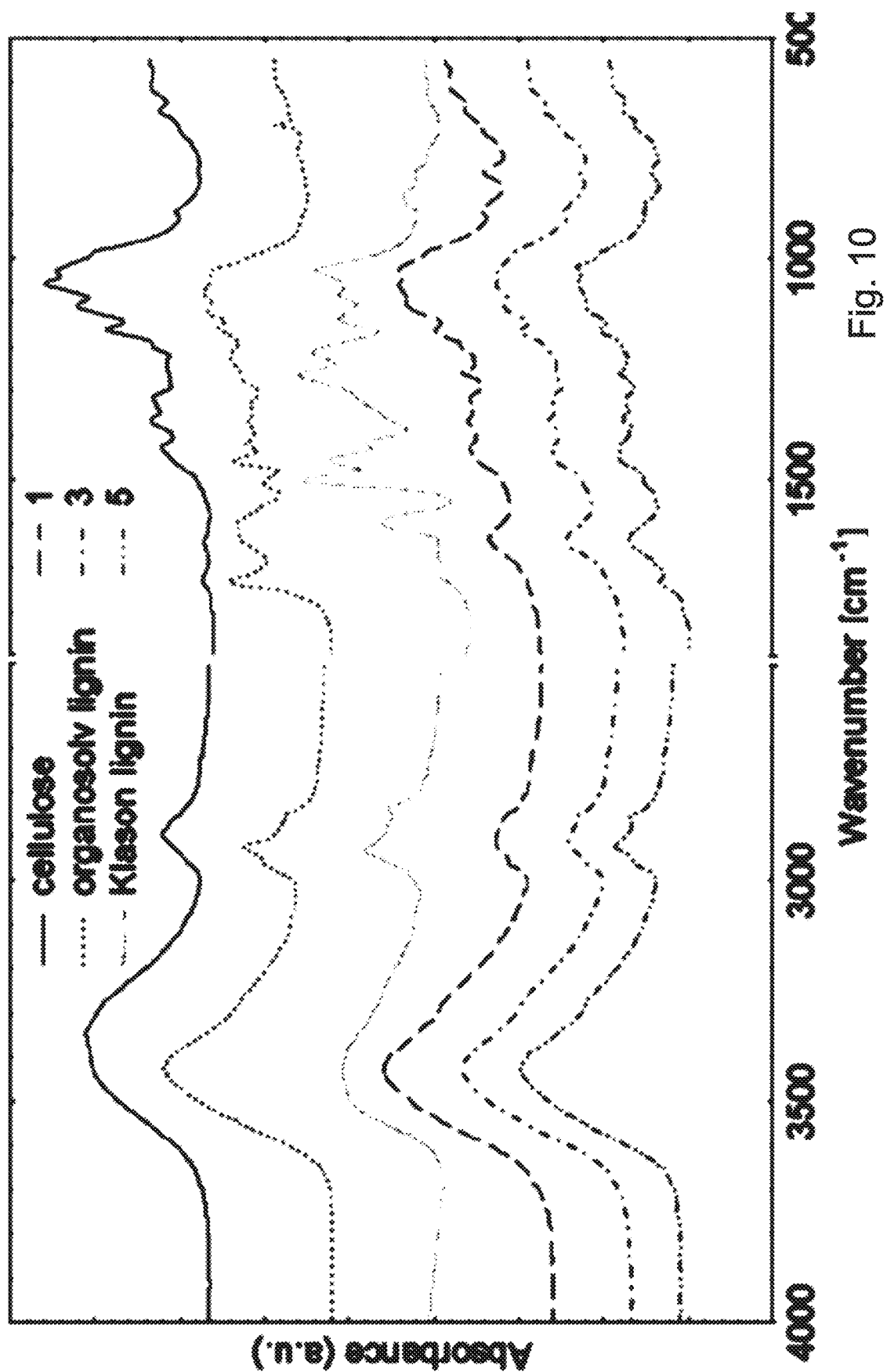
FIG. 10 is an IR spectrum of regenerated cellulose (FIG. 10)
Figure 11:
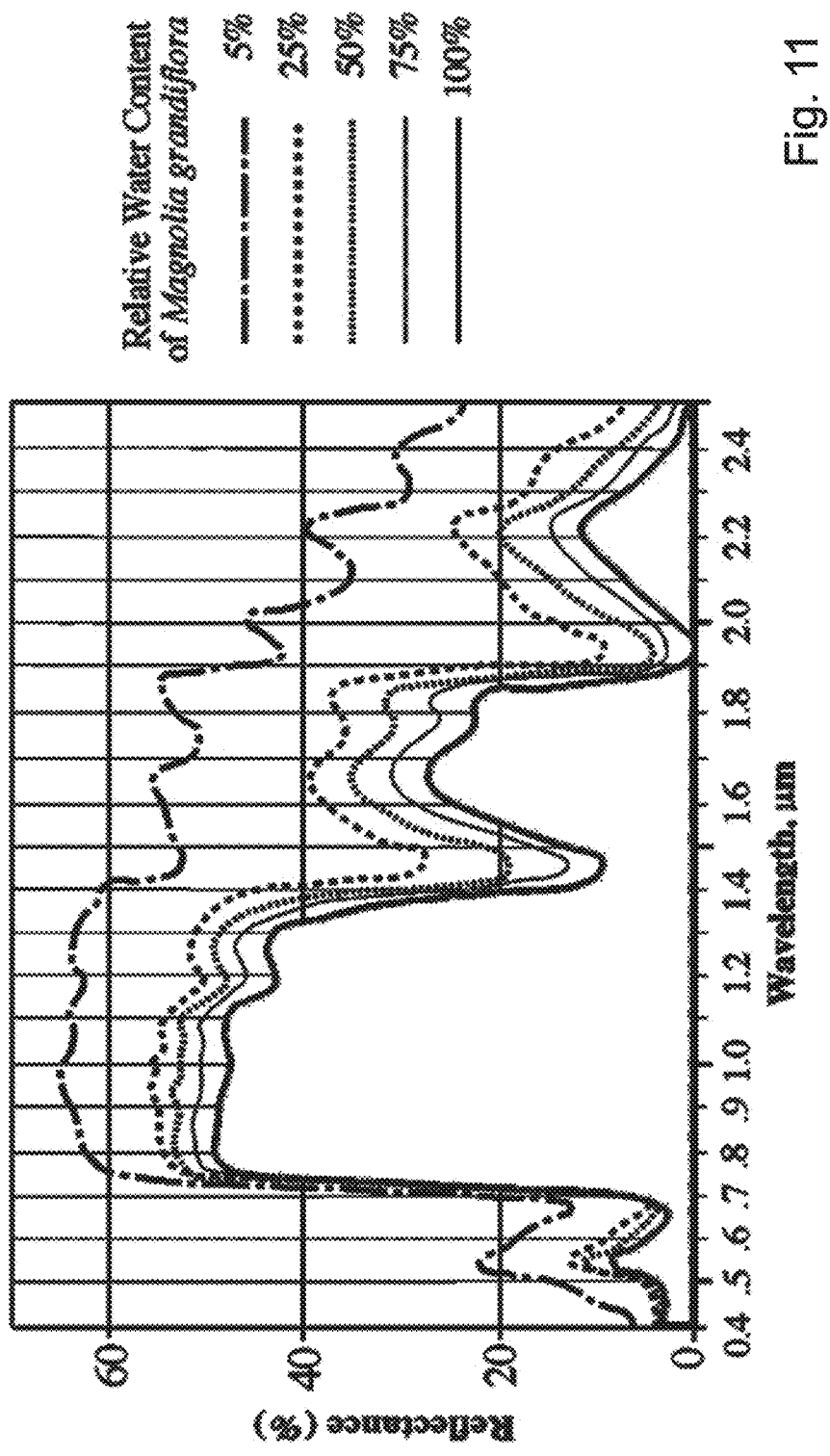
FIG. 11 presents a series of IR spectra of a magnolia leaf obtained at varying degrees of dehydration.
Figure 14A:
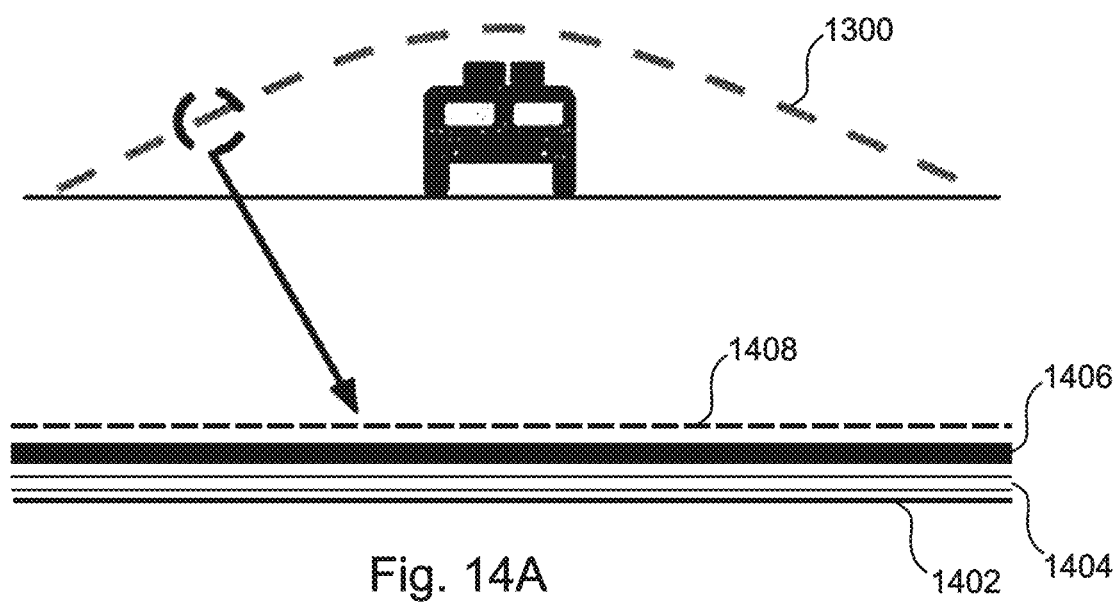
FIG. 14A is a simplified cross-sectional diagram illustrating camouflage layers in an embodiment of the present invention.

With reference to FIG. 14A, the camouflage cover 1300 that adaptively emulates the surrounding visible and IR spectral signature circulates at least one circulating through a liquid-circulating channel 1406 included in the camouflage cover 1300. Water is circulated through the camouflage cover 1300, either as the solvent that carries a circulating dye through the liquid-circulating channel 1406, and/or in a separate water-transporting channel 1404 that is provided beneath the liquid-circulating channel 1406 (discussed in more detail below). The liquid-circulating channel 1406 or the separate water-transporting channel 1404 is bounded on at least one side by a boundary layer 1402 that is semi-permeable to the water, so as to allow water to escape into the surrounding environment, thereby emulating the natural transpiration of water from vegetation, cooling the system, and enhancing the signature match in the IR range.

In embodiments, the IR and visible signature match provided by the circulated dye or dyes is augmented by additional dye colors and/or patterns that are permanently printed onto one or more layers of the camouflage cover. These can include any combination of the layers. For example, in embodiments that include a separate water-transporting channel 1404, permanently printed colors and/or patterns can be printed onto the boundary layer 1402 that is below the water-transporting channel 1404, onto the boundary layer between the two channels, and/or onto a semi-transparent "garnish" layer 1408 situated above the liquid-circulating channel 1406. Printing can also be applied to layers of water-distributing fabric that are included in the channels in some embodiments as the liquid distribution medium."

Figure 14B:
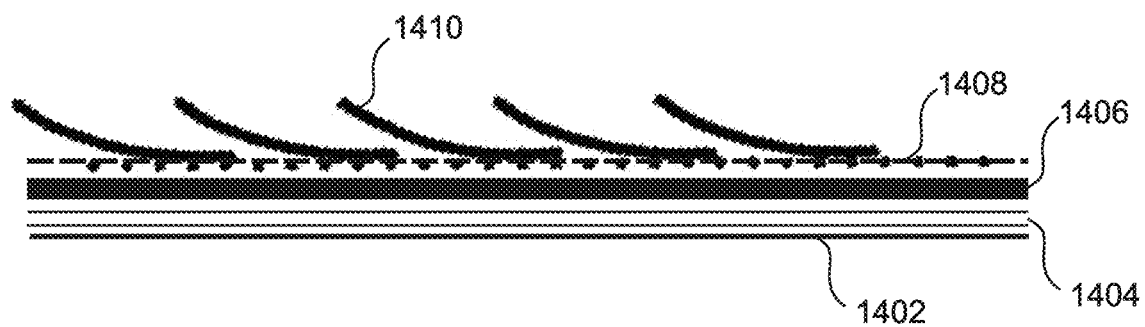
FIG. 14B is a simplified cross-sectional diagram of an embodiment similar to FIG. 14A that includes petalation.

As shown in FIG. 14B, so as to emulate the textural properties of vegetation as well as the spectral properties, in embodiments the outer "garnish" layer 1408 includes physical "petalation" features 1410 that emulate the texture of leaves and other vegetation features. The goal of petalation 1410 is to remove flat specular surfaces and/or to provide self-shadowing and an appropriate range of reflectance that simulates vegetation. In addition, the petalation 1410 in various embodiments provides a mechanism for venting of air and moisture from behind the camouflage cover 1300 when convection is required. It should be noted that the upper layer 1408 is sometimes referred to herein as the "garnish" layer, even though, in some embodiments, it does not include garnish.

The liquid-circulating channel 1406 through which the at least one dye is circulated can include a central feed that carries the dye solution and a surrounding liquid distribution medium, which can be cellulose pulp or a liquid-distributing fabric, that serves to wick the dye solution from the central feed and distribute it into the surrounding region. In some embodiments, the fiber is mixed with a "super-absorbent polymer" or "SAP," said mixture being referred to herein as "pulp-sap," that enhances absorption and retention of the dye solution in the fiber. In other embodiments, SAP is not included in the fiber, so as to facilitate exchange of the dye solution for more rapid adaptation to a changing environment.

Structure Example

Figure 15A:
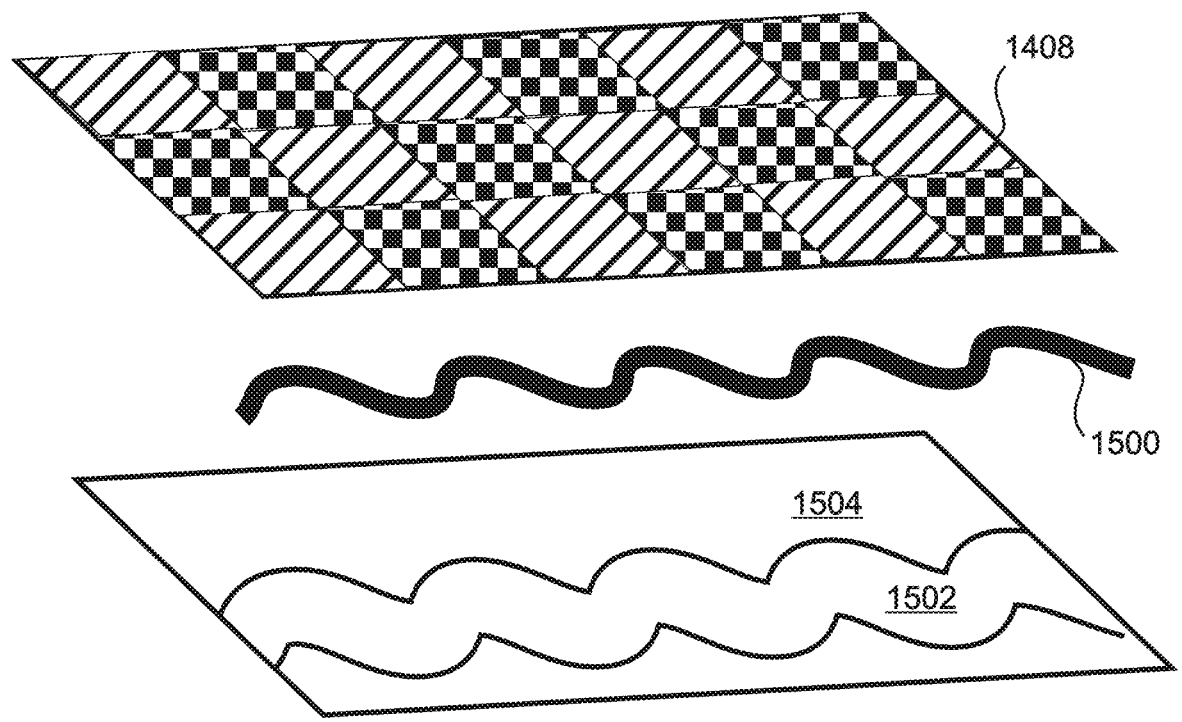
FIG. 15A is an exploded perspective view of an exemplary embodiment in which the pulp and vascular tubing are arranged in a serpentine pattern and quilted between the garnish layer and a backing layer.
Figure 15B:
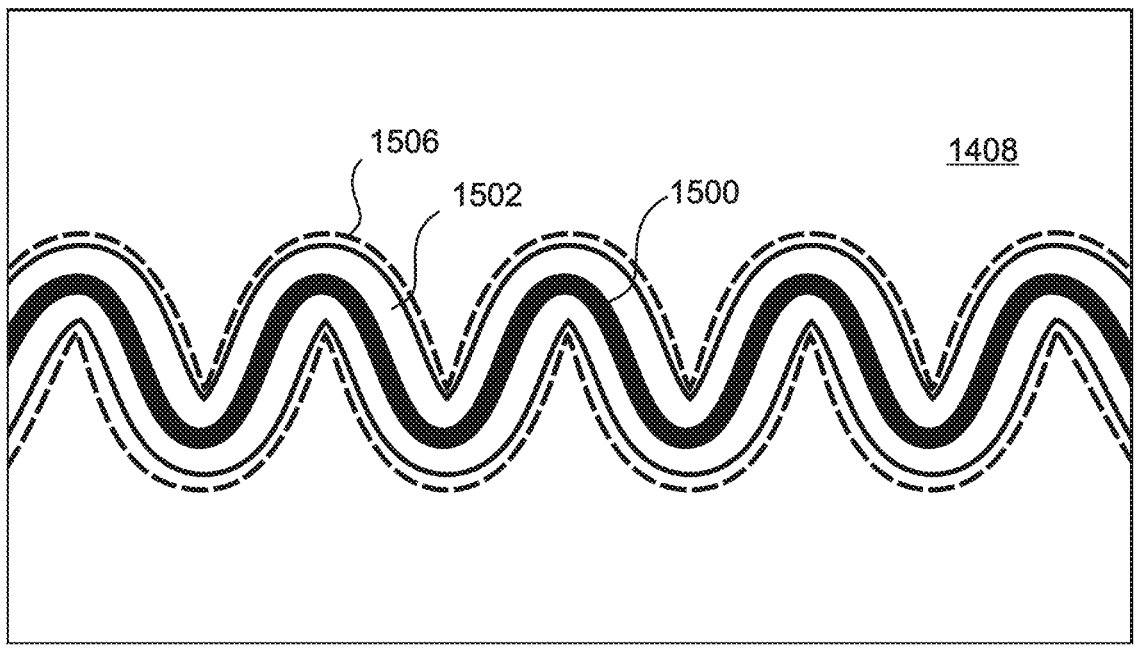
FIG. 15B is a top view of the assembled layers of FIG. 15A.
Figure 15C:
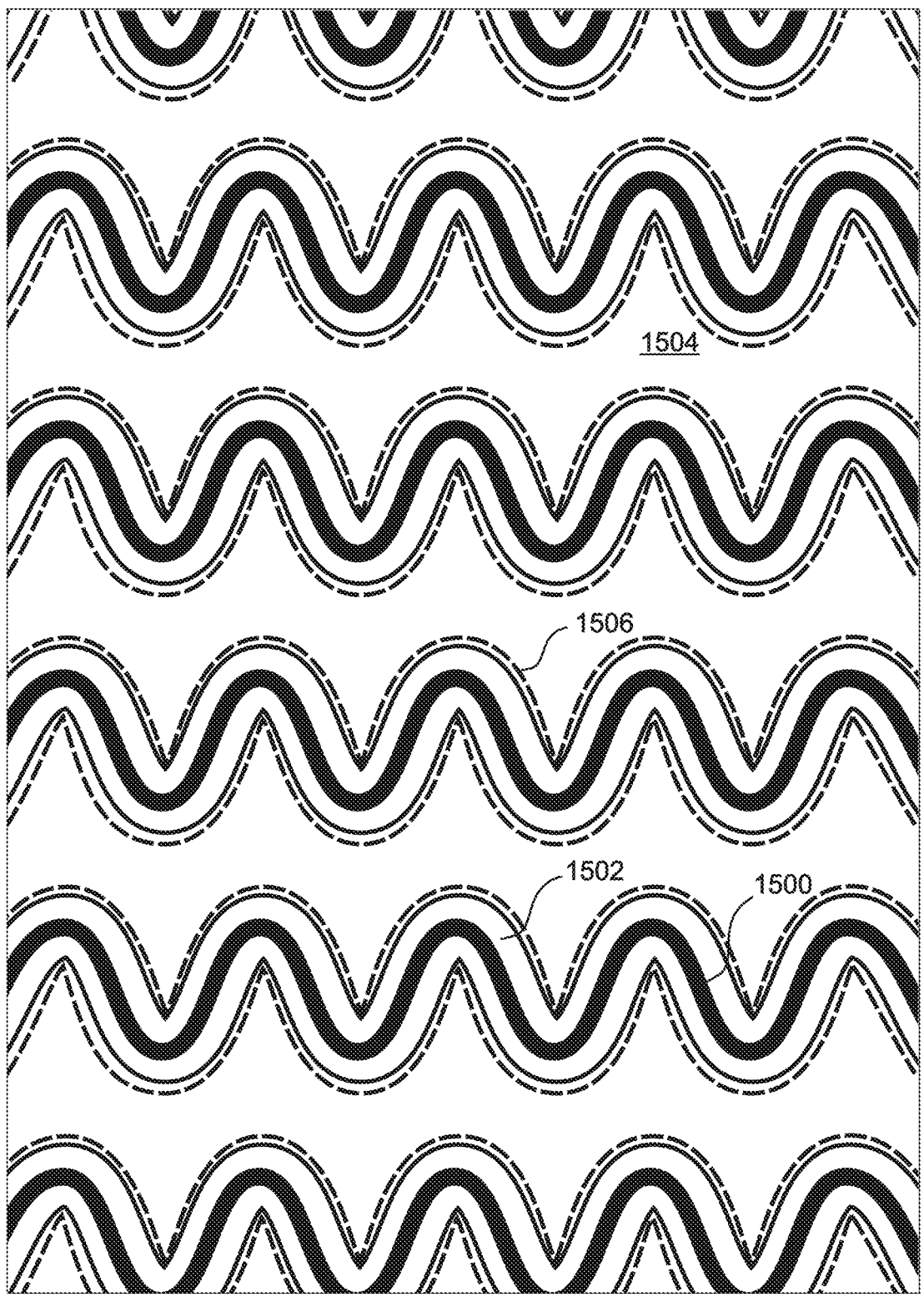
FIG. 15C is a top view of a larger area of the assembly of FIG. 15B.

FIGS. 15A-15F illustrate a specific structural example in an embodiment of the present invention. With reference to FIG. 15A, in this specific example, the liquid-circulating channel 1406 comprises a central feed 1500 and fiber 1502 that are encapsulated or "quilted" between the garnish layer 1408 as the upper boundary layer of the liquid-circulating channel 1406 and an underlying substrate fabric layer 1504 as the lower boundary layer of the liquid-circulating channel 1406. During manufacture, the pulp 1502 is applied to the underlying substrate layer 1504 in a repeated serpentine pattern. The central feed tubing 1500 is applied with the fiber 1502, so that the tubing 1500 is embedded in and surrounded by the fiber 1502. The pre-printed, semi-transparent garnish layer 1408 is then placed on top of the other layers and, with reference to FIG. 15B, stitching 1506 is applied, whereby the stitching includes hemlines that essentially outline the serpentine lines of fiber 1502 and tubing 1500. FIG. 15C illustrates a larger region of the assembled layers 1504,

1502, 1500, 1408, so that the repeated pattern of serpentine lines of fiber 1502, and vascular tubing 1500 can be seen. While the serpentine lines are shown as being somewhat widely separated in FIG. 15C, in embodiments the pulp 1502 extends to cover substantially the entire upper surface of the camouflage cover 1300.

Note that the semi-transparent pattern that is applied to the garnish layer 1408 is indicated in FIG. 15A as a checkerboard pattern. However, for visual clarity, this printed pattern is omitted from FIGS. 15B-15F.

Figure 15D:
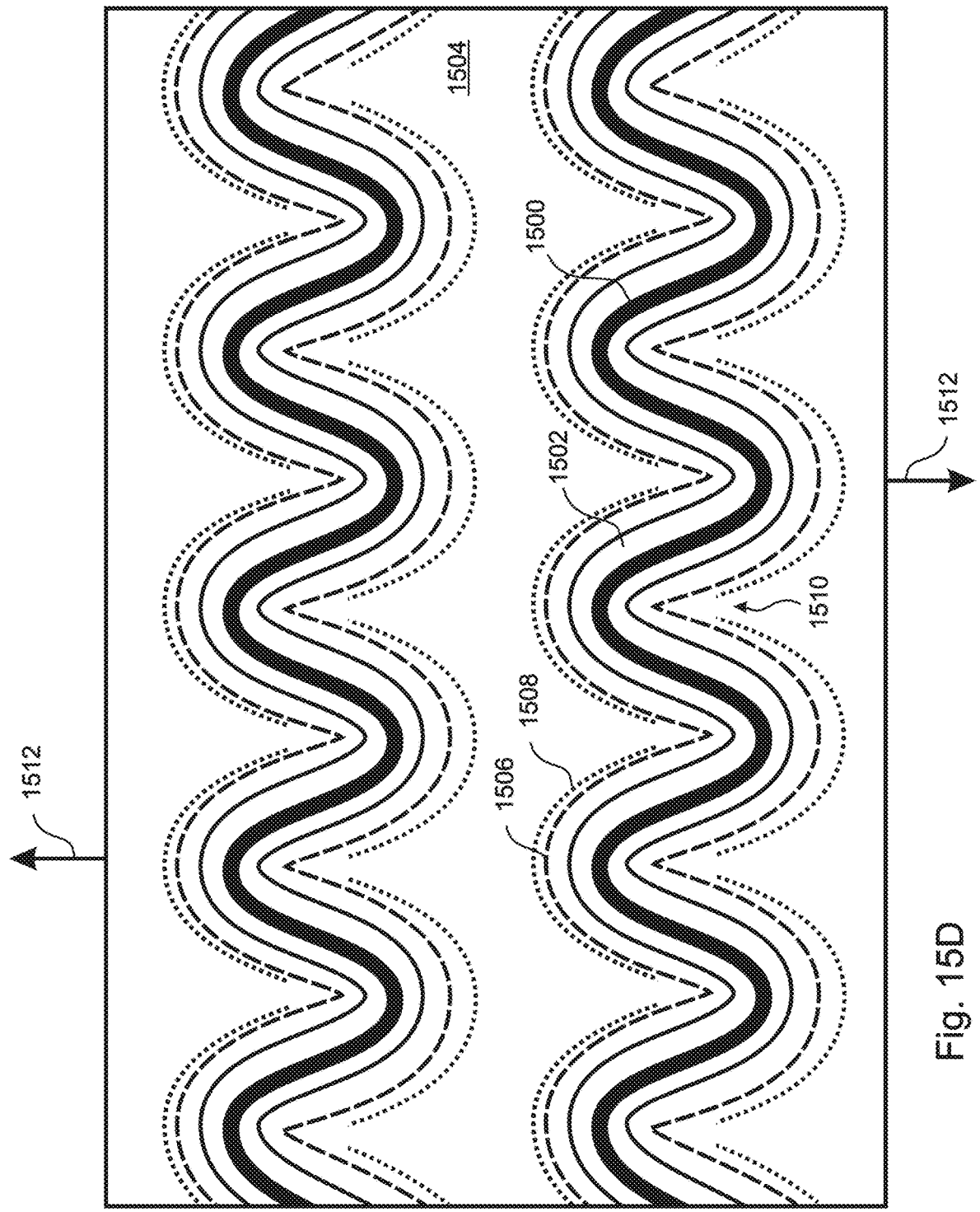
FIG. 15D is a top view of the assembly of FIG. 15A cut and ready for stretching.
Figure 15E:
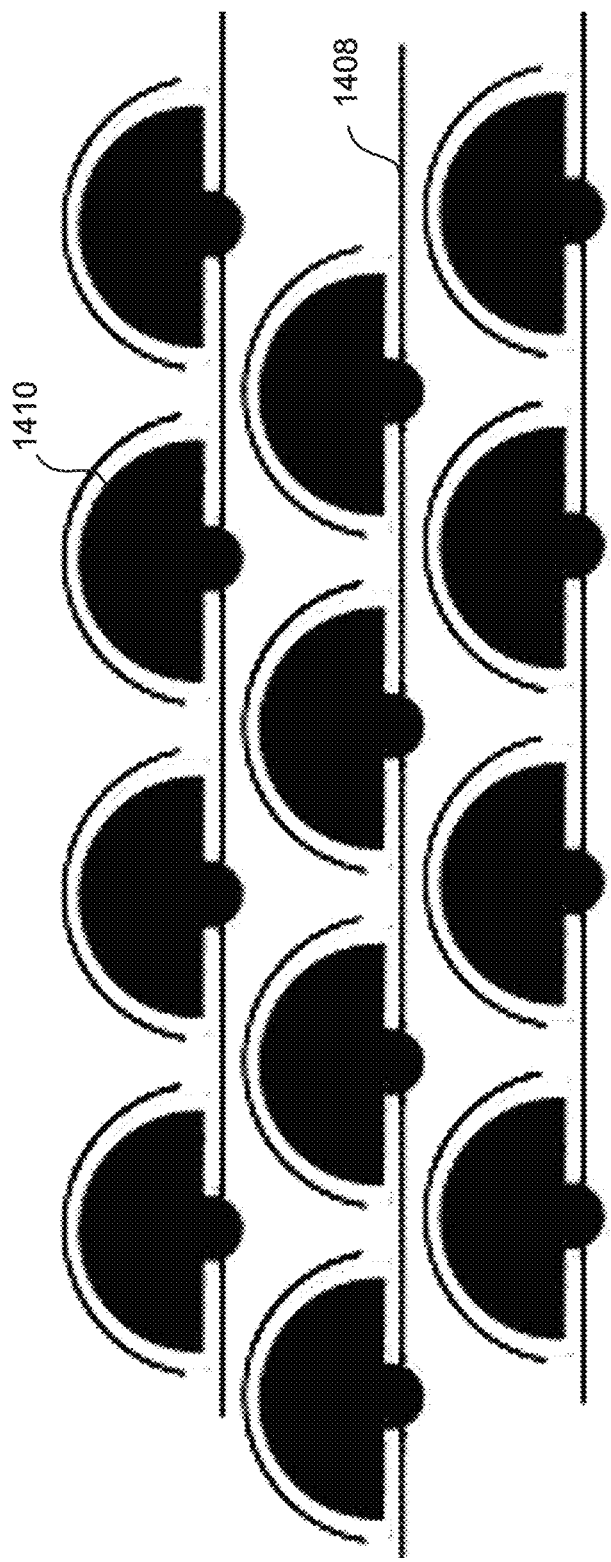
FIG. 15E is a simplified illustration of rounded petalation of the embodiment of FIG. 15A after stretching.

With reference to FIG. 15D, once the layers 1504, 1502, 1500, 1408 have been sewn together, petalation cuts 1508 are made along inner and outer boundaries of the serpentine patterns. Note that the cuts 1508 are not continuous, but have gaps 1510 at the inner cusps of the serpentine patterns. After the cuts 1508 are made, the assembled fabric layers 1504, 1502, 1500, 1408 are pulled or stretched 1512 in a direction that is perpendicular to the serpentine patterns. This causes segments of the serpentine patterns to be lifted out of the plane of the assembled layers, so as to create physical petalation features 1410, as shown in FIG. 15E.

Figure 15F:
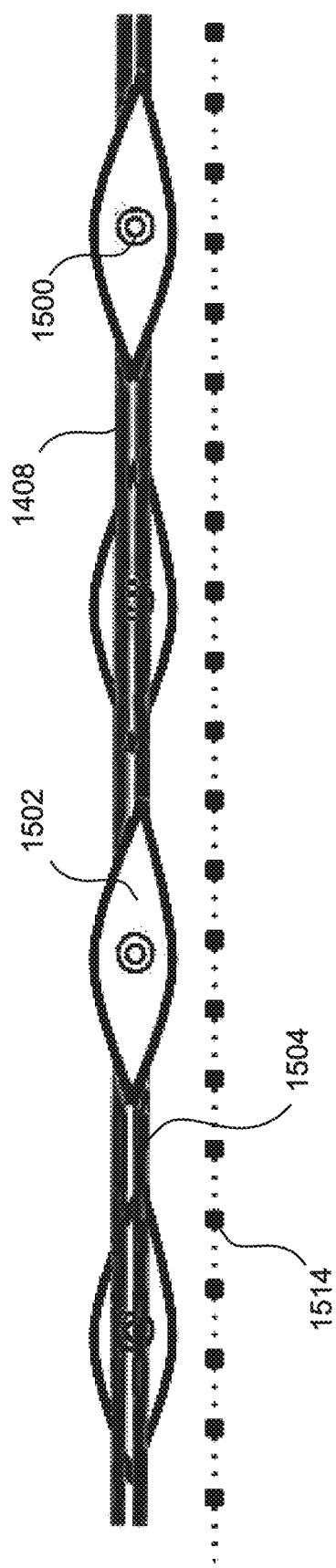
FIG. 15F is a sectional view of the embodiment of FIG. 15E positioned above a backing layer.
Figure 15G:
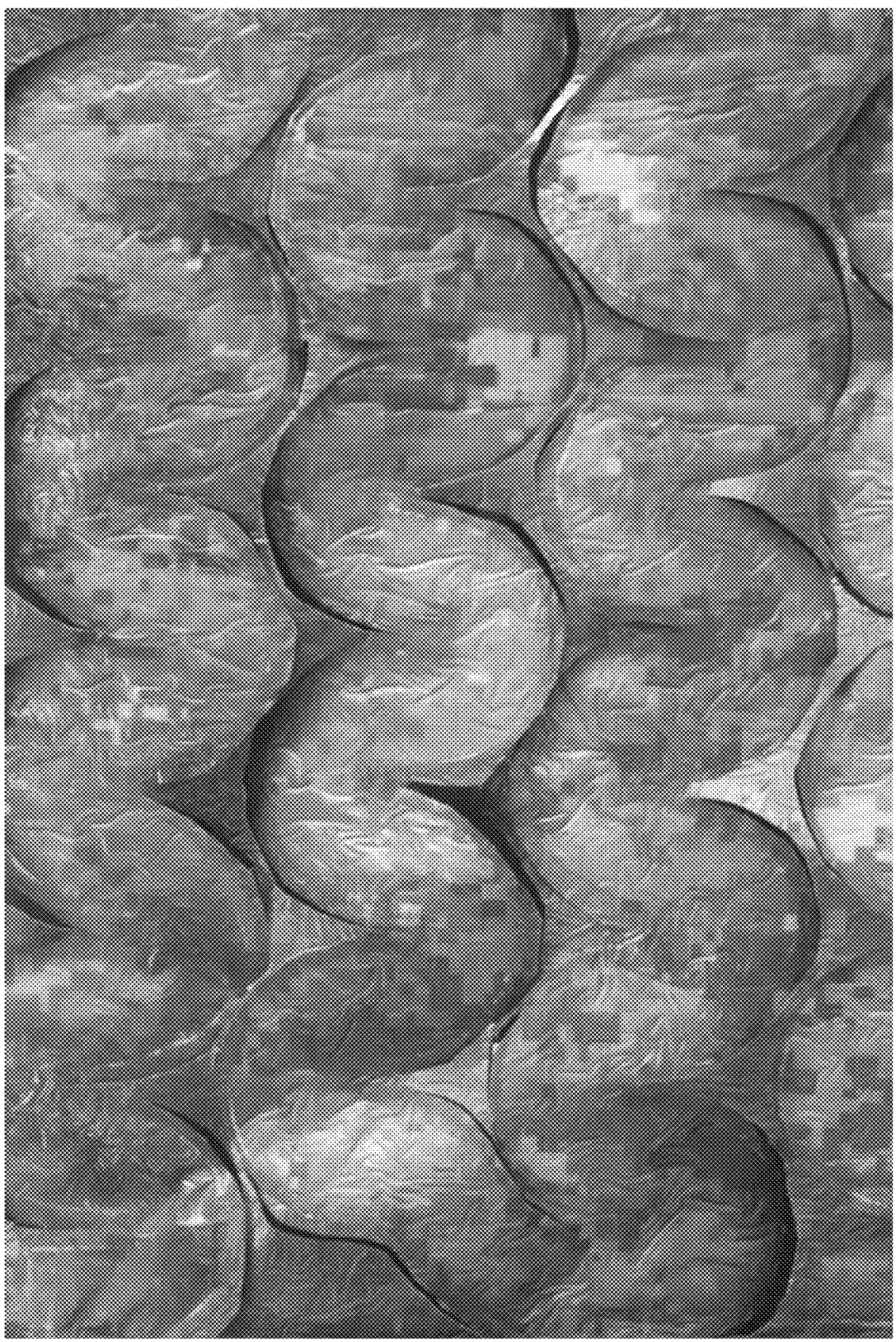
FIG. 15G is a photograph of an embodiment embodying the features of FIGS. 15A through 15F.

Finally, the assembled, stretched layers are sewn or otherwise attached to a backing substrate layer 1514, as shown in the cross-sectional view of FIG. 15F. The substrate layer 1514 can be polyester, nylon, or any other convenient fabric that will be suitably strong and durable. FIG. 15G presents a photograph of an actual embodiment that is similar to the embodiment illustrated by FIGS. 15A through 15F.

Figure 15H:
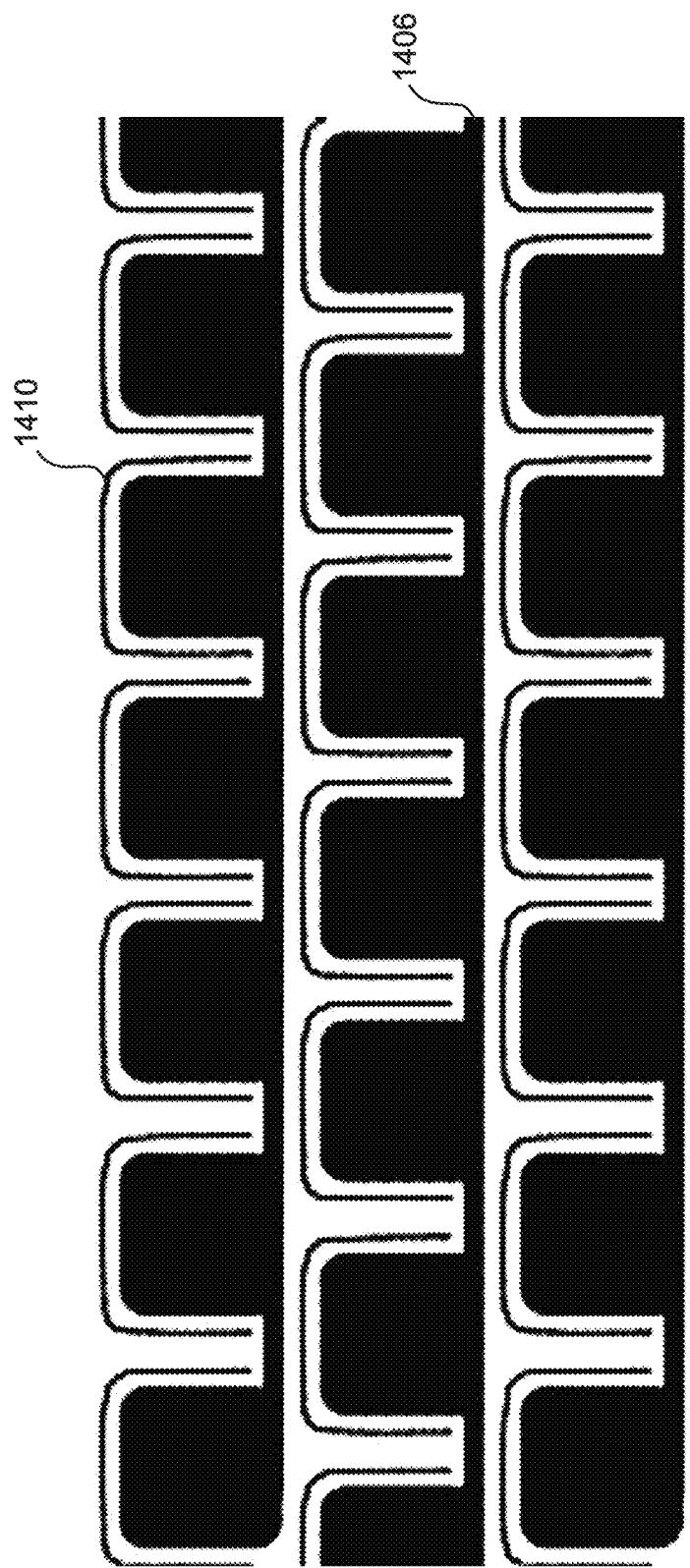
FIG. 15H is a simplified illustration of a substantially square petalation in an embodiment.

In the example of FIGS. 15A-15F, the central feed 1500 and fiber 1502 direct liquids through a circuitous, serpentine path that is cooperative with the petalation 1410. This approach enhances the ability for escaping water to be released from behind the camouflage cover, and emulates natural water transpiration from vegetation. FIG. 15H illustrates a pattern of petalation similar to FIG. 15E, except that the liquid-circulating channel, (also referred to herein as the "vascular system") 1406 and petalation 1410 follow a "square wave" pattern rather than a serpentine (sinusoidal) pattern.

With reference to FIG. 16A, in embodiments the disclosed camouflage cover 1300 is a laminate of at least two "boundary" layers 1408, 1504, which can be transparent film layers 1408, 1504, between which is formed a two-dimensional region or liquid-circulating "channel" 1601 through which liquids can be circulated. The upper film boundary layer 1408 in the embodiment of FIG. 16A is impervious to water, while the lower boundary layer 1504 in the embodiment of FIG. 16A is water-permeable. The two-dimensional liquid-circulating channel 1601 is filled with a vascular liquid distributing fabric 1502 that provides wicking action to distribute liquids throughout the channel 1601.

Figure 16B:
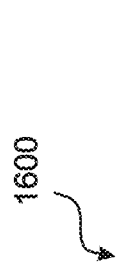
FIG. 16B is a simplified cross-sectional diagram of a camouflage cover in an embodiment of the present invention that includes only one channel through which water is circulated.

With reference to FIG. 16B, in similar embodiments the visible signature of the surrounding environment is emulated by a printed pattern imposed on the cellulosic liquid-distributing fabric layer 1502 within the "liquid-circulating" channel 1601. This visible emulation remains fixed, while water without dye is circulated through the channel 1601 so as to emulate the transpiration and the corresponding IR signature of the surrounding vegetation. Accordingly, these embodiments are suitable for use in environments where the type of the surrounding vegetation, and hence the visible signature and the chromophore IR spectral signature of the vegetation, remains fixed, while the rate of transpiration, and hence the water IR spectral signature of the vegetation, is variable. In the embodiment 1600 of FIG. 16B, the laminated film boundary layers and liquid distributing textile 1502 (within the channels 1601) are supported by an underlying textile mechanical layer 1602, which in embodiments has between 25% and 90% opacity, and/or approximately 200 cfm Frazer permeability.

Of course, embodiments include combinations of the features of FIGS. 16A and 16B, whereby the visible signature of the surrounding vegetation is emulated by a combination of a printed pattern and dyes that are circulated in a water solution through the channel. Accordingly, adjustment of the dye mixture and the pressure and rate of circulation of the dye solution allows for control of both the visible and IR signature of the cover.

According to embodiments of the disclosed method, a solution of bio-chromophore dyes is introduced into the channel 1601 of the laminate structure, so as to closely emulate the visible and IR contributions of the biochemical components present in the surrounding vegetation. Bio-chromophore dyes are selected that are chemically similar to the biochemical components of the surrounding vegetation, so that by blending the dyes to match the visible color of the surrounding vegetation, the surrounding IR signature is matched as well, because the dyes are chosen to have full spectral matches to their natural analogues. The bio-chromophore dyes are water soluble, or can be made soluble, and can include anthocyanins and/or chlorophylls. In embodiments, they are dissolved in a water solution that includes additives such as alcohols and/or brine so as to accommodate the limited solubility of some of the bio-chromophore dyes.

As the solution is circulated through the channel 1601, water is able to evaporate from the channel 1601 through the microporous transpiration film layer 1504 in a manner that emulates the natural transpiration of leaves and other vegetation.

Cellulosic films and other bi-derived materials can be used as the microporous and or monolithic breathable film 1504 that is able to transpire water from the rear side of the camouflage cover 1504. Unlike a leaf, the central control of the solution that is supplied to the channel 1601 can control the water content of the channel 1601. As noted above, there is some impact to the camo IR signature that results from variable water content in the channel 1601.

The logistics associated with providing water to the camo system for transpiration is two-fold. First, the effective water percentage of the system should be maintained in the range that applies to healthy vegetation (70-95%). Second, the evaporative cooling through the breathable membrane 1504 can play an important role in maintaining the camouflage system at the same temperature as the surrounding vegetation.

With reference to FIG. 16C, some embodiments 1604 include two separate channels 1601, 1608, separated by a second water-impervious boundary layer 1606, which can be a film boundary layer. In these embodiments a dye solution is circulated through the upper of the two channels 1408, while water is separately circulated through the lower channel 1606. This approach provides for greater flexibility in controlling both the visible and IR signatures.

In the following example, a typical northern forest tree (maple) is used as a reference to establish the water evaporation rate that is required from the second channel 1608 of the camouflage cover in the embodiment of FIG. 16C. According to the example, the total leaf area of the maple is 675 square meters, and the total transpiration of the tree is 220 kg of water per day. This represents a transpiration rate of 0.324 kg per square meter of leaf area per day, which is 0.226 grams per square meter per day. If the coverage area of the camouflage cover is sixty square meters, then the required water transpiration rate is 13.58 grams per minute, which is 19.55 kg of water per day, or 5.14 gallons of water per day. This rate can be compared with typical human sweat production of 1.4 grams per square meter per minute at a high metabolic rate, which means that the transpiration rate from the 60 square meter camouflage cover in this example is approximately equal to the total perspiration rate of four exercising soldiers. In general, the rates of water transport for simulated transpiration in embodiments are less than rates found for moderate exercise in human sweating. These vapor transport rates are well within the range that can be accommodated by membranes of cellulose acetate.

The spectral signature of natural vegetation also includes absorption peaks in the range from 3000 to 2800 cm-1 that are due to the presence of alkane waxes on the surfaces of the vegetation. These features of the IR spectral signature can be a useful discriminant for the defeat of camouflage. In addition, the UV reflective response of the alkane waxes is a spectral feature that can be exploited if it is not addressed in the camouflage design.

Accordingly, the embodiment of FIG. 16C also includes a UV reflective, IR and visible transparent cuticular wax layer 1610 applied to the upper film boundary layer 1408. The use of wax coatings 1610 on the front film face 1408 of the chromophore channel 1601 eliminates the risk of IR absorption and UV reflective features being exploited for defeat of the camouflage. Embodiments further include etching, embossing, and/or other surface treatments of the film 1408 and/or the wax coating 1601, so as to de-gloss the top surface of the camouflage cover, and also so as to improve the retention of the wax 1610 on the film surface 1408. A diffuse reflective character in the visible range is preferred because smooth planar surfaces tend to create specular reflections. Accordingly, in embodiments, the surface of first film layer 1408 is prepared by etching or embossing before the wax layer 1610 is applied.

Figure 17:
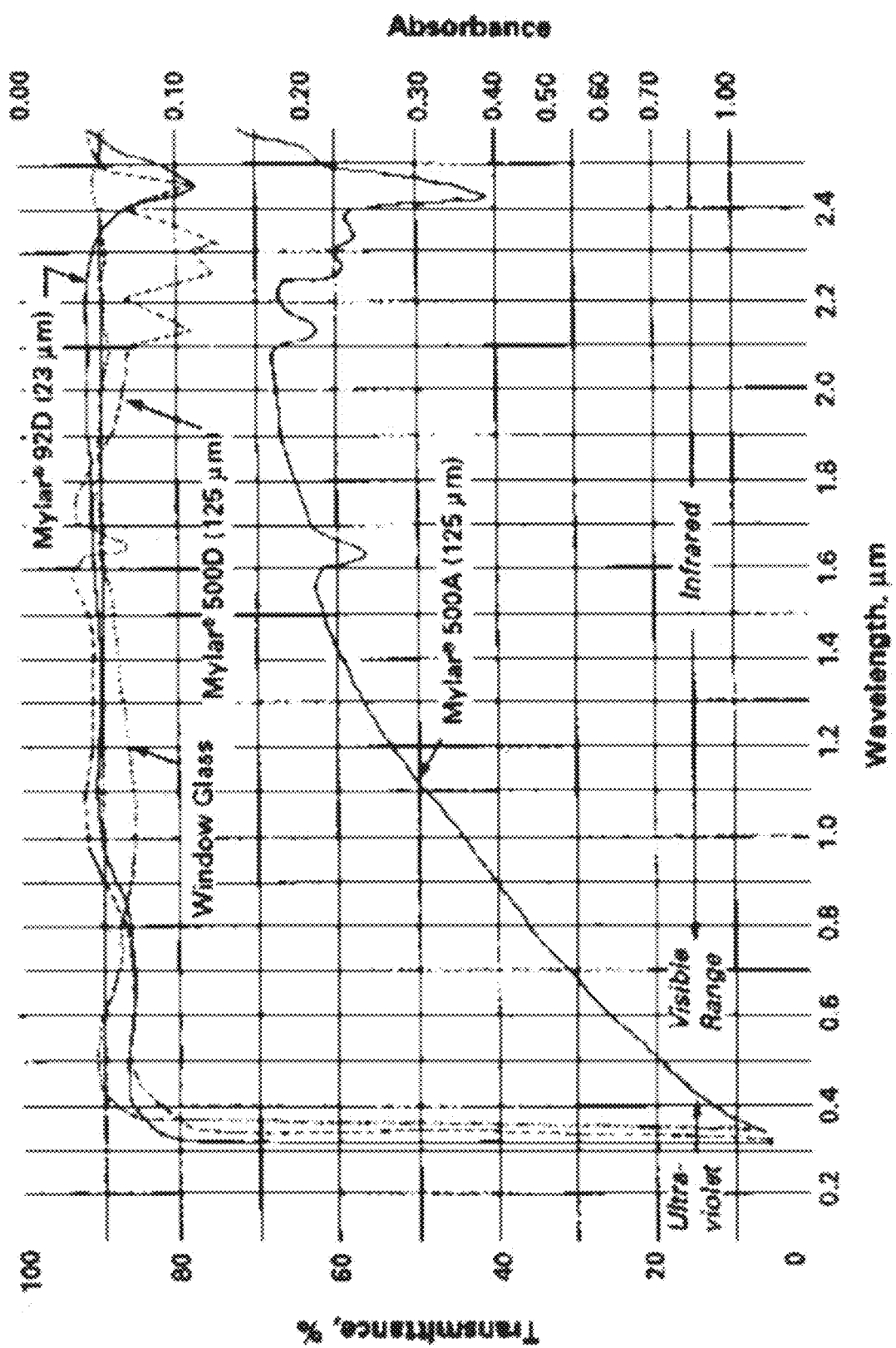
FIG. 17 presents plots of transmission as a function of wavelength of window glass and several formulations of Mylar.
Figure 18A:
FIGS. 18A through 18D present a series of photographs that illustrate the introduction of a bio-chromophore dye solution into the serpentine path of FIG. 14.
Figure 18B:
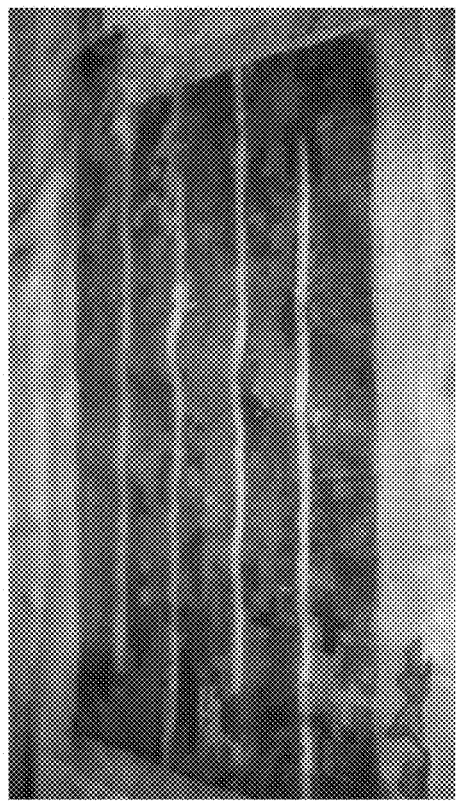
Figure 18C:
Figure 18D:
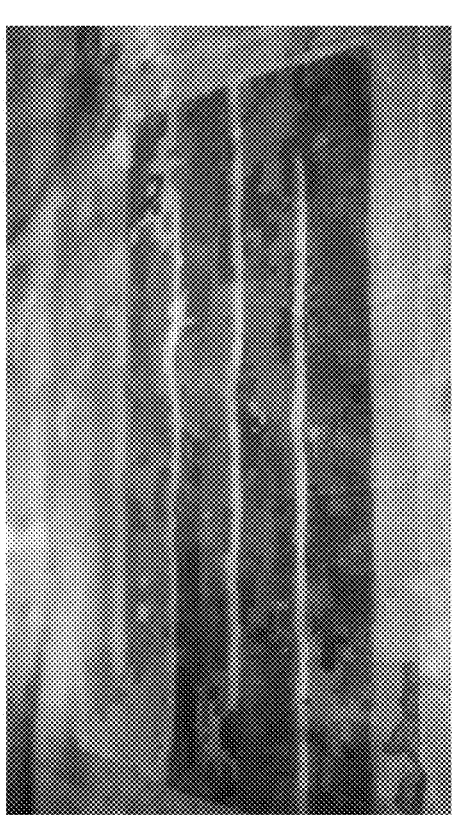
Figure 19A:
FIGS. 19A through 19D present a series of photographs that illustrate flushing of the bio-chromophore dye solution from the serpentine channel of FIG. 15D.
Figure 19B:
Figure 19C:
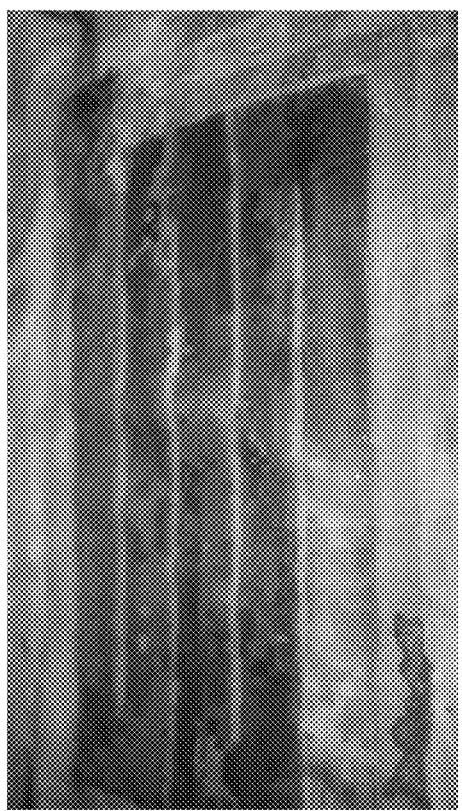
Figure 19D:

In the embodiment of FIG. 16C, the first two film boundary layers 1408, 1606 are layers of a polyethylene terephthalate ("PET") material such as Mylar. FIG. 17 compares IR spectra of several types of Mylar with window glass (source: http://usa.dupontteijinfilms.com/wp-content/uploads/2017/01/Mylar_Optical_Properties.pdf). In vegetation the cuticular wax and cutin layers are also transparent in most of the visible and IR range. In the embodiment of FIG. 16C, the wax layer 1610 can be applied after final assembly of the other layers. Note that a permanently printed color and/or pattern can be applied to any combination of the PET film 1408, 1606; transport ("pulp") layers 1601, 1608 (which in this embodiment are solution distributing cloth layers); and the textile mechanical layer 1602. According to this embodiment, dyes that have significant IR signatures that deviate from naturally occurring bio-chroma signatures are used only in the water transport layer 1608. The system is petalized to allow escaping water to move from the back of the camouflage cover to the front, so that evaporated water is not trapped on the back side of the cover. The petalation is coordinated with the flow pattern of the channels 1601, 1608 through which the water, dyes, and solvents flow.

The inside faces of the PET or other film boundary layers 1408, 1606, 1504 that form the channels 1601, 1608 in FIG. 16C can includes a low melt adhesive coating as part of the film 1408, 1606, 1504. As with the film stock, this adhesive also needs to be transparent in the visible and the IR wavelengths. Film thicknesses of 0.5 to 2 mils are used in some embodiments. The applied coatings of wax and adhesive add to the total film thickness. Adhesive layers of 0.2-0.8 mils are used in some embodiments to attach the liquid distributing textile fiber layers to the film boundary layers.

Embodiments use any of a number of cross-linkable, bio-derived adhesives based on soy and other vegetable protein sources which make excellent lamination adhesives that provide good spectral signature control. At the same time, these materials offer good environmental durability as laminate adhesives.

It can be critical for the IR spectral signature of the disclosed camouflage cover to match the chlorophyll near-IR ("NIR") absorption of the surrounding vegetation in the 700 nm range, at the edge of the visible range. Otherwise, the lack of adequate chlorophyll can be a useful capture signature for camouflage defeat because, by monitoring absorption at this single frequency, a low-quality camouflage match can be discriminated from the surrounding vegetation as a result of inadequate NIR absorption.

Accordingly, in embodiments the bio-chromophore dyes introduced into the first channel 1601 are formulated to match the IR absorption of vegetation in the 700 nm range, as well as absorptions in the visible range. In these embodiments, by adjusting the bio-chromophore density in the first channel 1601 to match the NIR chlorophyll absorption of the surrounding vegetation, this key discriminant is eliminated. Embodiments further adjust the bio-chromophore and other dyes to match the mid-IR ("MIR") spectrum of the surrounding vegetation.

So as to further improve both the color and the pattern match to the surrounding vegetation, printing can be applied to any of several layers in the camouflage cover. For example, printing can be applied to either or both of the liquid distributing fabrics 1502 that are included in the two channels 1601, 1608, as well as to the textile mechanical layer 1602. Carotene and other bio-chromophores can be combined with the printed colors used in the laminated mid and lower layers to match the surrounding colors of vegetation. Also, in duel-channel embodiments 1604, additional dyes having IR spectral signatures that deviate significantly from bio-chromophores can also be included in the second, "water transport" channel 1608. These can include carotenoids and similar pigments.

There are a number of bonding methods that make use of the thermoplastic used in some embodiments. For example, the same adhesive that is used to adhere the liquid distributing textiles in the channels 1601, 1608 can be used to form the channel seams 1506. In some embodiments the liquid distributing textile 1502 is pre-cut and applied to the bottom film boundary layer 1606 of the channel 1608 while the assembly is on the thermal lamination equipment. Then the top layer of film 1408 is applied and the laminator applies heat and pressure to form both the bonds to the liquid distributing textiles and the seams 1506 that form the circuitous paths within the channels 1601, 1610. Cuts 1508 are then made in the laminate seams to form a 3D garnish pattern with petalation.

In embodiments, the bio-chromophores dyes are engineered to have a controlled mix of chlorophyll, carotene and anthocyanins like materials. By blending the dyes to match the visible color of the surrounding vegetation, the IR spectral signature of the vegetation is also matched, because the dyes are chosen to have full spectra matches to their natural analogues. These dyes need not have long term stability, as they can be replaced by circulation of fresh dye solution in the first channel 1601.

Of the 3 primary color types used in the bio-chromophore dye solution, chlorophyll can be the most challenging, because these chromophores are not soluble in water. In some embodiments, a bio-analogous micelle is formed with a phospholipid type surfactant. This micelle is analogous to the chloroplasts or lumens that are the structures that hold chlorophyll in a leaf. Brine solutions, alcohol solvents, and pH controlled solutions are all used in embodiments to render chlorophyll soluble, so that it can be included in the dye solution that is circulated in the first channel 1601.

Some variation in the dye solution bio-chromophores from the naturally occurring molecules is acceptable to achieve better handling behavior and improve compatibility with other dye stuff and with the channel transport system. The multispectral imaging that is used for remote sensing is generally not a fully continuous, frequency-by-frequency comparison system. Instead, specific wavebands are typically used as markers or discriminates. Accordingly, it is especially important for the spectral signature of the camouflage cover to match the spectral signature of the surrounding environment in the visible color wavelengths, the red visible, and the NIR bands around 700 nm. In addition to these wave bands that are directly related to the color system, the bio-chromophore dye solution should not create any stray maker absorption bands.

Embodiments differ as to how strongly the dyes are retained by or "bound to" the liquid distribution medium in the upper channel 1601. As the spectral signature of the surrounding vegetation changes, for example due to changes in temperature, hydration, and sunlight intensity, and/or due to changes in location (for mobile assets), in embodiments where the bio-chromophores are "binding," i.e. are strongly retained by the pulp material, the visible and IR signature of the camouflage cover of FIG. 16C can be adapted by flushing and replacing the bio-chromophore dye solution in the upper channel 1601 and by adjusting the flow rate and/or pressure of the water in the lower channel 1608.

In other embodiments, the bio-chromophores are "non-binding," in that they have a low attachment affinity for the OH groups on the Tencel or other cellulosic fiber that is used as the liquid distribution medium in the first channel 1601. In some of these embodiments, the non-binding chromophores can be exchanged simply by flushing them from the channel 1601 with water. This is made possible in embodiments by engineering the dye system to have very low attach affinity to the fibers of the liquid distribution medium 1502, for example by adding one or more binding agents such as surfactants to the bio-chromophore solution that will bind with the bio-chromophores so as to form an emulsion that will not bind to the fabric 1502 in the channel 1601.

In embodiments, the path dimensions within the first (bio-chromophore) channel 1601 are approximately 50 mm wide and less than 0.2 mm high. It can be shown experimentally that these path dimensions are effective at distributing colors and are easy to flush and clear when the color must be removed and replaced.

In embodiments, at least one of the liquid distributing fabrics 1502 that are included in the channels 1601, 1608 is a non-woven Tencel that includes fine transport dimensions and interstitial spaces for water transport. The wicking performance of Tencel for water mixed with dyes is very high, based on the greater than 50 m-Joule surface energy value for clean Tencel fiber.

The orientation and packing of the fiber in the fabric also has a significant impact on wicking performance. In embodiments, a tire cord type construction provides for good continuous capillary structures in the flow direction. Some twist of the fibers in the machine direction (flow direction) can be useful in embodiments for at least two reasons. First, the twist helps to keep the fiber bundle inter-filament spacing constant. Second, because the boundary films 1408, 1606, 1504 that form the channels 1601, 1608 are bonded in embodiments to these machine direction fibers on both faces to maintain the channel shape, a yarn-twist geometry serves to connect the films as the filaments move helically from one face of the channel to the other.

Carded webs and needled webs are also useful as liquid distributing fabrics in embodiments, and can be of lower cost than a tire cord geometry. A carded web with parallel staple fiber has higher wicking transport rates in the machine direction. The needling, like the twist, is used to maintain the lamination integrity of the channel structure.

Figure 20A:
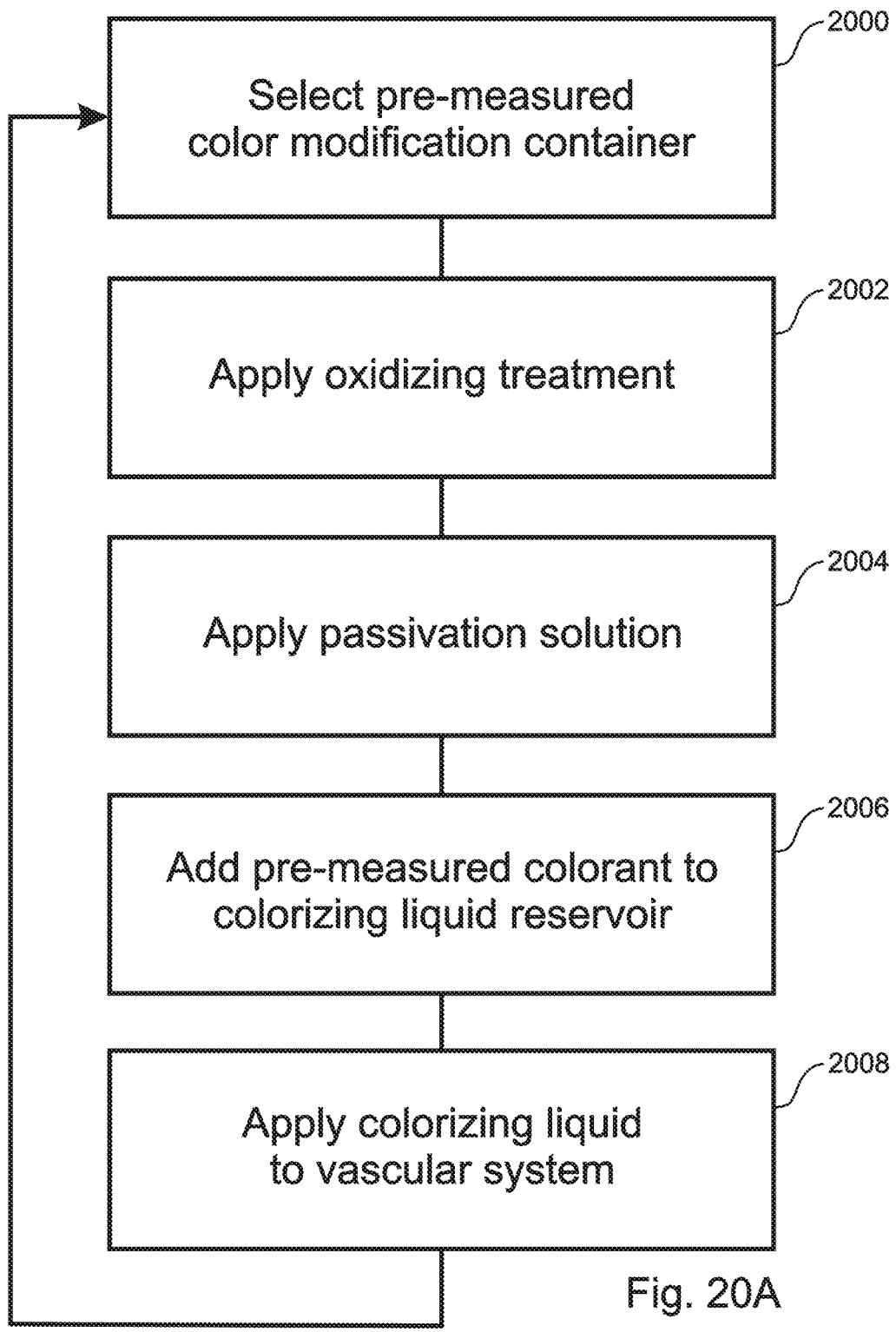
FIG. 20A is a flow diagram illustrating an embodiment of the method of the present invention.
Figure 20B:
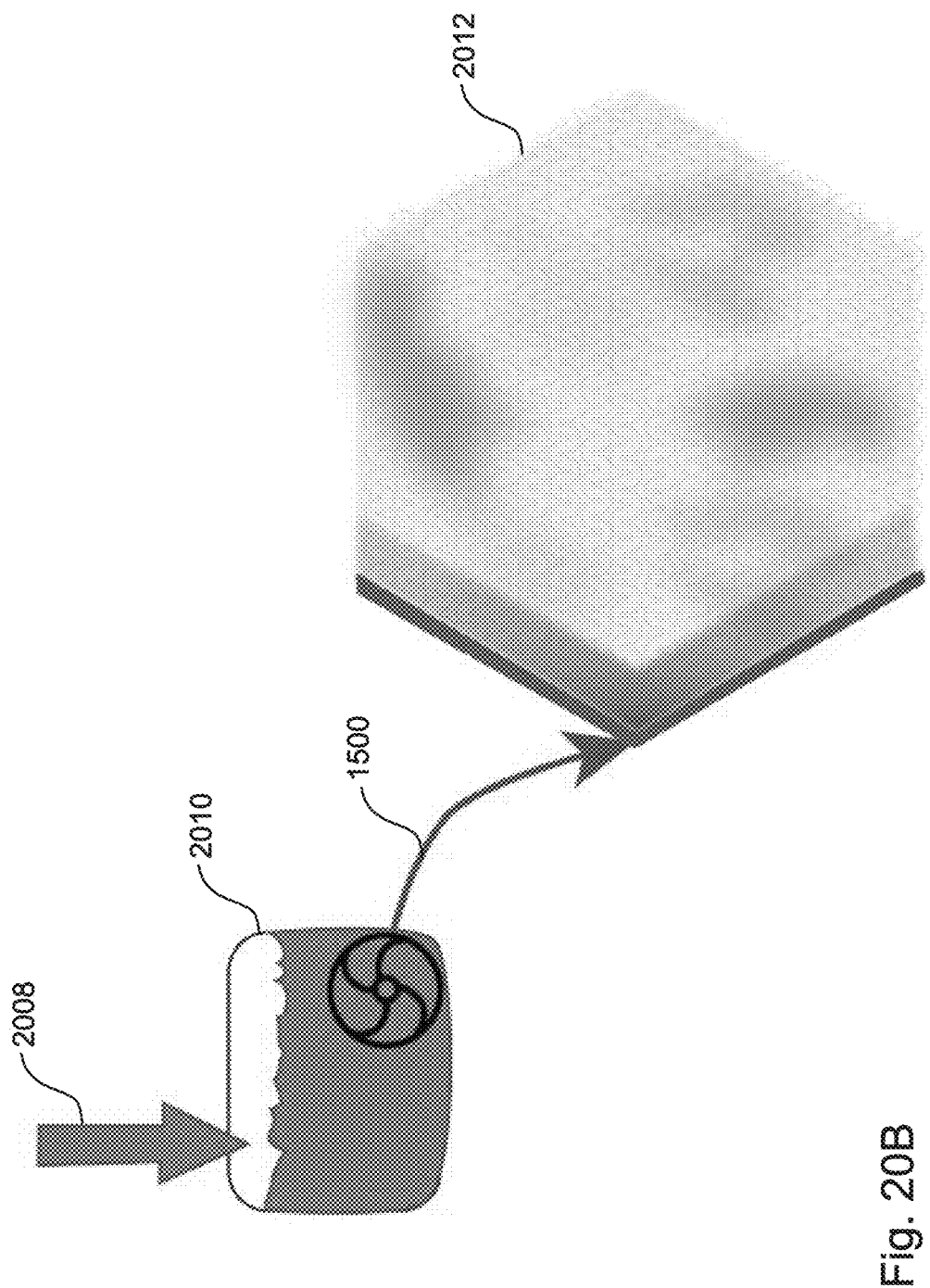
FIG. 20B is a simplified, iconic illustration of part of the method of FIG. 3A.
Figure 20C:
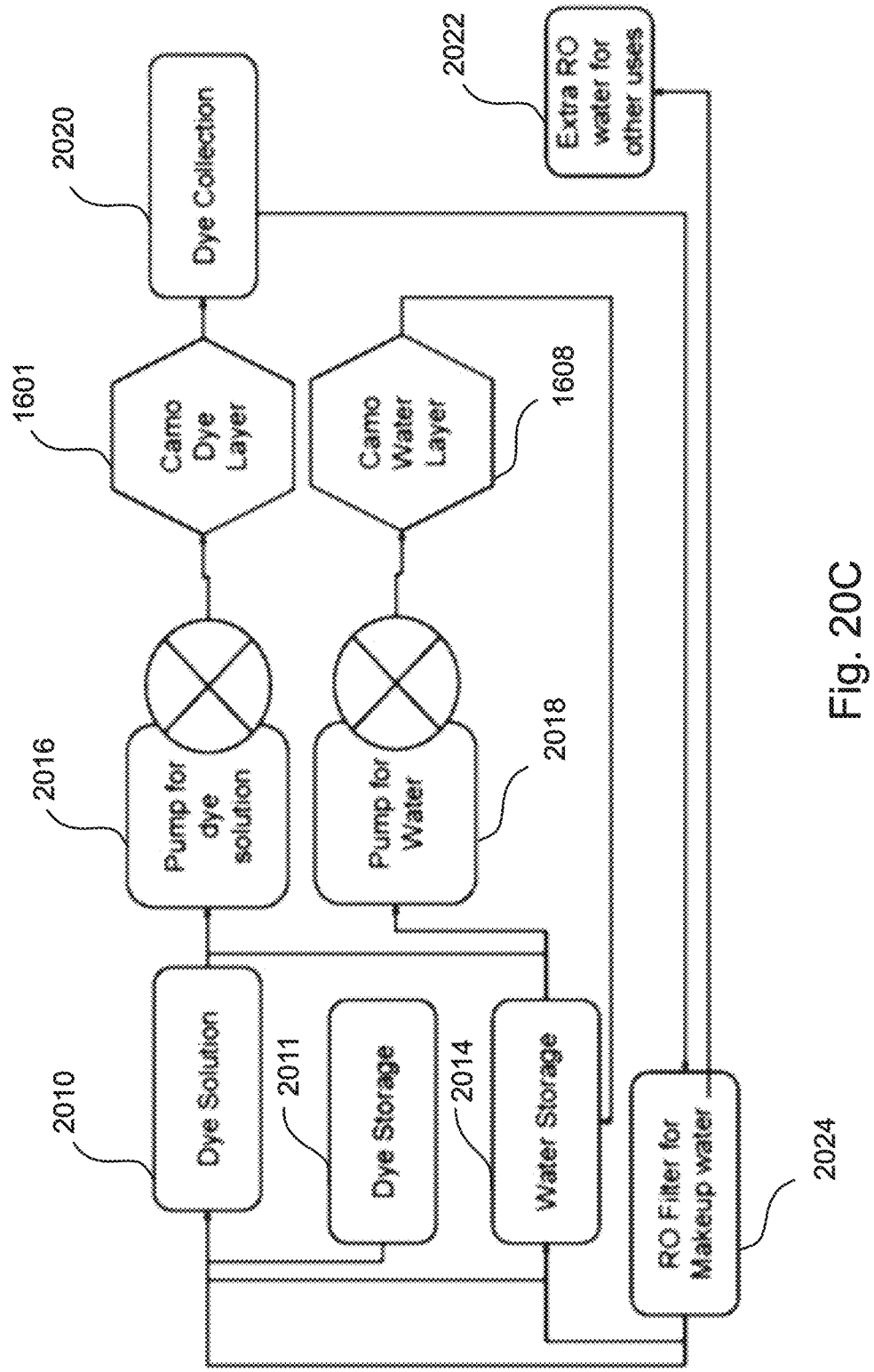
FIG. 20C is a block diagram that illustrates a complete spectrum simulating system in an embodiment of the present invention that includes the camouflage cover of FIG. 16C.

With reference to FIG. 20C, discussed in more detail below, embodiments of the disclosed camouflage system further include separate supply 2010, 2018 and collection systems for each of the two channels 1601, 1608 in the camouflage cover 1604. These can include supply and collection reservoirs, as well as supply pumps 2016, 2018 and removal (vacuum) pumps that can move the water and dye solutions into and out of the channels 1601, 1608. The internal geometry of the flow paths within the channels, and the high wetting affinity of the textile surfaces of the liquid distributing fabrics within the channels 1601, 1608 can provide a significant level of passive transport for both the dye solutions in the first channel 1601 and the water in the second channel 1608. For optimal response times and simplicity of supplying the liquids from and returning them to supply tanks 2010, 2014, in some embodiments pumping is combined with vacuum suction at the supply and return ends of the channels 1601, 1608. This active supply and return approach improves the response time of the camouflage system, and provides for faster color changes and improved matching of transpiration rates between the camouflage cover and the surrounding vegetation.

FIGS. 18A through 18D are successive images that illustrate the introduction of a dye into a serpentine path within a first channel 1601 of a camouflage cover 1604 in an embodiment of the present invention. FIGS. 19A through 19D are successive images that illustrate flushing of the dye of FIG. 18D from the camouflage cover 1604.

In embodiments, after a color flush event in the camouflage cover 1604, the receiving tank 2020 contains diluted color solution. In some embodiments, this solution is wasted, while in other embodiments it is processed by a filter, such as a reverse osmosis ("RO") style filtration unit 2024, to re-concentrate the dyes and to make the clear water available for future flush events or for transpiration from the lower channel 1608. The use of an RO filter unit 2024 can enhance the mobility and logistical independence of a camouflage system. The RO filter 2024 can also be used for other purposes 2022, such as to provide clean water for the system and for soldiers from local surface water sources that would otherwise be too contaminated for either drinking or use in the camouflage system.

Figure 28A:
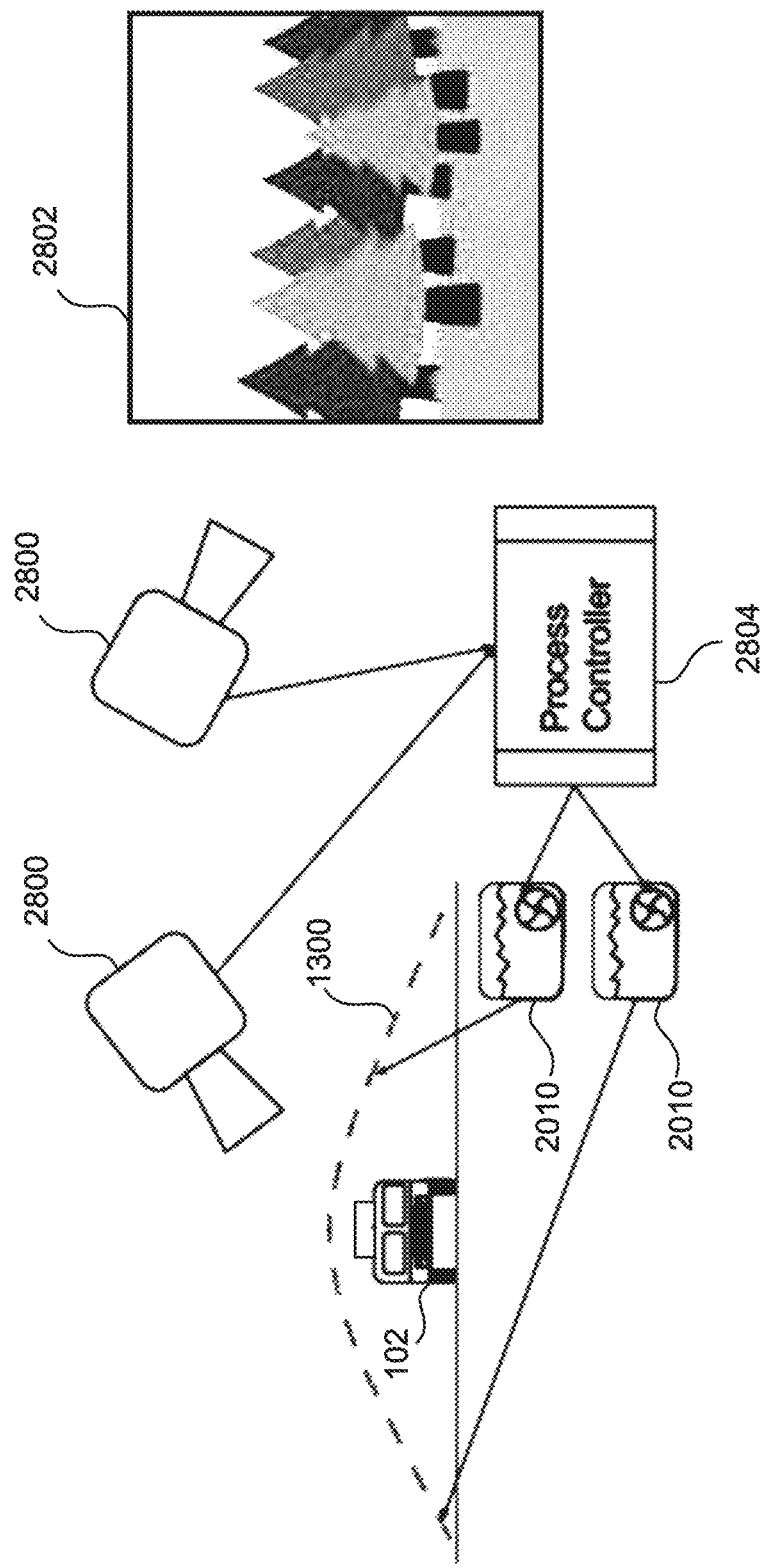
FIG. 28A is a simplified diagram that illustrates apparatus for automated monitoring and adjustment of visual and IR signatures in embodiments of the invention.

With reference to FIG. 28A, discussed in more detail below, in embodiments an adaptive machine vision system 2800 with IR sensors is used to periodically or continuously compare the visible and IR spectral signatures of the camouflage cover 1300 and the surrounding vegetation 2802. And in some of these embodiments the camouflage system automatically replaces and/or readjusts the bio-chromophore dyes in the first channel and the rate of water transpiration from the second channel so as to maintain a match between the camouflage spectral signature and the spectral signature of the surrounding vegetation.

Method Embodiments

With reference to FIG. 20A, in embodiments of the disclosed camouflage method where the colorants (dyes) are strongly bound to the pulp 1502, the displayed visual signature is changed by selecting a pre-measured color modification container that most closely matches the surrounding environment 2000, applying an oxidizing treatment to the channel 2002 to destroy some or all of the previously added colorants stored in the pulp 1502, applying a passivation solution 2004 so as to neutralize the oxidizing treatment, and then introducing the mixture of chromophore-containing and/or other bio-organic colorants 2006 from the pre-measured container into the channel 1500 so as to create the desired visual appearance. In embodiments, the passivation solution 2004 is Fenton's reagent, which leaves only iron and water as residues. Similar embodiments employ various chemical agents to reduce or eliminate the color from the pulp layer, and/or flush the colorants from the pulp layer.

A portion of the method embodiment of FIG. 20A is graphically illustrated in FIG. 20B, which indicates that the contents 2008 of the pre-measured color container are added to the reservoir 2010 that supplies the colorizing liquid to the pulp 1502 via the vascular system 1500. The color pattern 2012 displayed by the camouflage cover is then determined by the resulting color of the pulp 1502 as viewed through the garnish layer 1408.

An embodiment of a complete spectrum simulating system based on the camouflage cover of FIG. 16C is illustrated in FIG. 20C. In this embodiment, dye concentrates are prepared in a plurality of containers 2011, and then mixed with water from a water storage container 2014 to form a dye solution 2010, after which the dye solution 2010 is fed by a first pump 2016 into the upper channel 1601 of the camouflage cover. In parallel, water from the storage container 2014 is fed by a second pump 2018 into the lower channel 1608. After circulating through the upper layer 1601, the dye solution flows into a collection tank 2020, and from there to a reverse osmosis (RO) filter 2024 that separates the dyes from the water and returns them to their respective tanks 2010, 2014. Excess water from the filter can be diverted 2022 for other purposes, such as potable drinking water. In embodiments, the system requires water storage of between five and seven gallons and dye storage of between one and two gallons. The pumps can weight about five pounds each, and the RO filter can weight about 10 pounds. The overall enclosure can weight about five pounds. The remainder of the system includes the camouflage cover itself, various mounting fixtures, and measuring instruments in some embodiments, as discussed in more detail below with respect to FIGS. 28A and 28B.

Embodiments use bio-organic color materials that have very high reactivity to common oxidizers, so that an active, real time, field adjustable color match can be made to surrounding local conditions. Many bio-organic molecules that include chromophores also offer the advantage of providing a good IR spectral match to vegetation that is present in the surrounding environment. Various embodiments also add surfactants and/or other additives to the circulated water so as to enhance and accelerate the wicking process and transport of the decolorizer and new colorants into the base layer.

In embodiments, the color change that is caused by infusing the channel(s) and pulp layer with colorants is dependent upon the transparency of the permanent pigment that is printed on the face of the garnish layer 1408. This transparency is controllable during manufacture by control of the substrate properties of the garnish layer 1408 and of the loading rate of the colorants. Embodiments apply a continuous base color in a dye bath followed by printing of 3-5 colors over the base shade.

Color Examples

Light Woodland

FIGS. 21-25 illustrate a color example in which a "light woodland" pattern of colors 2100 with 50% opacity is applied to the garnish layer 1408 and various base colors are used to match corresponding woodland environments. In FIG. 21, a bio-colorant having a light green color 2102 is applied to the base fiber. The resulting appearance 2104 of the camouflage cover 1300 closely matches a light woodland environment 2106.

Figure 22:
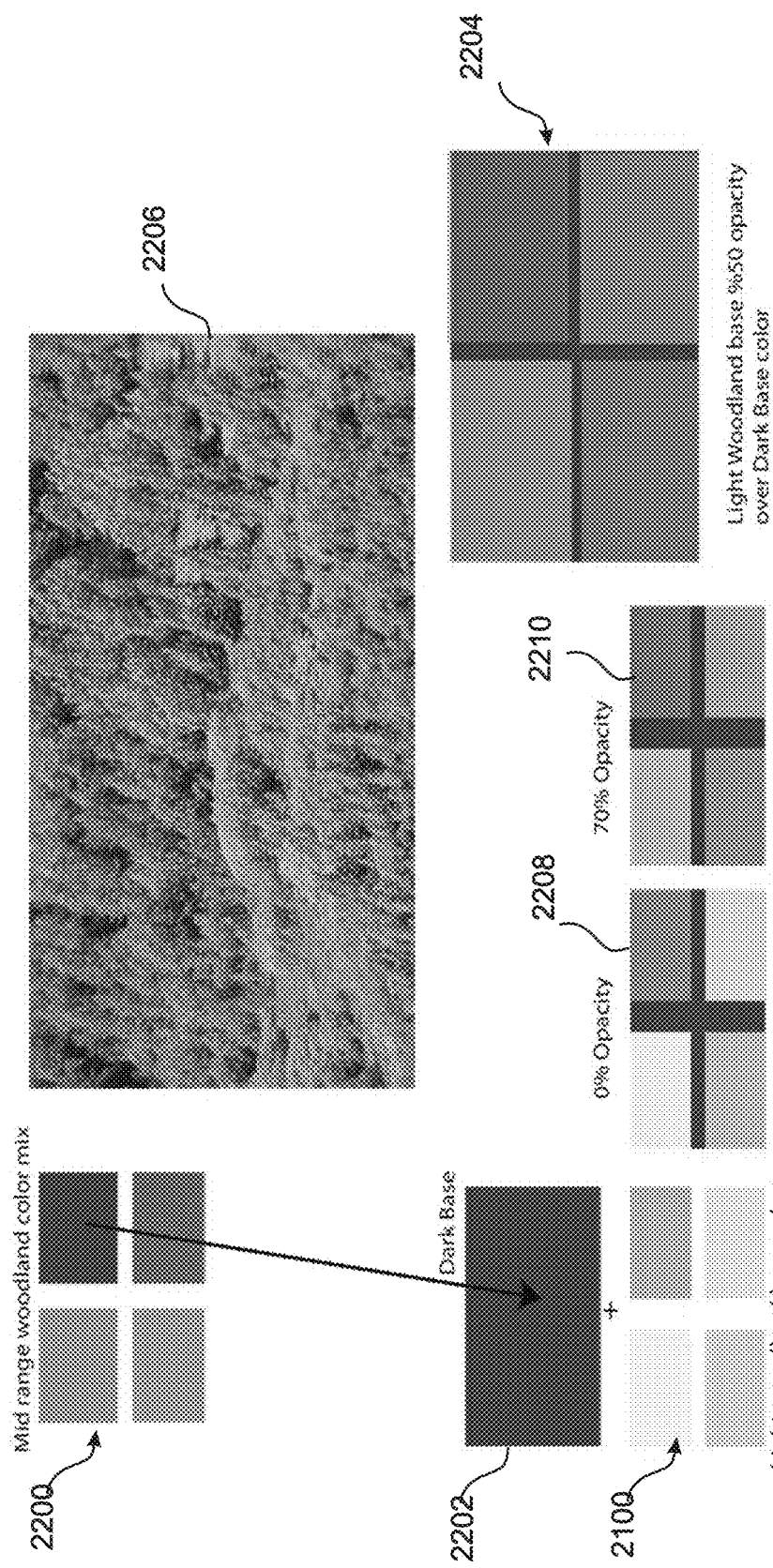

In FIG. 22, a darker bio-colorant 2202 is selected from an available set of pre-measured, mid-range woodland colorants 2200 and applied to the fiber layer 1408 beneath the light woodland pattern 2100 garnish layer 1408 of FIG. 21. The result 2204 is an appearance that closely matches a surrounding "mid-range" woodland environment 2206. For comparison, results using garnish layers having 0% opacity 2208 and 70% opacity 2210 are also shown.

Figure 23:
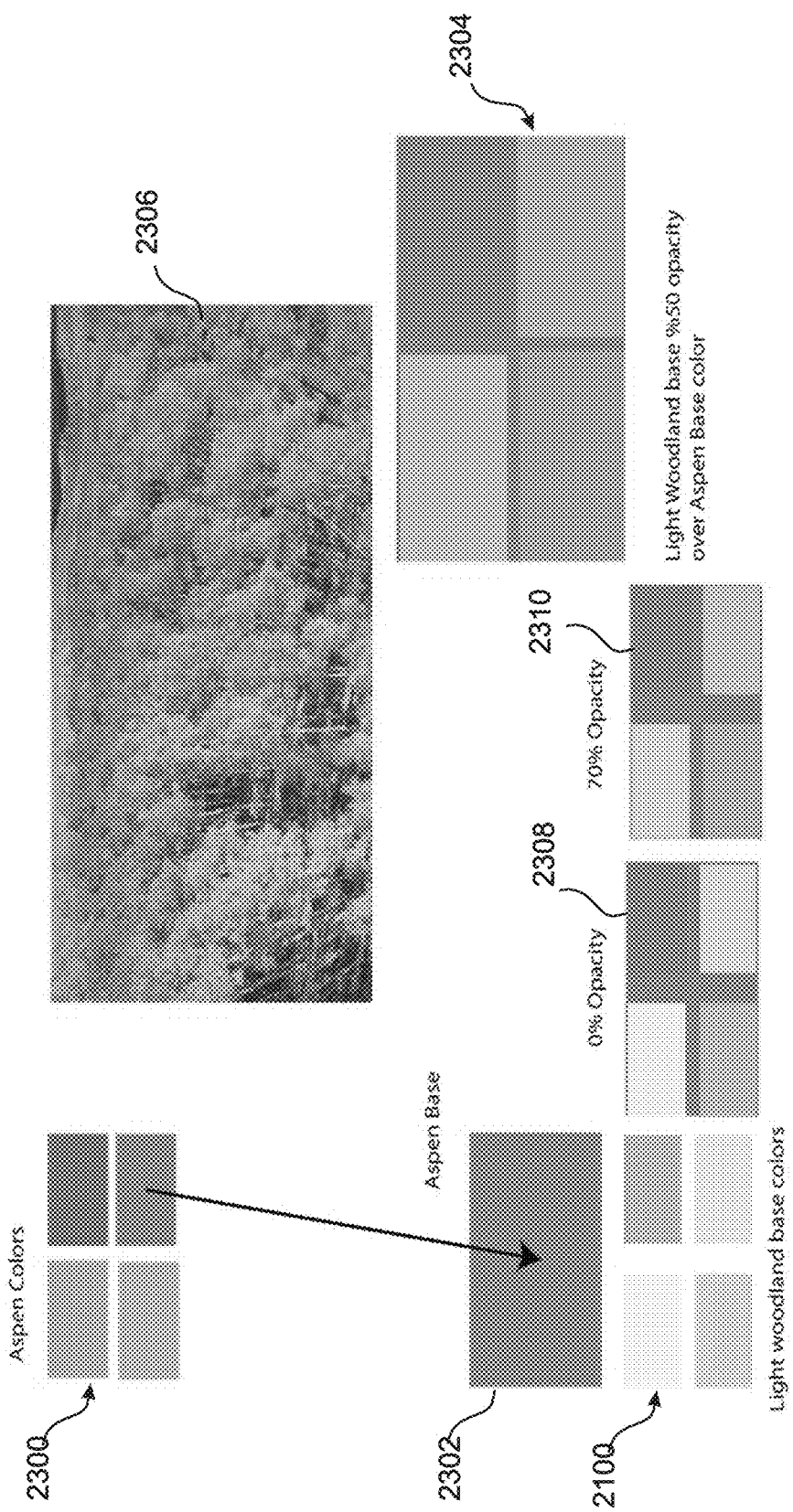

In FIG. 23, a bio-colorant 2302 is selected from an available set of pre-measured, aspen colorants 2300 and applied to the fiber layer 1408 beneath the light woodland pattern 2100 of FIG. 21. The result 2304 is an appearance that closely matches a surrounding aspen environment 2306. For comparison, results using garnish layers of 0% opacity 2308 and 70% opacity 2310 are also shown.

Blue Spruce

Figure 24:
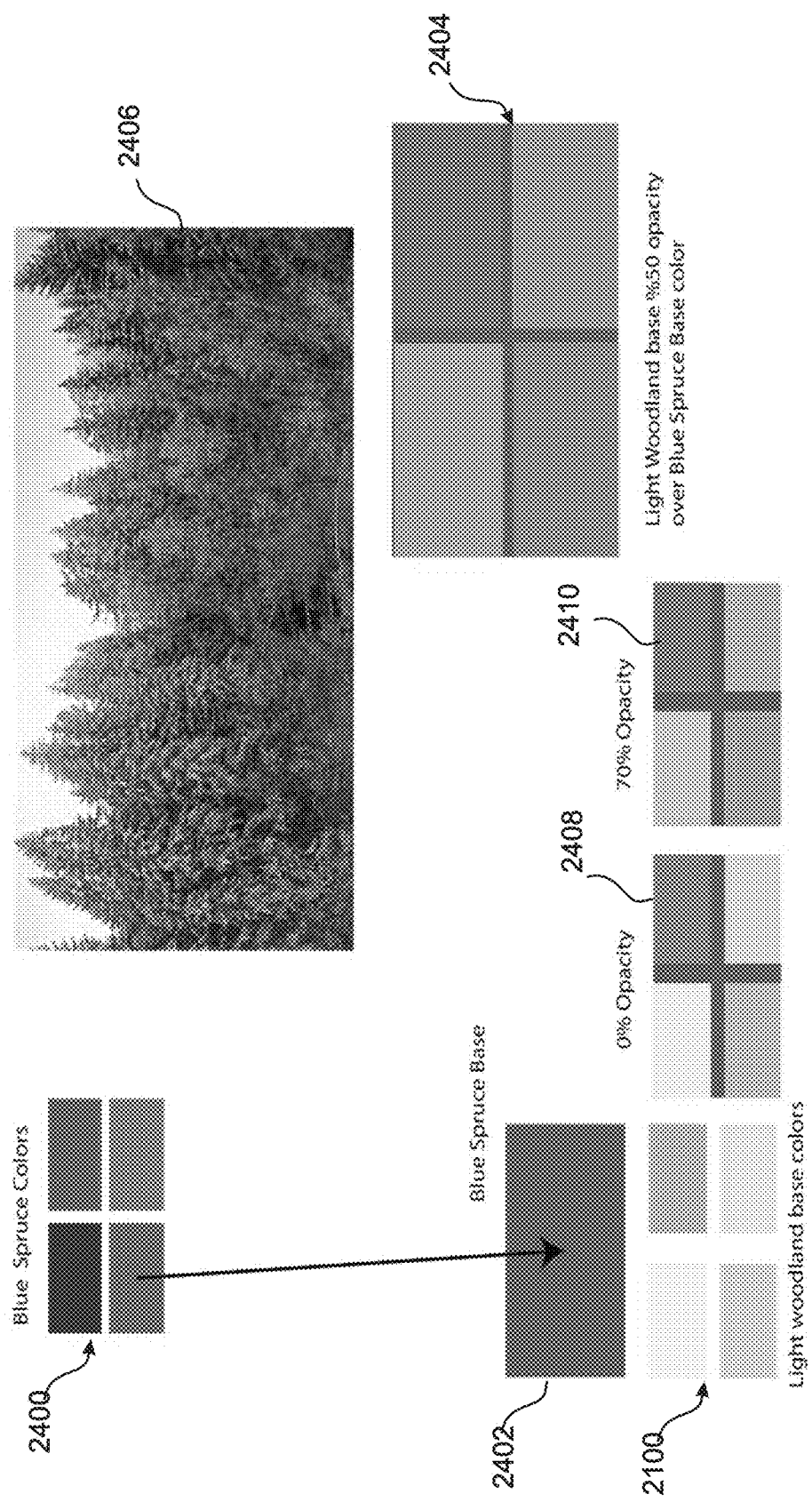

In FIG. 24, a bio-colorant 2402 is selected from an available set of pre-measured, blue spruce colorants 2400 and applied to the fiber layer 1408 beneath the light woodland pattern 2100 of FIG. 21. The result 2404 is an appearance that closely matches a surrounding blue spruce woodland environment 2406. For comparison, results using garnish layers of 0% opacity 2408 and 70% opacity 2410 are also shown.

Figure 25:
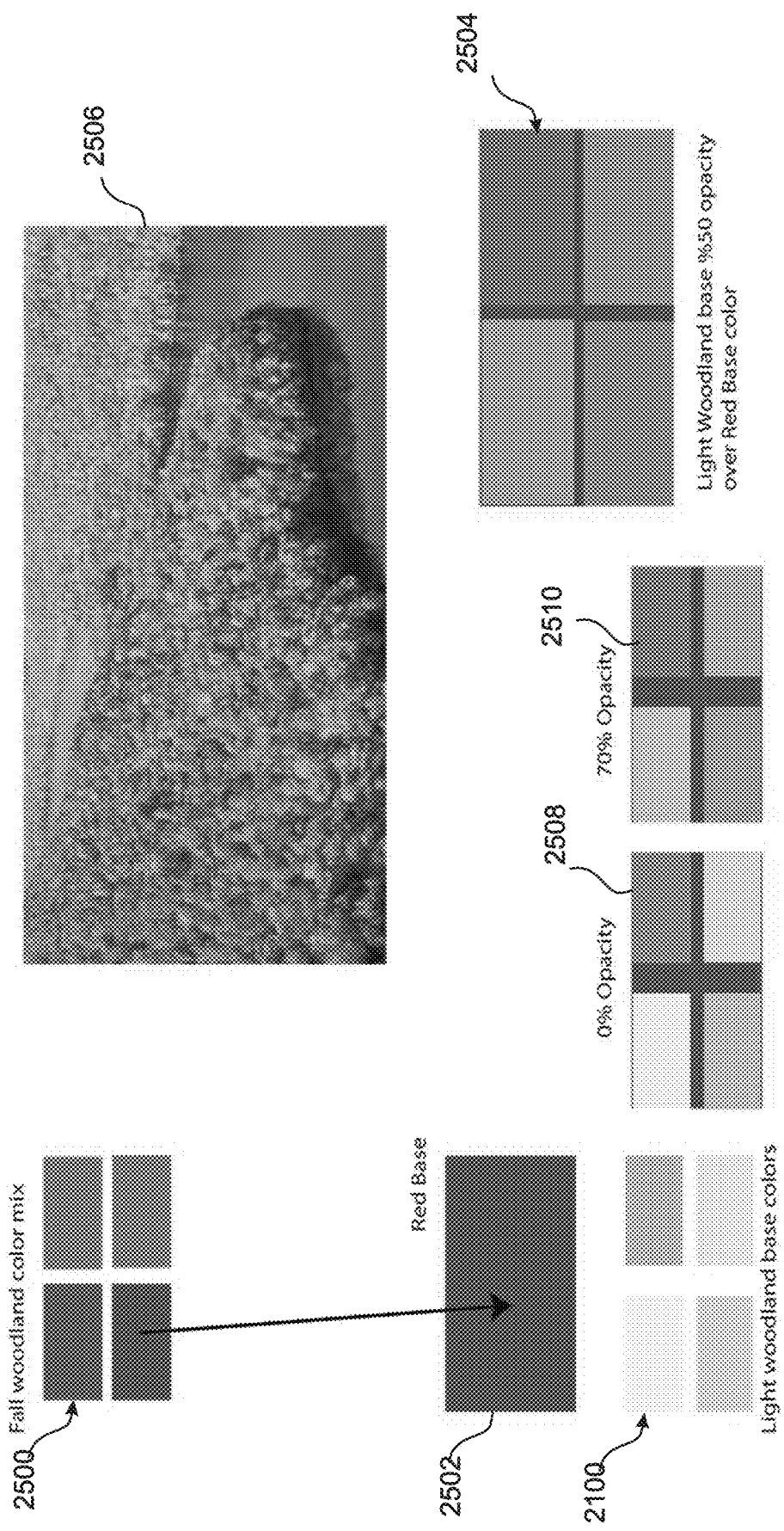

In FIG. 25, a bio-colorant 2502 is selected from an available set of pre-measured, Fall woodland colorants 2500 and applied to the fiber layer 1408 beneath the light woodland pattern 2100 of FIG. 21. The result 2504 is an appearance that closely matches a surrounding Fall woodland environment 2506. For comparison, results using garnish layers of 0% opacity 2508 and 80% opacity 2510 are also shown.

Figure 26:
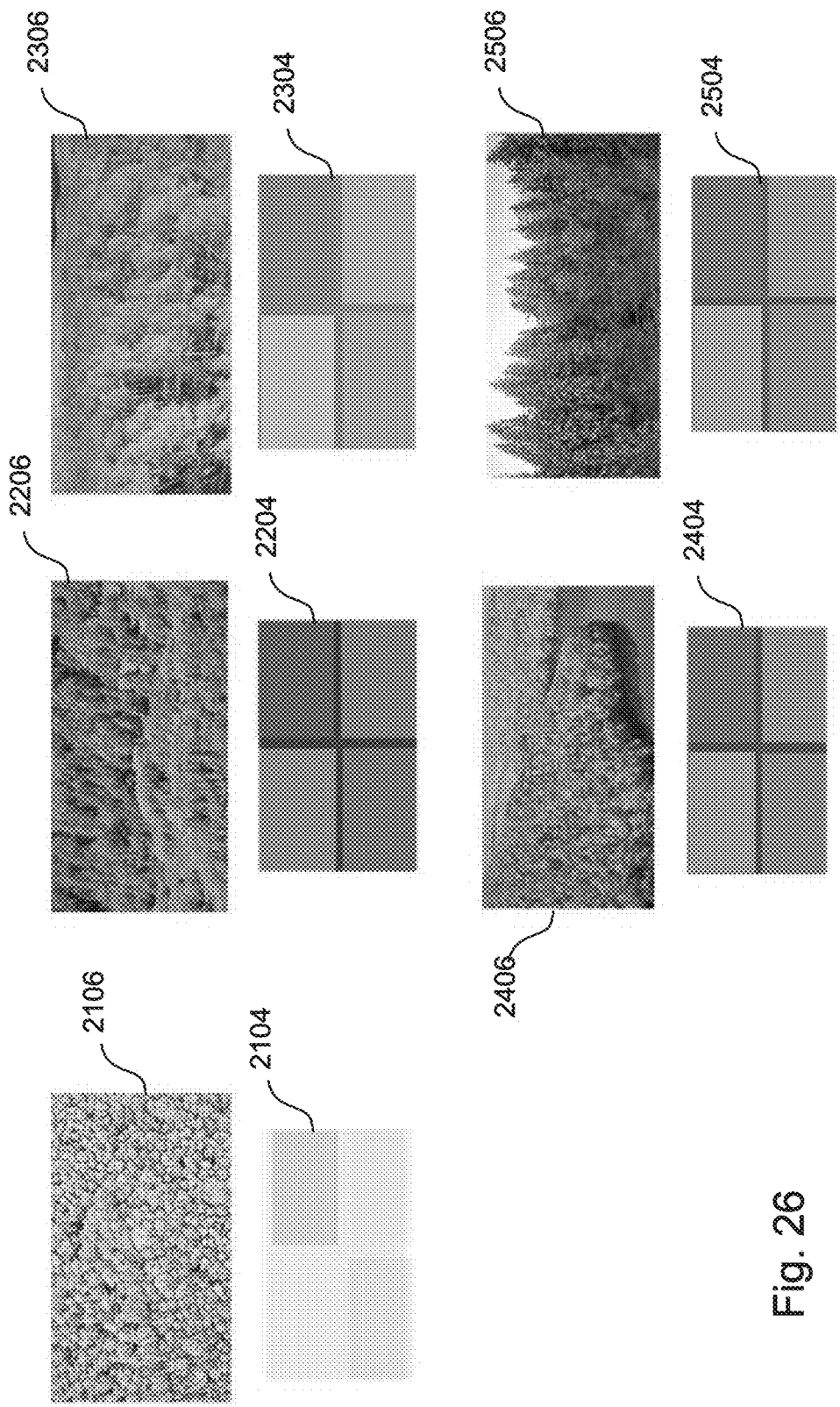
FIG. 26 presents a summary of FIGS. 21-25.

FIGS. 21-25 are summarized and compared side-by-side in FIG. 26.

Liquid Storage and Evaporation

With reference again to FIGS. 15A through 16C, in embodiments the liquid distribution medium 1502, which in embodiments is a liquid distributing fabric, a cellulosic pulp, or a liquid-absorbent material such as a "super-absorbent polymer" ("SAP") mixed with a cellulosic material, is quilted or otherwise included between two cellulosic or other fabric layers 1408, 1504. In embodiments, at least one of these covering layers 1504 is configured to enable water stored by the pulp 1502 and substrate layers to slowly evaporate, so that the control of the temperature of the outer "observed" layer is based at least in part on the cooling that arises from controlled evaporation of water from the pulp 1502 through the garnish layer 1408, and in embodiments through a wax water control coating 1610 applied to the garnish layer 1502, as described above.

In various embodiments, water evaporated from the fiber enhances the emulation of natural vegetation in at least two regards. First, evaporative release of the contained water in a controlled manner is used in some embodiments to simulate the natural evaporation of water from vegetation. As noted above, embodiments include a wax coating 1610 applied to the garnish layer that further controls the evaporation rate so as to match the system temperature to the temperature of the surrounding vegetation. Second, in various embodiments the water stored in the fiber 1502 is a key element in emulating the absorption of natural vegetation in the infrared spectral region, especially in the 1.4 to 2.5 micron wavelength range. In other embodiments, water evaporation is controlled via a second, lower vascular system 1608.

With reference again to FIGS. 20B and 20C, in embodiments, the delivery of colorizing liquid to the fiber is controlled from a central liquid supply system, such as a delivery pump 2016 and reservoir 2010, and in some of these embodiments the liquid content and evaporation rate of the pulp can be matched to the surrounding foliage through proper control of the water delivery system, thereby enhancing the concealment provided by the camouflage system. In various embodiments that include petalation, water is delivered to the pulp 1502 through tubing included in the channel that transports the water in the machine direction to each petal 1410. The tubing can be microporous and/or perforated at each petal 1410.

Figure 27B:
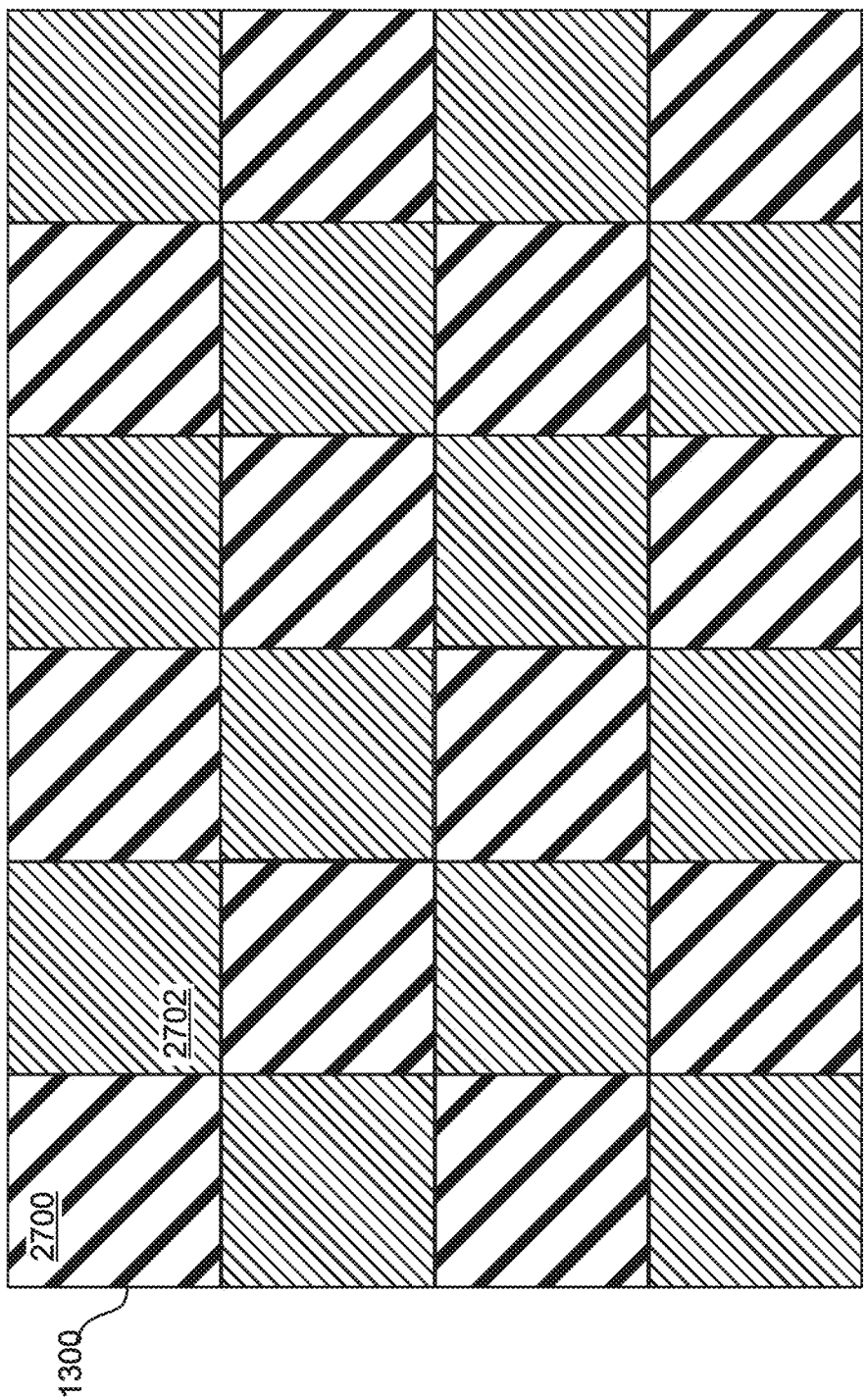
FIG. 27B is a top view of the camouflage cover of FIG. 27A where different base colors have been introduced into the two pulp zones

With reference to FIGS. 27A and 27B, in embodiments, the camouflage cover is modular, being made up of a plurality of panels 2700, 2702 that are sewn or otherwise joined together to form modular sections, which are then assembled into larger camouflage cover layers 1300 in sizes that are suitable for protecting various types of vehicles and other assets. The panels 2700, 2702 can be made, for example, from roll goods that are only 60-100 feet wide, which are cut into modules that are shaped as diamonds, hexagons, or squares, and then sewn together to form covers 1300 that are 15 feet wide or more. In various embodiments, the channels include "petalation" tubes that run in the machine direction of the roll goods. The petalation tubes are interconnected by supply manifolds that run perpendicular to the seams in the roll goods, and complete the header and branch water supply system for large multi panel spectral management embodiments. By making the pressure drop over the entire system, small with respect to the total liquid pressure in the feed network, the dosing of colorizing liquid to the fiber 1502 can be made consistent over the full length of the feeder lines.

Multiple Color Control Zones

With reference to FIGS. 27A and 27B, in embodiments of the present invention the camouflage cover is divided into a plurality of zones 2700, 2702, which are separately cooperative with corresponding subsystems 1404A, 1404B of the channels 1601, 1608 and, in turn, with corresponding reservoirs 2010A, 2010B of colorizing liquid. These embodiments enable different colorizing liquids to be applied to each zone 2700, 2702, thereby enabling field adaptation not only of the color, but also of the visual pattern that is displayed by the camouflage cover 1300.

This can be useful, for example in changing light conditions, or in situations where there is self-shadowing of the camouflage cover due to low sun angles, and also for moving assets where the visual pattern of the surroundings changes from location to location, in addition to the visual, heat, and IR signatures.

Automated Signature Management

Figure 28B:
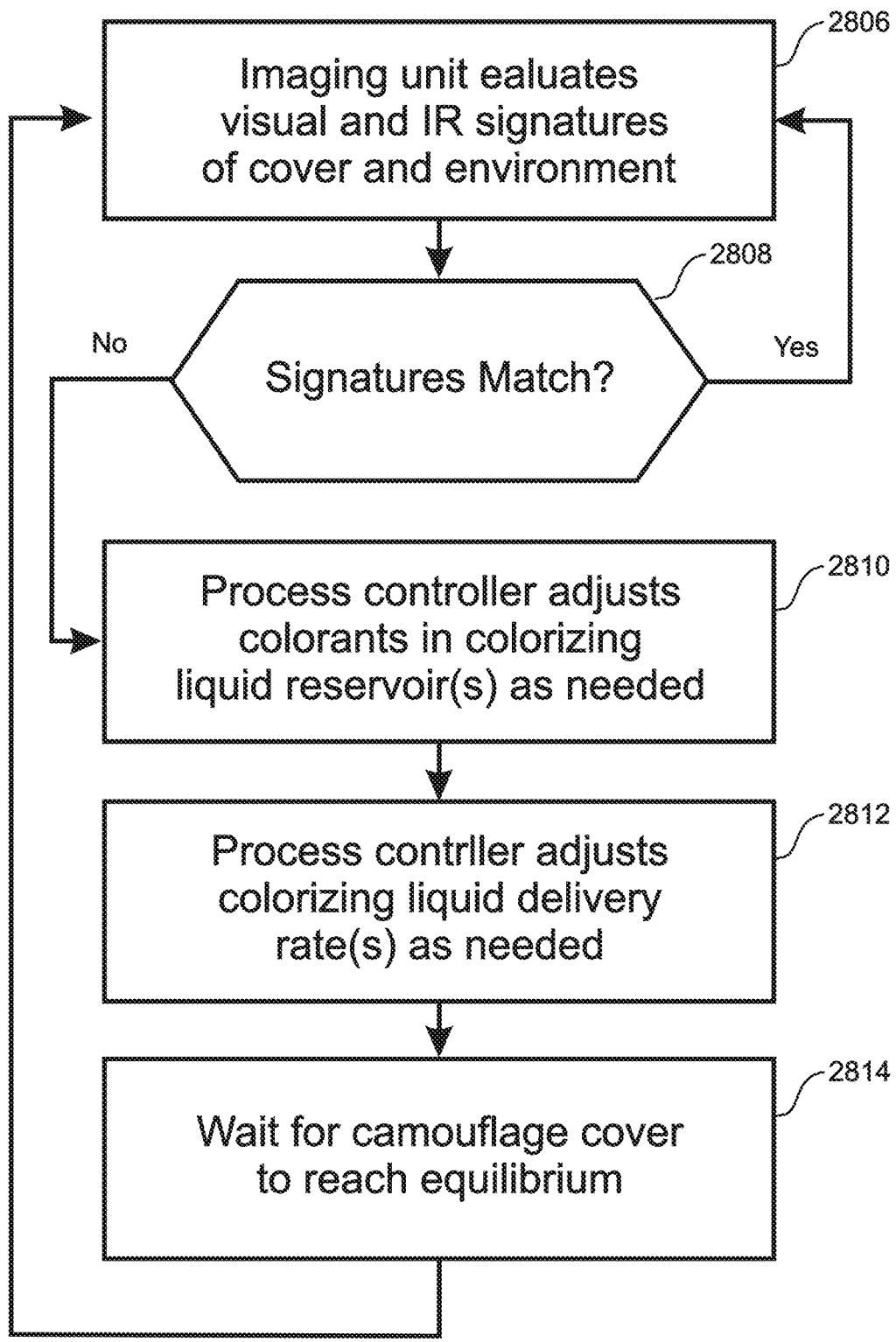
FIG. 28B is a flow diagram that illustrates a method for automated monitoring and adjustment of visual and IR signatures in embodiments of the invention.

With reference to FIGS. 28A and 28B, embodiments of the present invention include active, automated management of the visual and/or IR signature that is presented by the camouflage cover 1300. According to these embodiments, an automatic or semi-automatic sensing system 2800 measures the visual and/or IR signature 2806 of the surrounding environment 2802 and compares it 2808 to the signature of the camouflage cover 1300. A control system or "process controller" 2804 then causes the colorizing liquid supply system 2010 to adjust 2810 the selected colorants in the colorizing liquid until the visual signature of the camouflage cover 1300 matches the surrounding environment. In embodiments, the system evaluates differences in hue and/or a and b values between the camouflage cover and the environment, and in various embodiments the system evaluates differences in L or luminosity. Adjustment of the camouflage visual signature can include replacement of a previously delivered colorizing liquid and/or adjustment of colorants added to a continuously delivered or circulated colorizing liquid.

Automated control of the displayed visual and/or IR signature can include decolorization as well as increased or altered colorization. For example, if the surrounding environment grows lighter, decolorization may be the most effective method for maintaining a signature match.

In various embodiments, the match between thermal and IR signatures of the camouflage cover and the surrounding environment is actively maintained by automatically controlling the rate and/or pressure 2812 at which the colorizing liquid is supplied to the upper channel 1601, or to the separate water channel 1608 if included, thereby controlling the rate at which the water or other liquid is evaporated from the camouflage cover 1300 so as to emulate the natural evaporation that is present in surrounding vegetation. In some embodiments, the IR signature match to the surrounding environment is based at least in part on the chlorophyll, carotene, and/or water content of the fiber and support layer. Once the camouflage cover 1300 has reached a new equilibrium 2814, the process is repeated so as to maintain a match with the surrounding environment.

Ground Simulation Layer for Inhibiting Detection by LiDAR

Requirements for improved land survey techniques have led to the commercialization of high performance "Geiger mode" LiDAR, or laser range finding systems. These and other, similar, very high speed laser ranging systems can provide enough data points per unit area of landscape to provide not only a detailed view of the vegetation, but also detailed topographic data regarding the ground plane. Computational methods can separate the ground plane from the canopy data, and can provide up to three centimeter resolution and five centimeter accuracy for commercial systems. This technology is capable of resolving the depressions that result from the passage of tracked vehicles through a leaf canopy.

Trigger Geometries for LiDAR

Due to the high-resolution data that LiDAR can provide regarding the ground plane, there are at least four geometric patterns arising from LiDAR data that can be used to locate military equipment and shelters. These so-called "Geometric Identification Triggers" include:

Flat surfaces;
90o corners;
Vertical or near vertical surfaces; and
Repeating catenary-shaped surfaces.

Figure 29:
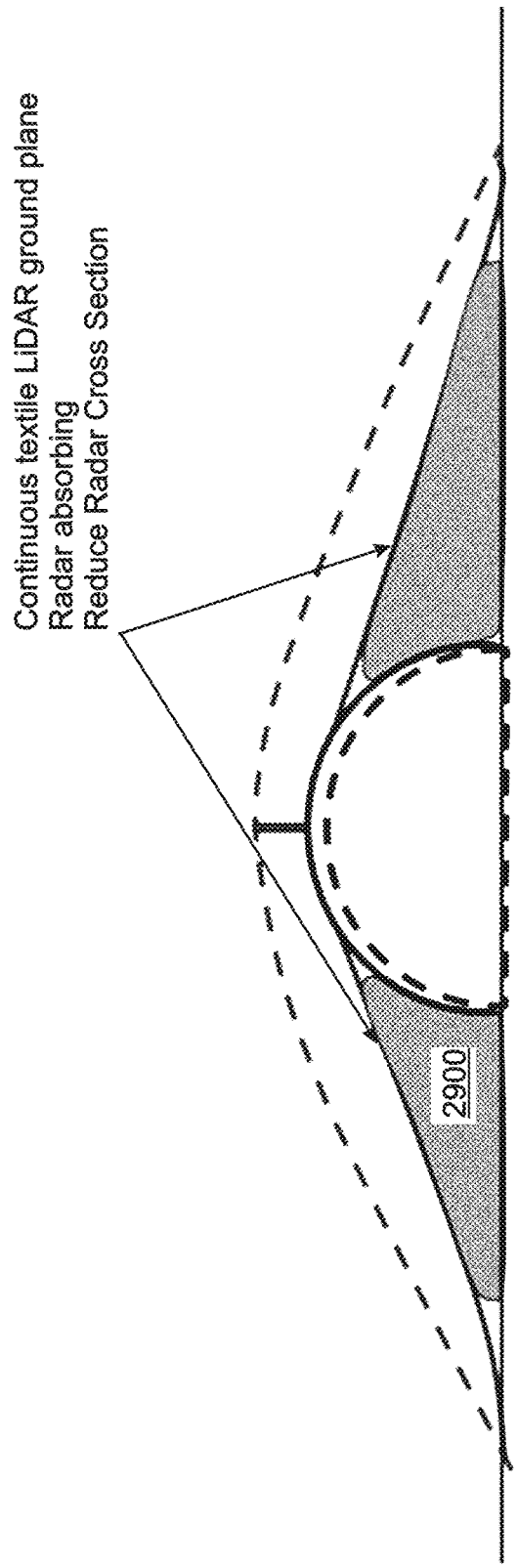
FIG. 29 is a simplified cross-sectional diagram illustrating camouflage layers in an embodiment of the present invention that includes LiDAR protection.

FIG. 29 illustrates an approach used in embodiments of the present invention to address the requirement for LiDAR concealment. The approach is based on low pressure, light weight air bags 2900 with adjustable lanyards distributed across their two main surfaces. The lanyards are used to reconfigure the cross section of the air bag as required to mask the shape and configuration of equipment. Because each lanyard changes the section height independently, this approach allows for a virtually infinite set of random cross sections to be created, so that the air bag can mask the four main trigger geometries found in various covert equipment.

Various embodiments use 1 to 1.5 oz/yd2 coated nylon, other light weight film, or film scrim laminates for the air bags. In embodiments, the air bags 2900 operate at low pressures ranging from 0.25 to 2 inches of water gauge. Accordingly, in these embodiments the burst strength of the bag material need not be above 20 ply, with tear strength of 8-15 lbf preferred. The lanyards can be self-sealing, or can be run in sealed tubes so as to reduce leakage. Because these ground-profile shaping bags 2900 are subject to small punctures and tears in service, embodiments provide a continuous air supply so as to compensate for leakage.

The visible coating color for these ground profile bags 2900 can be matched to the dominant visible color and pattern of the ground cover in the area of use. For example, a lignin-cellulose signature can be used where leaf mold is the typical ground cover. Alternatively, in terrain where there is relatively sparse vegetative cover, the IR signature can be designed to match IR signatures of the dominant soil types in the area of use.

Electro-Magnetic Interference ("EMI") Control and Low EM Emissivity

Embodiments of the disclosed camouflage system further include electromagnetic interference ("EMI") shielding that is designed to absorb and scatter air search radar and avoid detection of electromagnetic emissions. In some of these embodiments, the EMI shielding is integrated with the vegetation emulating layer 1300 and/or the underlying layer 1304. For example, in embodiments one or more conductive filler materials are added to the pulp so as to provide electromagnetic shielding. So as to control the conductivity of the pulp-sap, in some embodiments the conductive fillers can be coated separately with a dielectric cover coat. The conductive fillers can include a plurality of conductive materials and conductive fibers. Carbon-based materials, metallic materials, and/or other conductive materials are used in various embodiments.

In various embodiments an EMI-thermal control coating is applied to the back side of the vegetation simulation layer 1300. In other embodiments where there is a ground plane layer that is separate from the vegetation simulation layer, the EMI-thermal layer is combined with the ground plane layer. In embodiments, a conductive coating is applied to the radar protection layer 1302 or thermal protection layer 1304 to block electromagnetic radiation originating from the protected object(s). The EMI-thermal layer cannot be in the petalation layer, as this would affect the IR signature of this top surface.

In some embodiments, conductive carbon black is used to provide conductivity in the coatings. In various embodiments, graphene and/or carbon nanotubes ("CNTs") are used instead of, or in combination with, conductive carbon black fillers. A wide range of binder film formers and adhesives are suitable for coating formulations. Milling of the conductive fillers can be an important aspect, and good dispersion of agglomerated conductive materials can have a significant effect on performance. Accordingly, binders are chosen in embodiments to facilitate the milling process. Because of the strong Van der Waals interactions between surfaces of carbon materials, surface-modified grades of CNT's and carbon blacks are used in some embodiments for their improved dispersal behavior. In embodiments, the Lewis acid base nature of surface-modified carbon is exploited by selecting a binder and solvent with improved affinity to the modified surfaces.

In still other embodiments, the electromagnetic shielding includes a textile that is plated with silver, copper, and/or nickel to block a range of EMI frequencies.

The range of EMI frequencies that can be addressed by a conductive material is finite. Higher frequency signals in the 100-300 MHz range are compatible with most of the conductive coating embodiments. Lower frequency signals require metallic solutions, and in many cases multi-layer metallic solutions. Embodiments with greater than 0.6 oz of silver in one or more layers have proven to be effective. The thermal emissivity of these metallic solutions is also very low, such that these embodiments can provide high levels of thermal signature management in combination with their EMI performance. Substrates for these embodiments are tailored to the application methods used for the metallic or conductive layer. For electrodeless plating, nylon or PET nonwovens are used in some embodiments. For laminated foils, a wider range of films and reinforced scrims are used in various embodiments. For electroplated copper and nickel solutions, woven nylon and/or PET are used in embodiments.

Thermal Signature Reduction

With reference again to FIGS. 13A and 13B, embodiments of the present invention are configured for concealing equipment and/or shelters that are not at ambient temperature. For example, in the case of shelters, environmental control apparatus may be used to keep the enclosed space warm or cool, and as a result there may be a strong need to prevent the infrared radiation generated by the environmental control apparatus from radiating into the surrounding, cooler ambient environment. Accordingly, embodiments of the present invention provide control over these types of thermal radiation as part of the environmental management of the invention that limits and controls thermal radiation from the objects that are being concealed. In some embodiments, thermal control is provided by an additional IR thermal barrier layer 1304, which in some embodiments is below the vegetation emulating 1300 and radar/LiDAR protecting 1302 layers.

Some embodiments further include a thermal insulation layer behind or between layers of the IR thermal barrier 1304, incorporated at a level that is not visible to an observer. In embodiments, the insulation value of the insulation layer can be from R=1 to R=7 in units of ft2·° F.·hr/Btu. Insulation that incorporates fibrous materials, air space cells, and/or foams is used in various embodiments.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A camouflage system suitable for protecting an asset from detection, the system comprising a camouflage cover configured to match a spectral signature of surrounding vegetation, the camouflage cover including:
   a plurality of boundary layers comprising a first boundary layer, and a second boundary layer below the first boundary layer;
   at least one circulating channel formed between said boundary layers, said at least one circulating channel including a liquid-circulating channel formed between the first and second boundary layers through which a circulating liquid can be circulated, the liquid-circulating channel being visible through the first boundary layer; and
   a first liquid distribution medium located within the liquid-circulating channel and configured to distribute the circulating liquid throughout the liquid-circulating channel by absorption, wicking, or a combination of absorption and wicking of the circulating liquid;
   said liquid-circulating channel including a liquid feed in liquid communication with the first liquid distribution medium;
   a bottom-most of said plurality of boundary layers being a water-permeable boundary layer configured to enable water that is circulated through a lowest of the circulating channels to evaporate from below the camouflage cover;
   the camouflage cover being configured to present a visible and IR spectral signature that approximates a visible and IR spectral signature of surrounding vegetation.

2. The system of claim 1, wherein the second boundary layer is the water-permeable boundary layer, and wherein the first boundary layer is impermeable to water, so that water that is circulated through the liquid-circulating channel is able to evaporate from below the camouflage cover through the second boundary layer.

3. The system of claim 1, wherein:
   the water-permeable boundary layer is a third boundary layer of the plurality of boundary layers, said third boundary layer being located below the second boundary layer; and
   said at least one circulating channel further includes a water-transporting channel formed between the second boundary layer and the third boundary layer,
   water that is circulated through the water-transporting channel being able to evaporate from below the camouflage cover through the third boundary layer;
   a second liquid distribution medium being located within the water-transporting channel.

4. The system of claim 1, further comprising a layer of a wax applied on an outward-facing surface of the camouflage cover.

5. The system of claim 4, wherein the layer of wax is embossed.

6. The system of claim 1, wherein at least one of the boundary layers is a layer of poly-ethylene terephthalate ("PET").

7. The system of claim 1, wherein the first liquid distribution medium includes a liquid distributing fabric.

8. The system of claim 7, wherein the liquid distributing fabric includes at least one of staple and filament cellulosic yarns.

9. The system of claim 1, wherein the first liquid distribution medium includes a cellulosic fiber.

10. The system of claim 1, wherein the first liquid distribution medium includes a super-absorbent polymer.

11. The system of claim 1, wherein the liquid feed includes liquid-permeable tubing.

12. The system of claim 1, wherein the first liquid distribution medium includes at least a first liquid distribution layer and a second liquid distribution layer, said first liquid distribution layer being configured to retain the circulating liquid more strongly than said second liquid distribution layer.

13. The system of claim 1, further comprising petalation of the camouflage cover.

14. The system of claim 1, wherein the liquid-circulating channel is partitioned by seams between the first and second boundary layers, the seams being configured to direct the circulating liquid when circulating through the liquid-circulating channel to follow a circuitous path.

15. The system of claim 14, further comprising cuts made through the first and second boundary layers that are coordinate with the seams, so as to cause petalation of the first and second boundary layers that is coordinate with the circuitous path.

16. The system of claim 1, further comprising visible printing applied to at least one of the first boundary layer and the second boundary layer.

17. The system of claim 1, further comprising a textile support layer attached beneath the water permeable boundary layer, said textile support layer being permeable to water.

18. The system of claim 1, further comprising a first liquid delivery system in liquid communication with the liquid feed of the liquid-circulating channel.

19. The system of claim 1, further comprising a temperature control system configured to control a temperature of a liquid delivered to the camouflage cover.

20. The system of claim 1, further comprising a signature management system including an automatic or semi-automatic sensing system that is able to measure the visible and IR spectral signatures of the camouflage cover and of a surrounding environment, and to compare the visible and IR spectral signature of the camouflage cover with the visible and IR spectral signature of the surrounding environment.

21. The system of claim 20, wherein the signature management system further includes a circulating liquid supply system that is able to make automatic adjustments that improve a match between the spectral signatures of the camouflage cover and the surrounding environment, said adjustments including at least one of:
   adjusting a rate of water evaporation by adjusting a rate and/or pressure at which a liquid is delivered to the camouflage cover; and
   adjusting a formulation of a dye solution that is delivered as the circulating liquid to the camouflage cover.

22. The system of claim 1, further comprising:
   a plurality of color modification containers filled with pre-measured liquid colorants; and a mixing apparatus configured to mix a carrier liquid with a selected combination of the liquid colorants from the plurality of color modification containers, so as to form the circulating liquid for delivery thereof to the liquid-circulating channel.

23. The system of claim 1, wherein the camouflage cover is divided into a plurality of zones, and is configured such that separate circulating liquids from separate reservoirs can be delivered to each of the plurality of zones, thereby enabling variation of a visible pattern displayed by the camouflage cover.

24. The system of claim 1, further comprising a layer below the camouflage cover that is substantially opaque to thermal radiation and has a low thermal emissivity, thereby being configured to conceal thermal emissions arising from the protected asset.

25. The system of claim 1, further comprising conductive materials included within the camouflage cover, said conductive materials being configured to block electromagnetic emissions from the asset and/or to absorb and/or deflect radar waves.

26. The system of claim 1, further comprising a reverse osmosis filtration system that is able to accept circulating liquid that has been flushed from the liquid-circulating channel and to separate water included in the flushed circulating liquid from colorants dissolved therein.

27. The system of claim 1, further comprising a plurality of ultraviolet reflectors.

28. The system of claim 27, further comprising a ground plane layer having a geometry that does not comprise any LiDAR Geometric Identification Triggers.

29. The system of claim 28, wherein the ground plane is supported by at least one air bag that is inflated to a pressure of less than 25 iwg.

30. The system of claim 1, further comprising a radar protection layer located beneath the camouflage cover.

31. The system of claim 1, further comprising an EMI shielding layer located beneath the camouflage cover and configured to block electromagnetic emissions from the asset.

32. The system of claim 1, wherein the system is configured so as to maintain a temperature of an upper surface of the camouflage cover at a temperature that is within two degrees centigrade of a temperature of the vegetation environment.

33. A method for protecting an asset by controlling a spectral signature so as to match a surrounding vegetation environment, the method comprising:
providing a camouflage cover as described in claim 1 and a first liquid delivery system in liquid communication with the liquid feed of the liquid-circulating channel;
preparing a colorizing solution comprising a solvent and a colorizing agent, said colorizing solution having an IR signature that approximates a bio-chromophore IR signature of the vegetation environment, said colorizing solution being configured, either alone or in combination with other visible elements of the camouflage cover, to provide a visible match to the visible signature of the vegetation environment;
causing the first liquid delivery system to deliver the colorizing solution to the first channel; and
causing water to be evaporated from the camouflage cover so as to approximate a water transpiration IR signature of the vegetation environment.

34. The method of claim 33, further comprising responding to a change in the surrounding vegetation environment by:
causing the liquid delivery system to flush the colorizing agent from the liquid-circulating channel; and
causing the liquid delivery system to deliver a reformulated colorizing solution into the liquid-circulating channel.

35. The method of claim 34, wherein flushing the colorizing agent from the liquid-circulating channel includes causing the liquid delivery system to deliver an oxidizing solution into the liquid-circulating channel.

36. The method of claim 33, wherein the colorizing solution is delivered to the liquid-circulating channel only when adjustment of the spectral signature of the camouflage cover is required.

37. The method of claim 33, wherein the colorizing solution is continuously delivered to the liquid-circulating channel.

38. The method of claim 33, wherein the liquid-circulating channel is the only circulating channel, the second boundary layer is permeable to water, and the method further comprises:
calculating a rate of water transpiration of the vegetation environment; and
causing the first liquid delivery system to deliver the colorizing solution to the liquid feed of the liquid-circulating channel at a rate and pressure that provides evaporation of water from the colorizing solution through the second boundary layer at a rate that matches the water transpiration rate of the vegetation environment.

39. A method for protecting an asset by controlling a spectral signature so as to match a surrounding vegetation environment, the method comprising:
providing a camouflage cover as described in claim 3;
providing a first liquid delivery system in liquid communication with the liquid feed of the liquid-circulating channel of the camouflage cover;
providing a second liquid delivery system in liquid communication with the water-transporting channel of the camouflage cover;
measuring visible and IR signatures of the surrounding vegetation environment;
preparing a colorizing solution that emulates a bio-chromophore component of the IR signature of the vegetation environment, said colorizing solution being further configured, either alone or in combination with other visible elements of the camouflage cover, to match the visible signature of the surrounding vegetation;
calculating a rate of water evaporation that will match a water transpiration component of the IR signature of the vegetation environment;
causing the first liquid delivery system to deliver the colorizing solution to the liquid-circulating channel; and
causing the second liquid delivery system to deliver water to the water-transporting channel at a rate and/or pressure that will cause water to evaporate from the camouflage cover at the calculated rate.

40. The method of claim 39, wherein the first boundary layer includes visible printing through which the colorizing solution in the liquid-circulating channel is visible, said colorizing solution being configured to match the visible signature of the surrounding vegetation when viewed through the first boundary layer.

41. The method of claim 39, wherein the visible printing on the first boundary layer includes a printed pattern that emulates a patterned appearance of the vegetation environment.

* * * * *